United States Patent [19]
Jennings

[11] 4,064,561
[45] Dec. 20, 1977

[54] CRT KEY STATION WHICH IS RESPONSIVE TO CENTRALIZED CONTROL

[75] Inventor: Alan K. Jennings, Huntington Beach, Calif.

[73] Assignee: Pertec Computer Corporation, Los Angeles, Calif.

[21] Appl. No.: 745,458

[22] Filed: Nov. 26, 1976

Related U.S. Application Data

[62] Division of Ser. No. 532,714, Dec. 13, 1974, Pat. No. 4,041,469.

[51] Int. Cl.² .............................................. G06F 3/14
[52] U.S. Cl. ............................ 364/900; 340/324 AD
[58] Field of Search ......... 364/900, 900 MS, 200 MS, 364/200; 340/324 A, 324 AD

[56] References Cited
U.S. PATENT DOCUMENTS

| | | | |
|---|---|---|---|
| 3,449,721 | 10/1966 | Dertouzos et al. | 340/172.5 |
| 3,559,181 | 1/1971 | Carlock et al. | 340/172.5 |
| 3,624,632 | 11/1971 | Ophir | 340/324 AD |
| 3,665,408 | 5/1972 | Erdahl et al. | 340/172.5 |
| 3,771,155 | 11/1973 | Hayashi et al. | 340/324 AD |
| 4,011,556 | 3/1977 | Tochitani et al. | 340/324 AD |

*Primary Examiner*—Harvey E. Springborn

*Attorney, Agent, or Firm*—Fraser and Bogucki

[57] ABSTRACT

Hardware duplication at each of a plurality of CRT key stations is minimized and centralized control is maintained by performing many traditional CRT key station operations under software control by a central processing unit. Simplified CRT key stations include circuitry providing automatic key stroke repeat for continuously actuated keys only after receipt of a repeat enable signal from the central processing unit for each separate repeat and a tone generator responsive to commands from the central processing unit. The tone generator includes a key click circuit to audibly indicate each completion of a key activation. CRT key station circuitry inserts a configuration code with each key stroke data word which indicates one of a plurality of available key switch arrangements for the CRT key station. The configuration code permits a single key station hardware design to be included in a data entry system with different keyboard configurations such as typewriter, calculator, keypunch or even foreign language to be selected without need for a conversion system at each CRT key station to convert key stroke information to a common code. Instead, a central processing unit may utilize the configuration code to identify an appropriate conversion table stored in memory.

4 Claims, 44 Drawing Figures

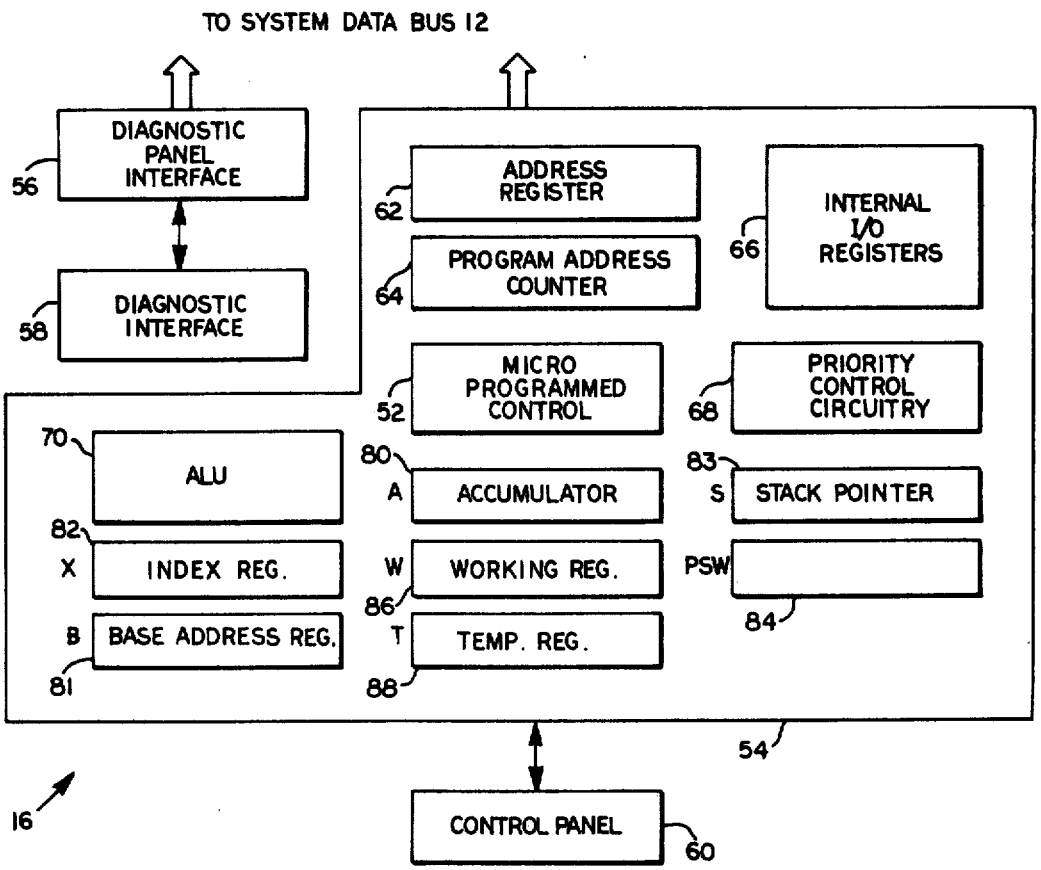
FIGURE 2. CENTRAL PROCESSING UNIT
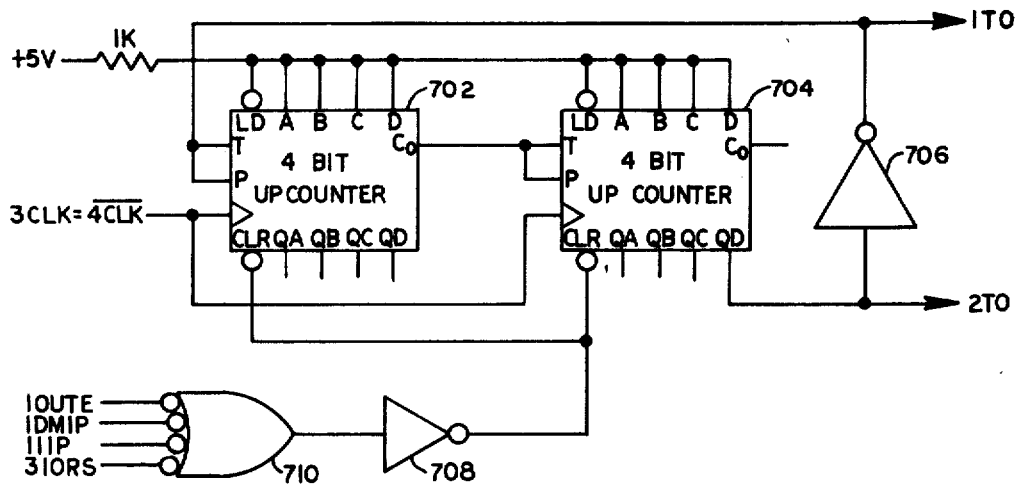
FIGURE 7 TIME OUT GENERATOR 120

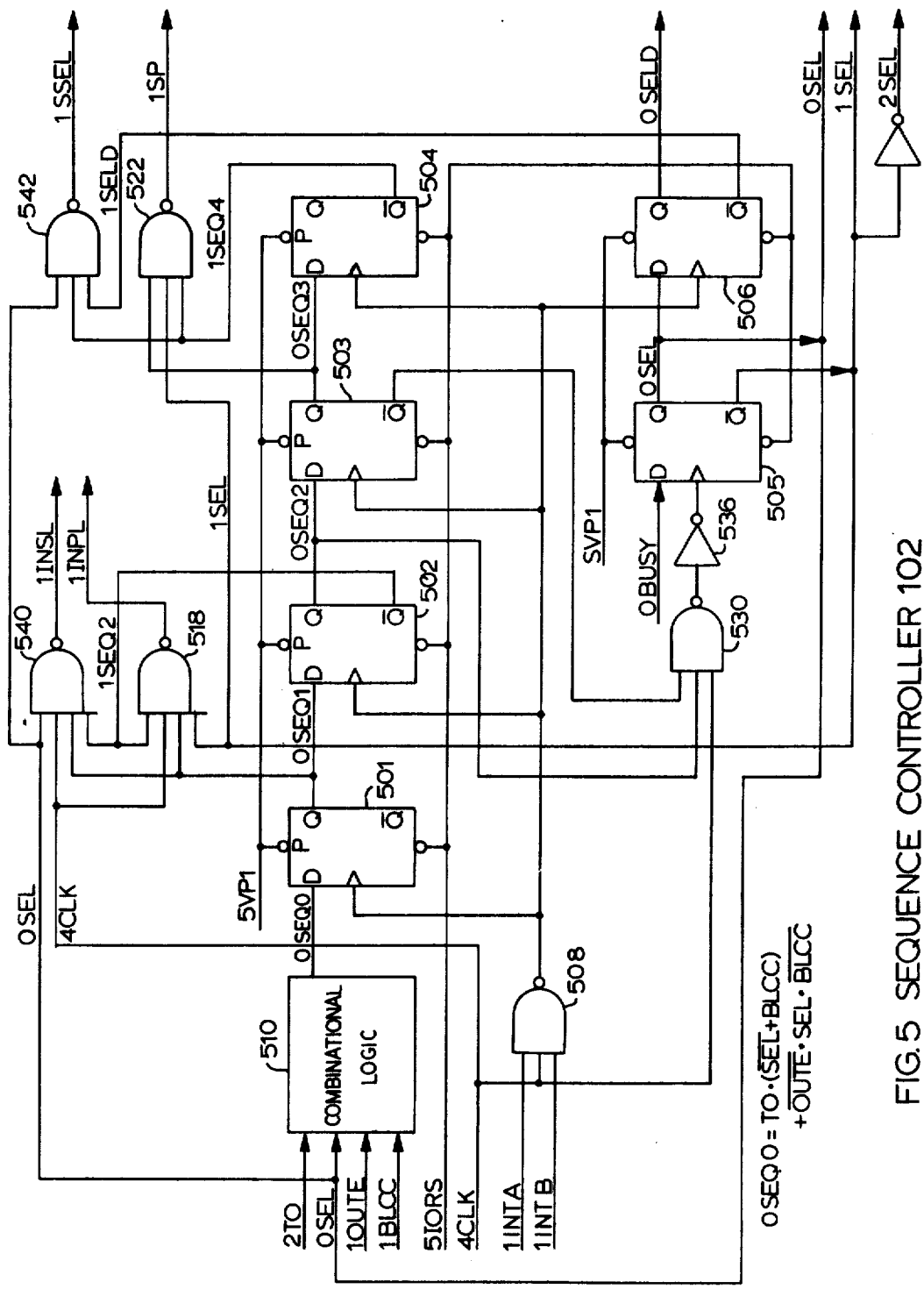
FIG.5 SEQUENCE CONTROLLER 102

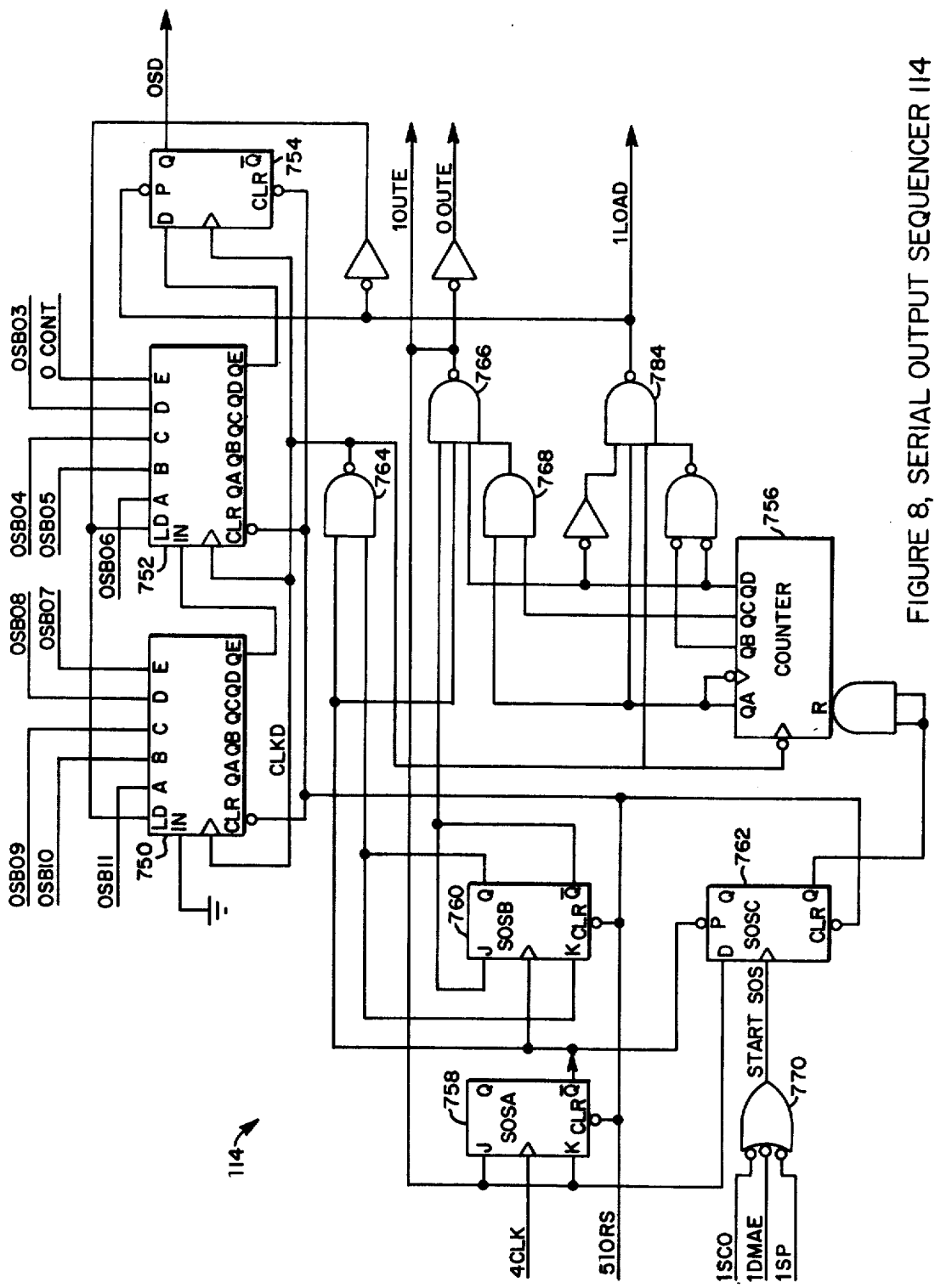
FIGURE 8, SERIAL OUTPUT SEQUENCER 114

DMA SEQUENCER 106

COAX OUTPUT CHARACTER MULTIPLEXER
AND PARITY GENERATOR 110

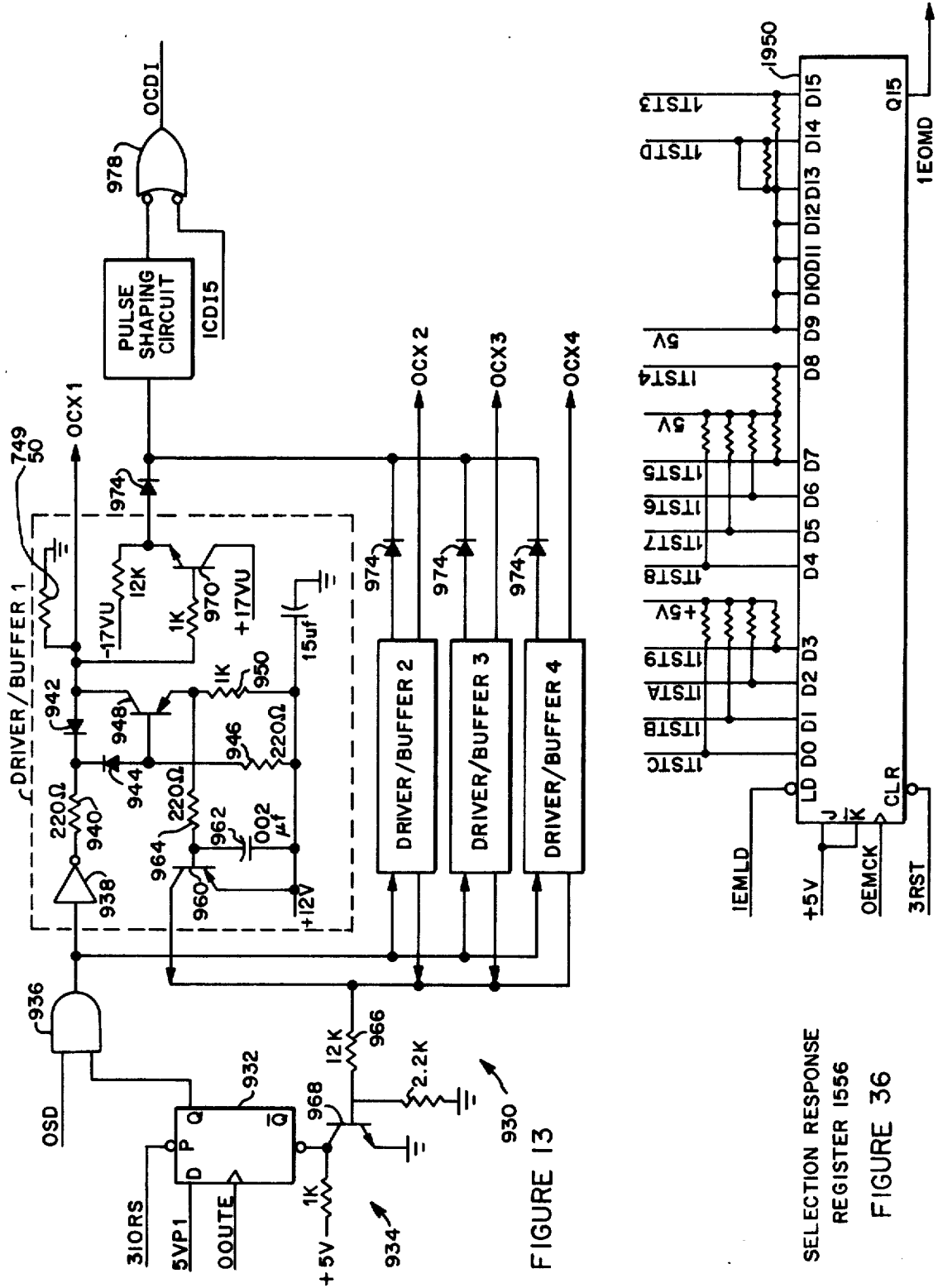

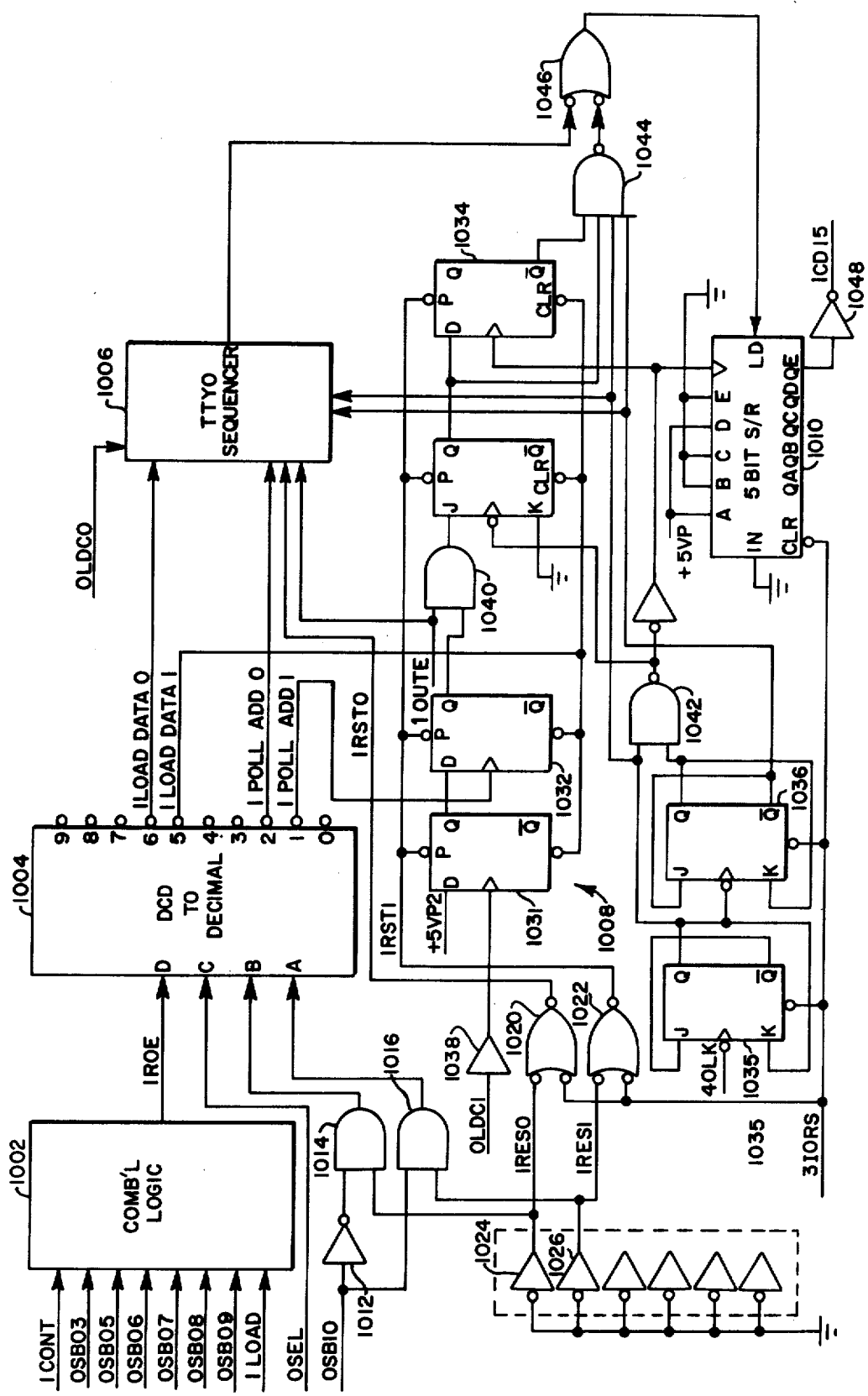
FIGURE 14 R.O. OUTPUT RESPONSE SEQUENCERS 1000

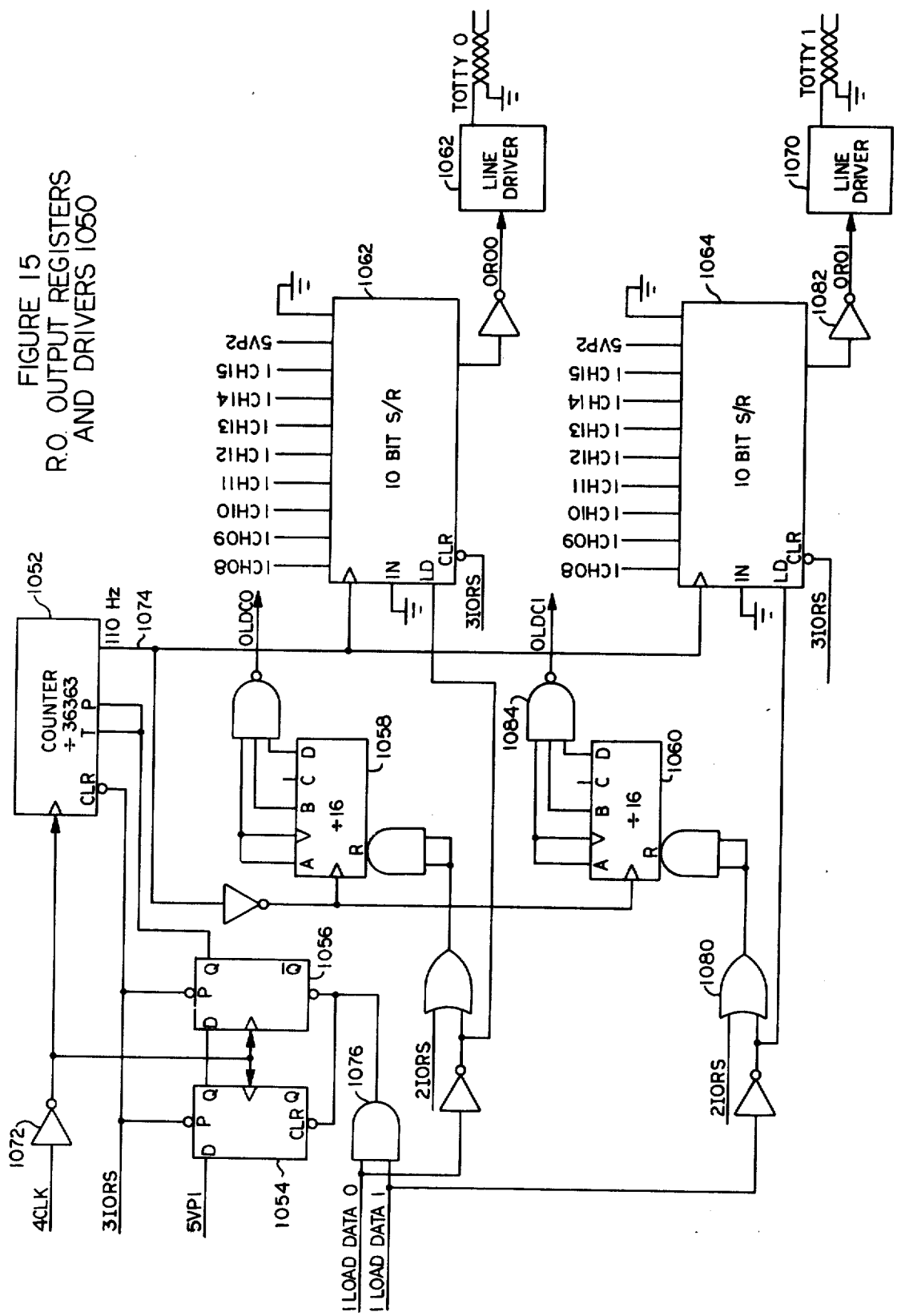

STATUS-DATA REGISTER 124

INPUT DATA TIMER 122

KMUX STATUS REGISTER 136

ADDRESS COUNTER 132

BLOCK LENGTH COUNTER 104

DATA COMBINER 1558

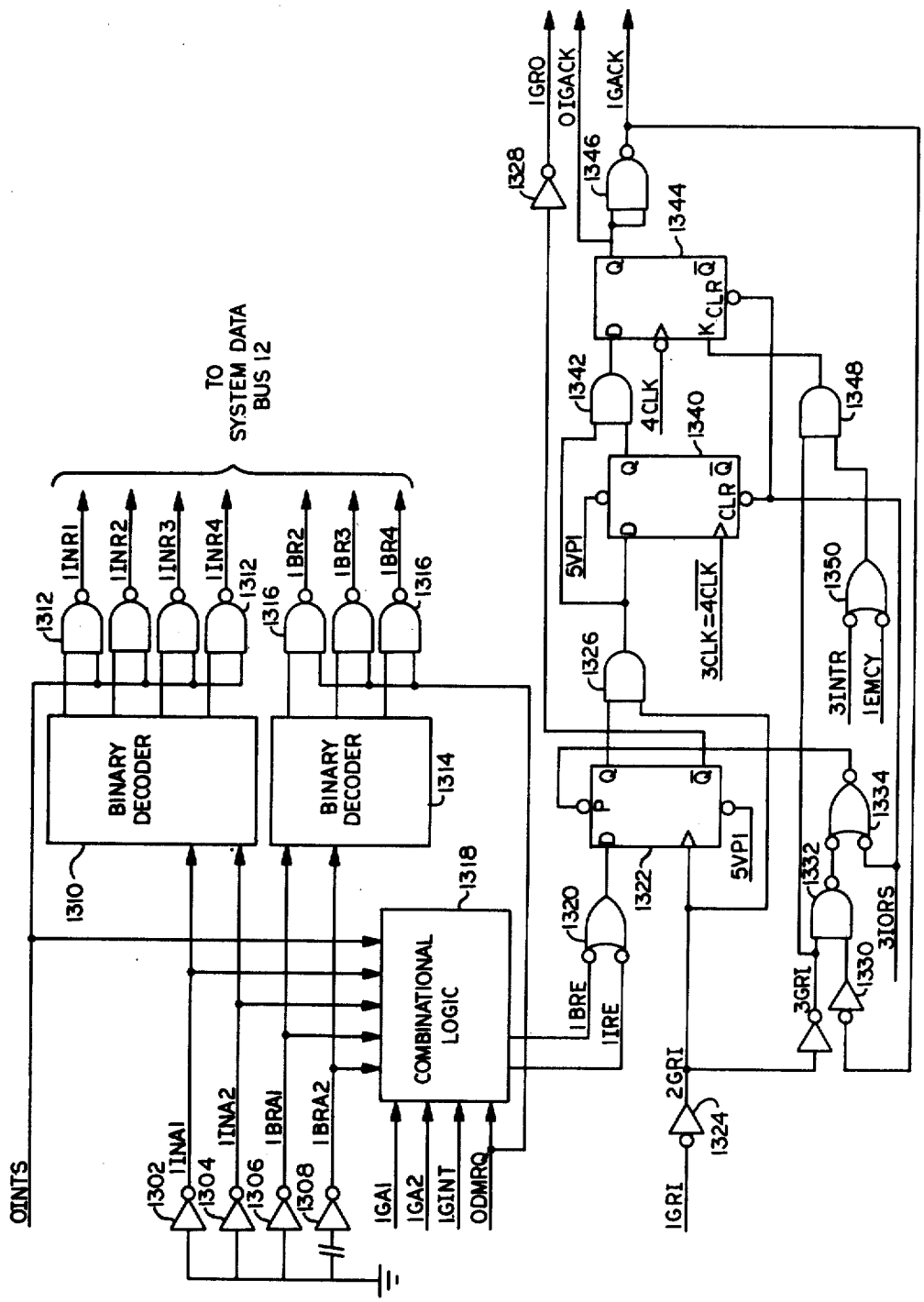
FIGURE 23, BUS REQUEST AND INTERRUPT PROCESSING 1300

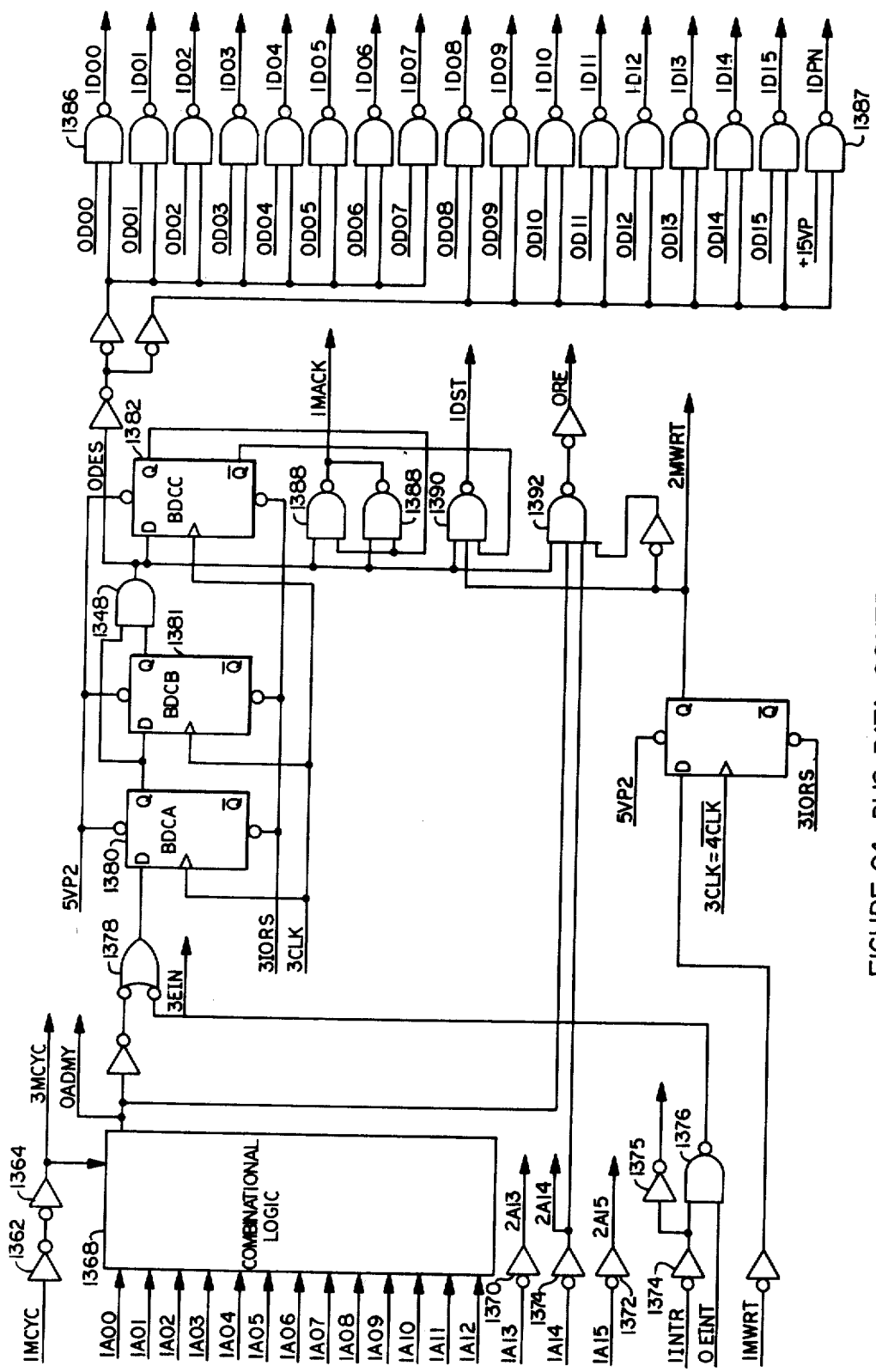
FIGURE 24 BUS DATA CONTROL 1360

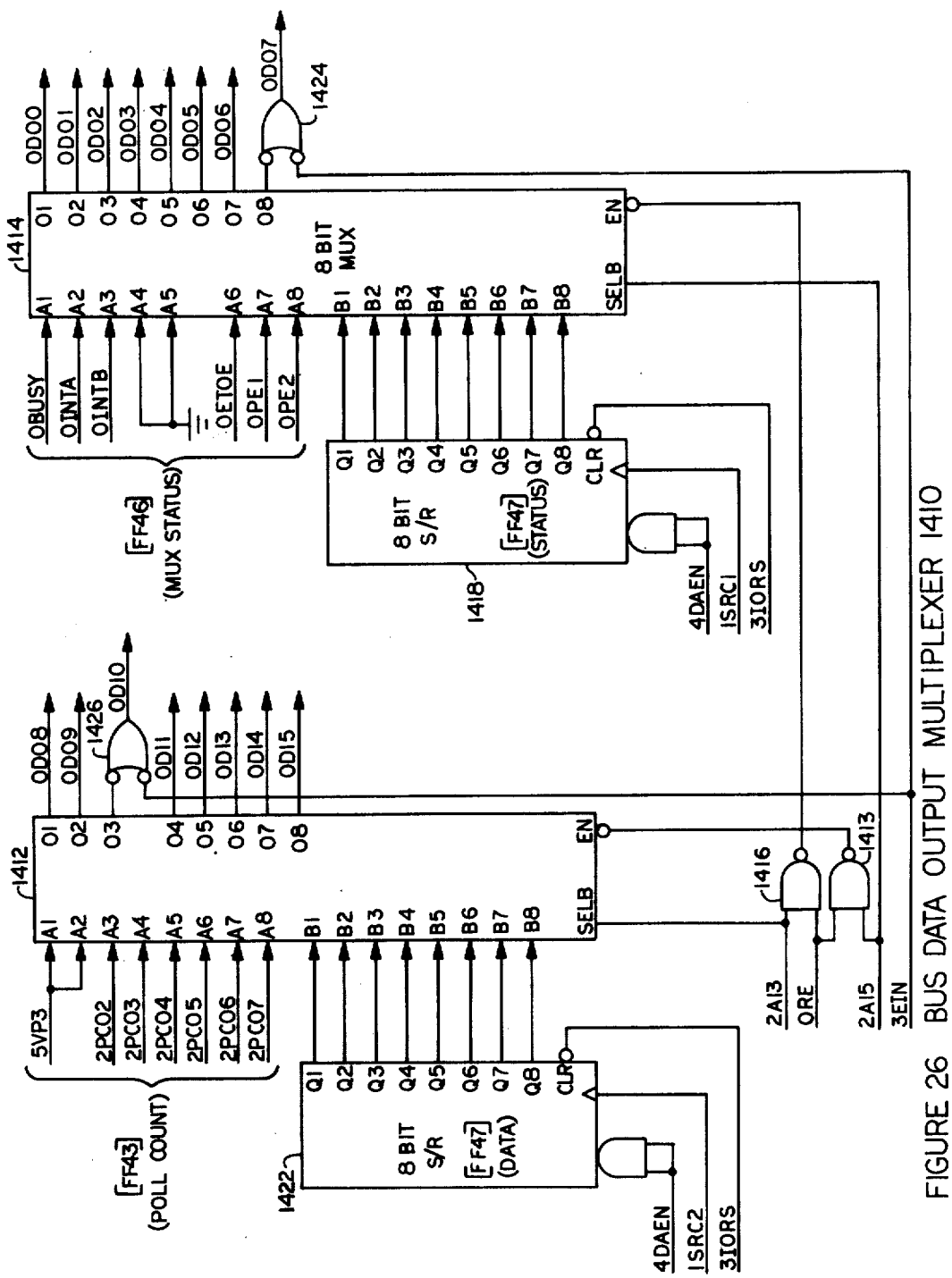
FIGURE 26 BUS DATA OUTPUT MULTIPLEXER 1410

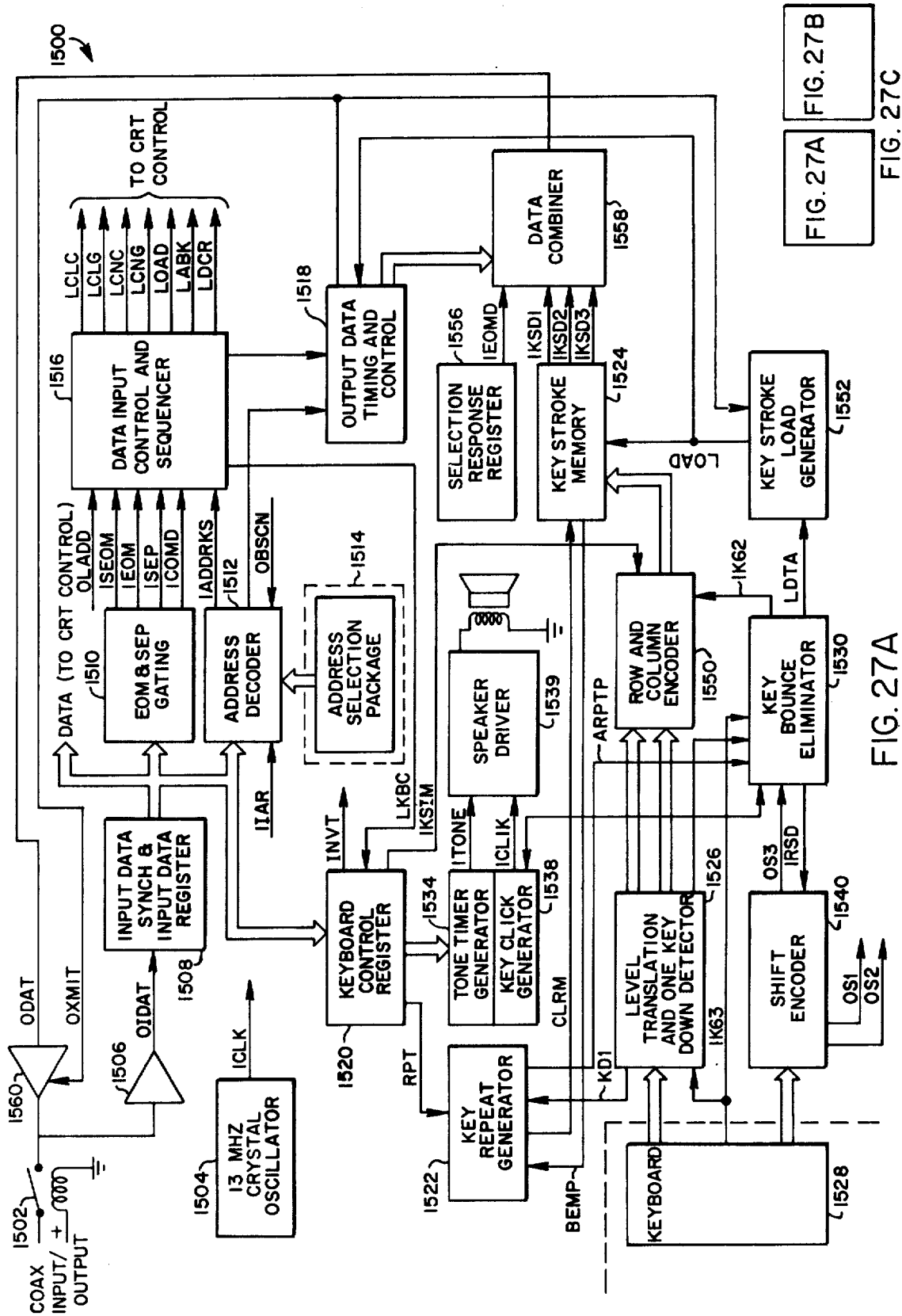

OUTPUT DATA TIMING AND CONTROL 1518

KEY BOUNCE ELIMINATOR 1530

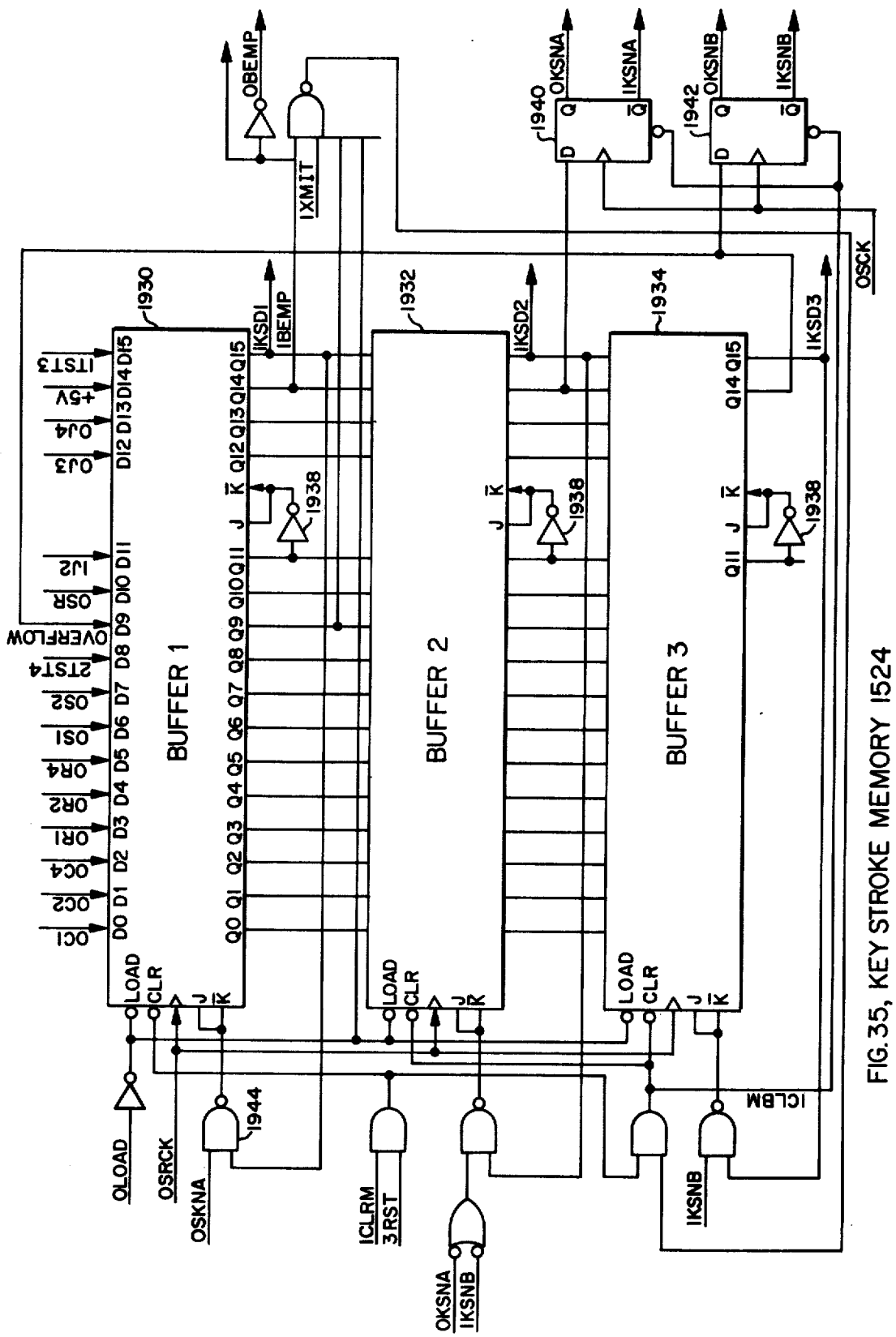
FIG. 35, KEY STROKE MEMORY 1524

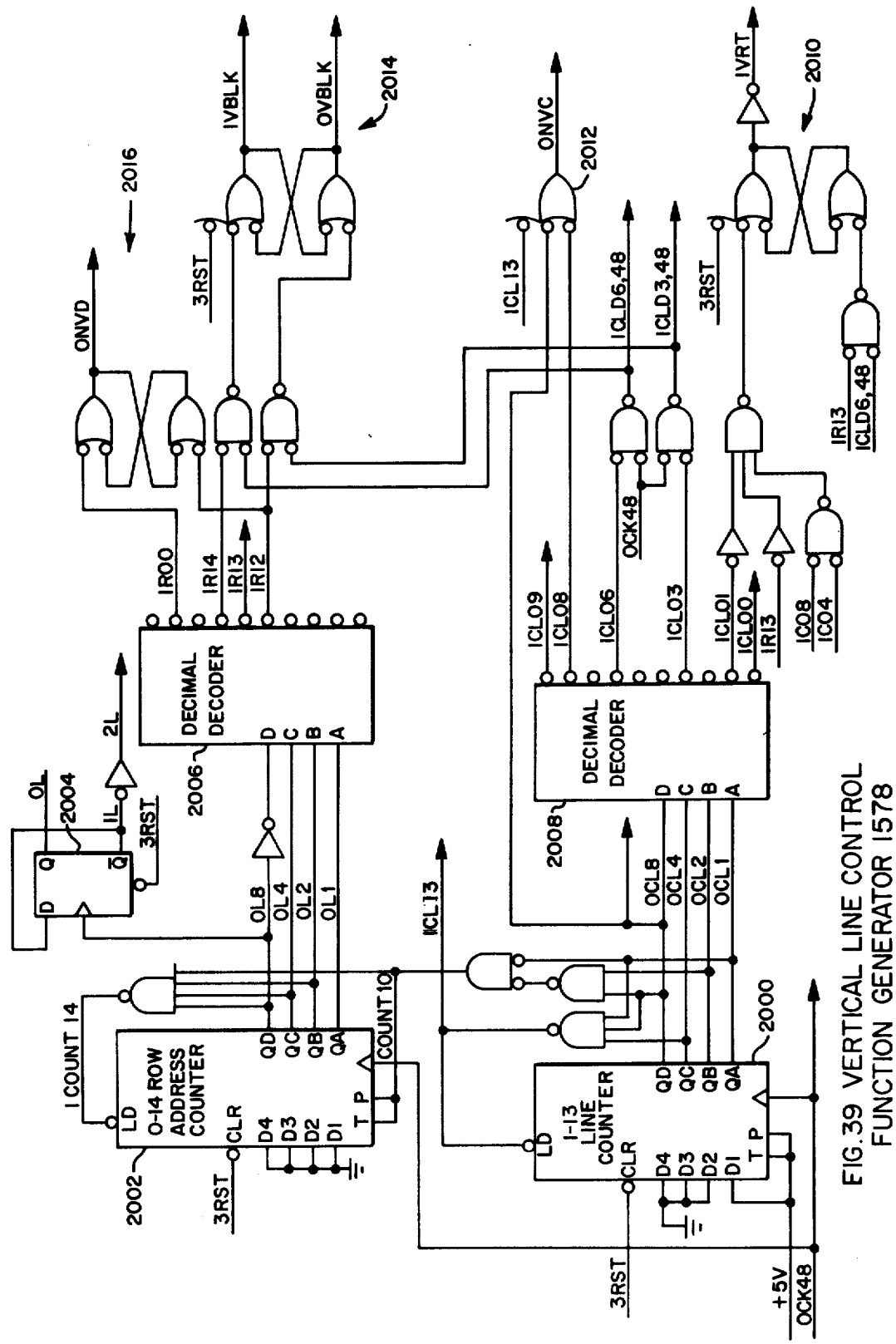
FIG. 39 VERTICAL LINE CONTROL FUNCTION GENERATOR 1578

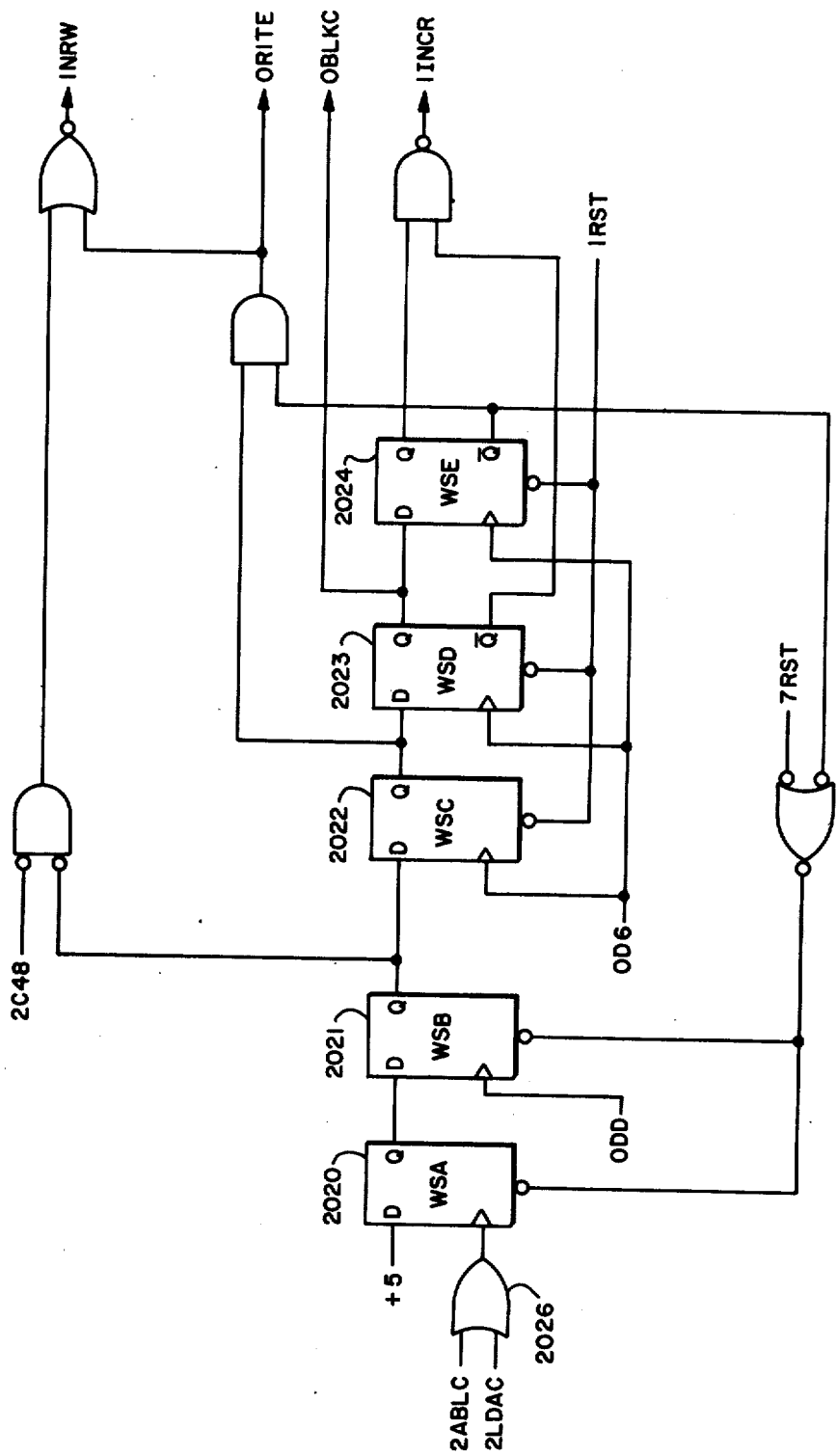

4,064,561

CRT KEY STATION WHICH IS RESPONSIVE TO CENTRALIZED CONTROL

CROSS-REFERENCE TO RELATED APPLICATIONS

This application is a division of application Ser. No. 532,714, filed Dec. 13, 1974 entitled "CRT KEY STATION WHICH IS RESPONSIVE TO CENTRALIZED CONTROL", now assigned U.S. Pat. No. 4,041,469 and which is related to an application entitled "PERIPHERAL PROCESSING SYSTEM," by A. K. Jennings, Ser. No. 532,636, filed Dec. 13, 1974, now assigned U.S. Pat. No. 4,047,158.

BACKGROUND OF THE INVENTION

1. Field of the Invention

This invention relates to a keyboard entry terminal and more particularly to a CRT key station including circuitry for responding to operation commands from a central processing unit and circuitry for providing a configuration code indicating one of a plurality of available key switch configurations with each key stroke character word.

2. Description of the Prior Art

Keyboard entry systems are known wherein a plurality of CRT key stations are connected to a common central processing unit. The central processing unit receives a keyed character, processes the character, and stores the character in a suitable location for assembly of a data record. However, hardware is often duplicated at each separate key station which performs functions that could be performed by the central processing unit with centralized control.

For instance, key click signal generators and audible tone warning systems must include circuitry for detecting appropriate conditions and generating audible signals in response thereto. If automatic repeating of continuously actuated keys is implemented, automatic repeat keys must be hardward selected or a separate program must be entered into the key station for each data entry job to define which keys are to be automatic repeat keys.

Furthermore, a different hardware design must be provided for each different keyboard configuration. Taking into account the various languages of the world, typewriter configurations, calculator configurations, and keypunch configurations, a large number of different hardware designs must be manufactured, carried in inventory and kept track of. The differences in the various keyboard design configurations result in a given central processing unit being connectable only to one key switch configuration at a time. Such systems thus become rather limited as to the scope of data entry functions which can be efficiently performed.

SUMMARY OF THE INVENTION

A versatile, simplified CRT key station in accordance with the invention includes a keyboard with key switches arranged in a predetermined matrix with character designations assigned to the key switches in any desired order, circuitry for including a configuration code in each transmitted key stroke message, and audible tone circuitry and automatic repeat circuitry responsive to centralized program control.

Each key station is connectable to a peripheral processing system via a bidirectional coaxial cable. Each key station is assigned a unique address code to permit differentiation of each key station from the others. A polling or selection message from the processing system includes an address code to identify the recipient of the message. A polling message invites an addressed key station to respond with a key stroke message with any key stroke message being assumed to emanate from the most recently polled key station. A selection message may include control information for enabling audible tones and automatic key stroke repeating as well as CRT display update information.

As data keys on the keyboard are actuated, character codes are entered into a three character, first-in-first-out buffer memory. The character code is assigned in accordance with the position of a given key switch matrix and is independent of any character designation which may be assigned to the key switch. If the key stroke buffer stores a key stroke character at the time a polling message is received, a response message is assembled which includes a configuration code, selected key station status information and one key stroke character. After the response message is serially transmitted over the coaxial cable the processing system utilizes the configuration code to identify an appropriate table for conversion of the key stroke character to a standard data processing code such as EBCDIC.

A versatile data entry system may thus be assembled from a plurality of key station terminals having the same hardware configuration but different key switch character assignment configurations. The audible tone and automatic repeat circuitry not only permit centralized program control over audible tones and automatic repeating, but also avoid the expensive duplication of much complex circuitry at each different CRT key station.

BRIEF DESCRIPTION OF THE DRAWINGS

A better understanding of the invention may be had from a consideration of the following detailed description taken in conjunction with the accompanying drawings in which:

FIG. 2 is a functional block diagram representation of a central processing unit shown in FIG. 1;

FIGS. 4A, 4B and 4C are a functional block diagram representation of a key station multiplexer shown in FIG. 1;

FIG. 5 is a functional block diagram and schematic representation of a sequence controller portion of the key station multiplexer shown in FIG. 4;

FIG. 7 is a functional block diagram and schematic representation of a time out generator which forms a portion of the key station multiplexer shown in FIG. 4;

FIG. 8 is a functional block diagram and schematic representation of a serial output sequencer which forms a portion of the key station multiplexer shown in FIG. 4;

FIG. 13 is a functional block diagram and schematic representation of driver buffer circuits for driving coaxial cables which form a portion of the key station multiplexer shown in FIG. 4;

FIG. 14 is a functional block diagram and schematic representation of an R.O. output response sequencer used in the key station multiplexer shown in FIG. 4;

FIG. 15 is a functional block diagram and schematic representation of R.O. output registers and drivers used in the key station multiplexer shown in FIG. 4;

FIG. 23 is a functional block diagram and schematic representation of a bus request interrupt processing portion of bus interface logic which forms a portion of the key station multiplexer shown in FIG. 4;

FIG. 24 is a functional block diagram and schematic representation of bus data control which forms a portion of the bus interface logic for the key station multiplexer shown in FIG. 4;

FIG. 26 is a functional block diagram and schematic representation of a bus data output multiplexer portion of bus interface logic which forms a portion of the key station multiplexer shown in FIG. 4;

FIGS. 27A, 27B and 27C are a functional block diagram and schematic representation of a key station shown in FIG. 1;

FIG. 35 is a functional block diagram and schematic representation of a key stroke memory which forms a portion of the key station shown in FIG. 27;

FIG. 36 is a functional block diagram and schematic repressentation of a selection response register which forms a portion of the key station shown in FIG. 27;

FIG. 39 is a functional block diagram and schematic representation of a vertical line control function generator which forms a portion of the key station shown in FIG. 27; and FIG. 40 is a functional block diagram and schematic representation of a precharge and chip enable sequencer which forms a portion of the key station shown in FIG. 27.

TABLE OF CONTENTS OF DETAILED DESCRIPTION

I. Peripheral Processing System
II. System Data Bus
   A. Memory Address Lines
   B. Data Lines
   C. Memory Cycle Control Lines
   D. Memory Defer
   E. Bus Master and Interrupt Controls
III. Central Processing Unit
IV. Key Station Multiplexer
V. CRT Key Station
   A. Input Data Synchronizer and Register 1508
   B. Data Input Control and Sequencer 1516
   C. Output Data Timing and Control
   D. Key Repeat Generator 1522
   E. Key Bounce Eliminator Circuit 1530
   F. Key Stroke Memory 1524
   G. Selection Response Register 1556
   H. Data Combiner 1558
   I. Horizontal Line Control Function Generator 1574
   J. Vertical Line Control Function Generator 1578
   K. Write Sequencer 1590
   L. Precharge and Chip Enable Sequencer 1596

DETAILED DESCRIPTION

I. Peripheral Processing System

Figure 1:
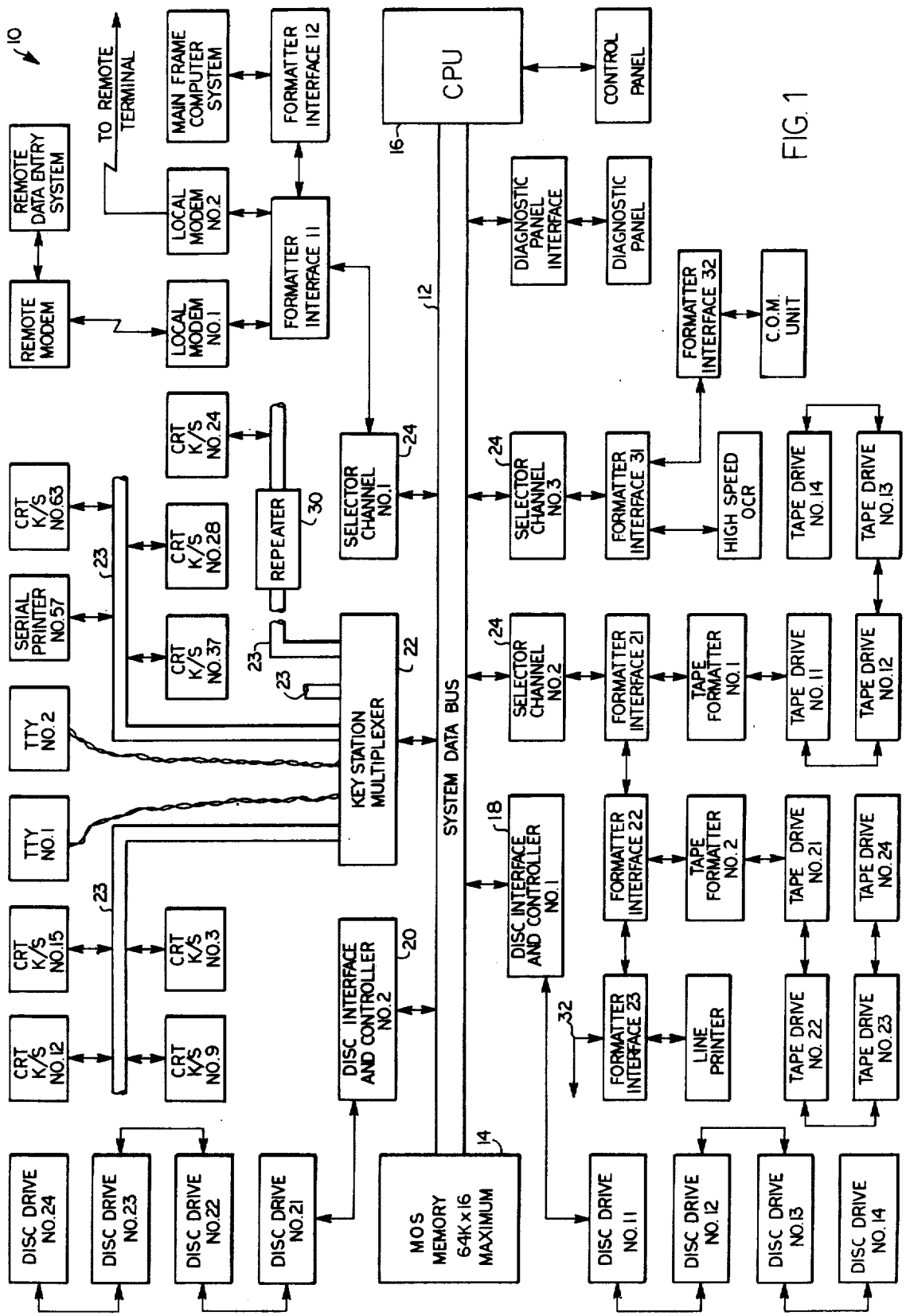
FIG. 1 is a functional block diagram representation of a peripheral processing system in accordance with the invention.

As shown in FIG. 1 the peripheral processing system 10 includes a system data bus 12 and an MOS random access memory 14, a central processing unit 16, two disk interface and controller units 18, 20, a key station multiplexer 22 and a plurality of selector channels 24 all connected for communication along the system data bus 12. The disk interface and controller units 18, 20 each control up to four daisy chained disk drives identified as numbers 11–14 and numbers 21–24. Each disk drive includes two magnetic memory disks, one being fixed and the other being removable, to provide a maximum of 16 possible disks for the peripheral processing system 10.

The key station multiplexer 22 connects a data terminal subsystem to the system data bus 12. The multiplexer 22 is connectable to up to 64 individually selectable data terminals having predetermined mutually exclusive addresses. The first two addresses, address 0 and address 1, are hardware assigned to two sets of twisted wire pairs which are connectable to RO-33 teletype printers. These are identified in FIG. 1 as TTY No. 1 and TTY No. 2. In the event that one of these teletype printers is not connected, the address thereof may be assigned to another data terminal unit. The up to 62 additional data terminal units are assigned addresses 2–63 and are connectable to the multiplexer 22 through any one of up to 4 parallel, bidirectional coaxial cables 23. Each data terminal communicates bidirectionally with the multiplexer 22 through a single coaxial cable connected thereto. The data terminals may be connected to a coaxial cable 23 without regard to address sequence or position along the cable. Information is transmitted and received over the four coaxial cables 23 by the multiplexer 22 without distinguishing the cables one from another. The use of four different cables permits the data terminals connected thereto to be physically dispersed in all directions from the multiplexer 22 without need for excessively long cables whch would be required if a single cable were to connect a group of terminals on one side of the multiplexer 22 and then doubled back to connect another group of terminals on the other side of the multiplexer 22. The coaxial cables 23 are normally up to 1,000 feet in length and the use of bidirectional repeater circuits 30 between each 1,000 foot section permits a coaxial cable 23 to be extended in length to 6,000 feet.

A variety of data terminals may be connected to the coaxial cables 23 and these are shown in FIG. 1 as including CRT key stations bearing an appropriate mutually exclusive address identification and a serial printer also bearing a mutually exclusive address identification number. Each of the CRT key stations, which includes a cathode ray tube for optical display and a keyboard for the entry of data into the peripheral processing system 10, is a unit for converting between machine usable and human recognizable information forms.

The repetition of hardware circuitry at each of the CRT key stations is reduced by utilizing the software capability of the peripheral processing system 10 to control the operation of the CRT key stations to a great extent. For instance, each key station has buffer storage for only 3 keyed characters, relies upon CPU initiated commands transmitted through the multiplexer 22 and over the coaxial cables 23 for control functions such as automatic repeat enable for continuously activated keys and audible tone generation; and displays only information received over a coaxial cable 23 on the cathode ray tube. Hardware for transmitting keyed data characters is minimized by transmitting a character code, which is easily derived from the keyboard configuration and which is independent of the meaning of characters assigned to each key, along with a three bit code identifying one of eight possible arrangements for assigning data characters to particular keys, over a coaxial cable 23 to the key station multiplexer 22. This code is then utilized by the processing system 10 to identify a conversion table which is used to convert the data terminal keyboard code to a standard data processing code such as ASCII or EBCDIC. This technique permits a single type of keyboard to be utilized for a variety of data configurations simultaneously within a single data terminal subsystem. For instance different CRT key stations may have typewriter, calculator or keypunch numbering configurations. Alternatively, foreign keyboard configurations or special function keyboards may be simultaneously used within the same system without need for separate hardware arrangements.

The data terminals which are connected to multiplexer 22 through the coaxial cables may also include serial printers of which one is shown in FIG. 1 bearing address No. 57. The serial printers may be associated with each CRT key station to make hard copies of all data keyed by keyboard operators, positioned only at supervisor terminals, or used in any other desired arrangement to make hard copies of data processed by the peripheral processing system 10.

A plurality of selector channels, three being shown in FIG. 1 by way of example, serve as in/out channels for the coupling of peripheral units to the periheral processing system 10. This coupling capability makes the peripheral processing system 10 an extremely sophisticated and powerful system without the requirement of a large, extremely expensive mainframe memory. Each selector channel may be connected to a plurality of daisy chained interface circuits, each of which in turn connects to a peripheral unit. In the system 10 shown in FIG. 1 selector channel No. 1 serves as an external communications channel. The formatter interface No. 11 which is directly connected to selector channel No. 1 is connected to a pair of modulator-demodulators, commonly known as modems. These modems may be connected through communication channels such as an ordinary telephone line or high frequency channels to remote modems which in turn connect to remote data processors. The remote data processor may be a remote data entry system as shown in FIG. 1 which may include a single data terminal, a key to tape system, or even another peripheral processing system similar to the system 10. Local modem No. 2 is shown as being coupled through communication channel 2 to another, but not identified, data processor.

A second formatter interface No. 12 is daisy chain coupled through the first formatter interface to selector channel No. 1. In this arrangement the peripheral processing system 10 might be used to collect and perform an initial processing on collected data and then transfer the data to the mainframe computer system for integration into the main large capacity data banks of the mainframe computer system. As an example, data relating to payments of customer accounts might be entered through the peripheral processing system 10, initially processed by accumulating subtotals from various categories such as daily payments and types of accounts, arranged in order of account number and then transferred to the mainframe computer system for integration into the information stored in the data banks. In this way, the much more valuable time of the mainframe computer system is utilized in activities where access to the large computer system is required and not wasted on data processing activities that can be performed by the much less expensive peripheral processing system 10.

Selector channel No. 2 is coupled through a first formatter interface No. 21 to a tape formatter No. 1 which in turn couples to four daisy chained magnetic tape drive units numbered 11-14. The first formatter interface No. 21 is also daisy chained to a second formatter interface No. 22 which couples through a tape formatter No. 2 to a second set of digital magnetic tape drive units numbered 21-24. A third formatter interface No. 23 is daisy chained through the second formatter interface No. 22 and couples a line printer into the peripheral processing system 10. The line printer permits a rapid output of data processed by the peripheral processing system 10. Additional formatter interface units may be daisy chain coupled through formatter interface 23 as indicated by arrow 32 but are not implemented in the configuration of FIG. 1. A selector channel No. 3 is also connected to the system data bus 12 and couples a high speed optical character reader (OCR) and a computer output microfilm (COM) unit into the peripheral processing system 10 through daisy chained connected formatter interfaces No. 31 and No. 32 respectively.

II. System Data Bus

The system data bus 12 provides parallel communication between the memory 14, central processing unit 16, disk interface and controller units 18, 20, the key station multiplexer 22 and a plurality of selector channels 24. The transfer of signals along the bus 12 is bidirectional in most instances and is coordinated by the central processing unit 16. Whenever information is transferred along the bus 12, a single device is always the master and all communications take place between this master and another device referred to as the slave. The central processing unit 16 controls the assignment of the bus mastership on a priority basis and retains the bus mastership in the absence of an assignment to another unit. Special bus control logic within the central processing unit 16 senses bus control requests to become bus master and grants bus control to the requesting device having the highest priority. The process of resolving simultaneous requests for bus control may overlap a memory cycle during which data is transferred over the bus so that the question of which device will be the next bus master can be resolved prior to the completion of a current memory cycle.

During each memory cycle all possible slave devices monitor the memory address lines of the bus to determine which slave is being addressed by the master. The memory 14 is always a slave, the CPU 16 is always a bus master having residual bus control, and the other units which are directly connected to the bus 12 may be either a master or a slave.

During a data transfer along the systems data bus 12, the bus master has the burden of taking into account any time delays that may be required for the slave to logically decode memory address signals or to compensate for skew of bus signals. For instance, during a read cycle, a slave may present data signals with nominally the same timing as a memory acknowledge pulse signal (MACK) which strobes these data signals. This means that the slave device may simultaneously present all of these signals to the input of their respective bus driver circuits and the time delay required for these signals to reach the bus master may not be identical in all cases. These signals would therefore appear on the bus with nominally identical timing, but the actual time relationship between them may vary due to the different delays of the bus drivers and the bus line. Each bus master must take this into account when sampling the data lines.

A bus master may make a direct memory access (DMA) at any time without waiting for the end of an instruction within the CPU program sequence. This direct memory access activity occurs on a cycle stealing basis. After a direct memory access request is recognized by the bus control logic, bus control is transferred to an in/out (I/O) device between central processing unit (CPU) memory cycles. Several direct memory access cycles may occur successively before the central processing unit 16 regains control over the bus, since the central processing unit 16 has the lowest priority of all devices connected to the bus 12.

A priority interrupt structure permits the central processing unit program being executed to be interrupted at the completion of execution of any instruction. This interrupting process is controlled by an "enable interrupts" flip-flop and also by individual arming flip-flops for each of the external priority levels. There are four levels of external interrupt priorities as well as several levels of internally generated interrupt signals. Signals are transmitted along the bus in their negative logic or complement form. That is, a "1" or "on" signal has a low potential of approximately 0 volts, while a "0" or "off" signal has a high voltage potential of approximately +5 volts. A "master protect" signal is an exception which has a high voltage potential so long as the system power source is adequate.

The system data bus 12 comprises 61 separate, parallel conductors or lines which include 17 memory address lines, 18 data lines, 6 memory cycle control lines, and 20 system control lines.

A. Memory Address Lines

The memory address lines are designated A00-A16 with line A15 designating the least significant bit of a memory address location and line A16 sometimes designating which byte of an accessed memory word is to be changed. A "1" on line A16 designates the right byte of data, D08-D15, while a "0" on the line A16 designates the left byte of data, D00-D07, if a signal on a memory cycle control line "MHLF" is true or in the "1" state. The "MHLF" signal indicates that only one byte of memory is being changed and address line A16 is ignored unless this MHLF signal is true. The address line signals are established on the address lines of the bus master before the beginning of a memory cycle and are maintained until the nominal end of the memory cycle.

B. Data Lines

Data lines D00-D15 designate the contents of a 16 bit data word being transferred to or from the bus master. During a memory write cycle the bus master generates the data signals and their timing is approximately concurrent with that of the memory address lines. During a memory read cycle the signals on the data lines are generated by the addressed slave after it has accessed the addressed memory word. The data lines also include a pair of parity lines labeled DPR and DPL, meaning data parity right and data parity left. Signal DPL produces odd parity over the left data byte, D00-D07 plus DPL, while DPR produces odd parity over the right data byte, D08-D15 plus DPR. A memory cycle control line "DPN" may be activated to indicate that the DPR and DPL signals do not represent significant information when no parity bits are being generated. The parity bits are normally generated by the master during a write cycle and by the slave during a read cycle.

C. MEMORY CYCLE CONTROL LINES

A memory cycle timing signal MCYC is generated along with the memory address lines (and data lines during a write cycle). Signals MWRT and MHLF must be previously established. MCYC is initiated only when MACK and MDEF are both "off" and is terminated after the memory acknowledge signal, MACK, has been "on" for a predetermined minimum time sufficient to eliminate any skew on the data lines and the data lines have been sampled if a read cycle is in process.

The memory write signal, MWRT, is in the "1" state to indicate a write cycle and in the "0" state to indicate a read cycle. This signal is initiated by the bus master.

The memory half signal, MHLF, is energized by the bus master during a write cycle when only half of the addressed word is to be rewritten. Address line A16 then indicates which half is to be written, where the "1" designating a right byte (the D08-D15) and a "0" designating a left byte (the D00-D07).

No data parity, DPN, is energized along with the data lines when these lines do not contain significant parity bits. When the CPU is initiating bus data signals the DPN signal is always true and causes parity generating logic of the CPU to generate the parity information on DPL and DPR before the data parity is actually written.

Memory Acknowledge, MACK, controls the timing interlock between master and slave. During a write cycle the slave generates a "true" MACK signal after the master generated MCYC signal is "on" and after the memory address lines and data lines have been sampled by the slave and the presence of the signals thereon are no longer required. During a read cycle the slave generates the MACK signal after the master generated MCYC signal is "on" and the contents of the addressed word are established on the data lines. MACK provides a closed loop control of the memory cycle timing which enables any speed of slave device to be used with the same control logic.

D. MEMORY DEFER

The memory defer signal, MDEF, is an optional control signal that may be generated by a slave when the central processing unit is known to be the master. The MDEF signal is interpreted by the central processing unit as an indication that the memory cycle being initiated, or about to be initiated, must be deferred until the MDEF signal is removed. When the MDEF is "on", the slave device must not generate a MACK signal until MDEF is removed and a new memory cycle is initiated. The MDEF signal allows a timing interlock between the CPU master and a slave I/O controller or selector channel. If the CPU attempts to read a device status information before the controller has collected it, the controller can issue the MDEF signal and defer the CPU read operation until the status information is available. When the MDEF signal is generated, the central processing unit will continue to honor bus request for direct memory access transfers by other in/out devices. This technique allows an in/out device to make a central processing unit program wait, but does not prevent other devices from transferring data to or from the main memory 14 during the wait period.

E. BUS MASTER AND INTERRUPT CONTROLS

There are 13 bus master and interrupt control lines which coordinate the process of transferring control of the system data bus 12 from one device to another. Bus control and program interrupts are accomplished by a system of assigned priority bus request program interrupt levels. The priority level of each device is hardware assigned by clipping leads on interchangeable "generating circuits" and the program interrupt levels are software controlled. There are three bus request lines, BR2-BR4, which may be energized by one or more in/out controllers. Bus request signal BR2 has the lowest priority and BR4 has the highest priority. The central processing unit has a priority even lower then BR2 and all bus request signals have a higher priority than any of the program interrupt requests.

There are four external interrupt request signals, INR1-INR4, and five internally generated interrupt request signals. These signals are interpreted by the central processing unit as a request by the issuing device to designate the location of an interrupt vector when the central processing unit has completed executing an instruction and would otherwise begin executing anoyther instruction. The designated interrupt vector represents the address of the initial instruction of a program or routine for processing interrupt requests for the requesting device. Neither external nor internal interrupt requests will be honored while the central processing unit program has disabled all interrupts by a special instruction, and none of the external interrupt requests, INR1-INR4, will be honored unless an independent arming flip-flop associated with each level is set to the "on" state to enable that level. Whenever one or more interrupt requests are received on levels that are armed, each of these levels is compared with the current processor level. The highest enabled interrupt request that has a priority level greater than the current processor level will be honored when the execution of the current central processing unit instruction is complete. After completion of the execution of the current CPU instruction, and after pending bus requests are honored, the bus control logic will grant the interrupt requester permission to respond with a vector location. The central processing unit signals a requesting device that an interrupt cycle is being initiated by issuing an interrupt signal, INTR. This signal, which immediately follows a grant to a requesting device to designate an interrupt vector location, is generated during an interrupt cycle and also signals the requesting device that the interrupt cycle is terminated.

A grant out signal, GRO, is generated by the central processing unit has a timing signal which commands a requesting device to place the address of the device interrupt vector on the data lines. Before the GRO signal is generated, however, the central processing unit generates a binary coded address signal corresponding to the interrupt request level of the device whose interrupt is being honored and an interrupt signal indicating whether an interrupt or bus request is being honored. Because more than one requesting device may be assigned the same priority level, the GRO signal is daisy chained through the various devices which are connected to the system data bus 12. The GRO signal is designated grant in, GRI, as it is received by a device. If the device does not have the same priority level as the grant interrupt or if the device is not currently requesting an interrupt, the GRI signal is output as another GRO signal to the next device along the chain. In this way any conflict that may result from two devices having the same priority level making a simultaneous interrupt request is resolved by granting the interrupt to the device which is closest to the processor along the chain.

Upon receiving a grant signal which matches a request in both type and priority, a potential master which is requesting bus control initiates a grant acknowledge signal, GACK, which indicates that the new bus master or interrupt requestor has received the grant out pulse. In the event of a request for bus control, the central processing unit discontinues the grant out signal, GRO/GRI, and the new master takes control of the bus at the trailing edge of the signal. The new bus master then continues to keep the GACK signal energized for so long as it wishes to retain the right of a bus master to initiate another memory cycle. As soon as the last memory cycle is initiated, the GACK signal may be discontinued and bus control will be transferred to a new master at the completion of the memory cycle. While this interlocking arrangement permits a bus master to make multiple direct memory accesses for each grant of bus control, in practice the potential bus masters are normally designed to make only one direct memory access for each grant of bus control and then relinquish bus control while information received from memory during the direct memory access is processed. A new bus request is then initiated each time a new word is to be read from or written into memory.

The central processing unit generates a grant interrupt signal, GINT, to indicate whether an interrupt or a bus request is being honored. The bus line carrying the GINT signal is driven low or true to indicate that an interrupt request is being honored. The line is driven high or false to indicate that a bus request is being honored.

A pair of binary coded grant address, GA1 and GA2, signals are generated by the central processing unit to indicate the priority of the request which is being honored, whether it be a bus request or an interrupt request. As explained above, when two or more potential bus master units are making the same type of request on the same priority level, the unit which is closest to the central processing unit along the daisy chained GRO/GRI grant signal will act upon the granted request.

The interrupt cycle signal, INTR, indicates that a special memory cycle is taking place as the last step of an external interrupt sequence. The central processing unit first issues the GRO signal to grant a requesting device permission to designate an interrupt vector location and then during the last step of the interrupt sequence the INTR signal is generated to command the I/0 controller to generate the address of a word pointing to the address of the first instruction in the interrupt program. As soon as the GRO signal is received, the device requesting permission to designate an interrupt vector prepares to generate the address on the bus data lines. The subsequently issued INTR signal has the same timing requirements as the MCYC signal except that the INTR signal indicates to the memory 14 that the CPU is reading a location appearing on the data lines and that the state of the address lines is not significant. The location of the interrupt vector is read from the data lines and then transferred to the address lines by the central processing unit as execution of the designated interrupt subroutine is executed.

A master protect signal, MPRT, is generated by the central processing unit power supply to indicate the adequate power is available for system operation. During normal operation MPRT is at a positive potential and supplies a significant amount of current to each of the discrete input circuits that moniter this bus line. Whenever MPRT goes low or becomes unable to supply the requisite current level, it serves as a warning to all monitoring circuits of an impending power failure. This causes all circuits to ignore subsequent bus signals and tells them to protect their memory elements from extraneous signals during the power failure.

Three protection key signals, PRK0 through PRK2, provide a three bit binary protection code which prevents the inadvertent destruction of data or unauthorized access to the operating system software and data stored in memory when the peripheral processing system is being shared by multiple programs. Each section of main memory 14 may be assigned a "storage key" code and a similar "protection key" code may be provided in each active program to permit writing into the memory. When the "storage key" does not match the "protection key", a write operation into the accessed section of memory would be disabled. When the central processing unit is bus master the "protection key" signals are driven by bits 9, 10 and 11 of a 16 bit processor status word (PSW) register. When the central processing unit is not bus master, the three memory protection signals are all driven to the zero state, thus designating a supervisor state. The memory 14 may also include a "fetch protection bit" along with the "storage key." If the fetch protection bit is set to "0", protection only applies to a store operation. However, if the fetch protection bit is set to "1", then the protection applied to a read operation as well as to store operation. In this manner confidential data files may be protected from unauthorized access by another user's program. When bus control is transferred to another master the "protection key" is driven to the 000 state. This designates a supervisor state enabling all areas of protected storage, permitting the assignment of "protection keys" to each user by writing appropriate codes into the PSW register or into vector stored in a supervisor block of storage, and indirectly, to assign and write storage keys into the corresponding storage blocks. In another supervisor state designated by 001, the "storage key" and "fetch protection bity" of any storage block may be changed. As a storage key is written into the memory 14 while in a supervisor state where MPTR equals 001 the "fetch protection bit" is taken from data line 12 and the "storage key" is taken from data lines 13, 14 and 15. The storage protection key for any block of data may be changed while in the 001 supervisor's state by addressing any word within the block while the appropriate "storage protection key" appears on the appropriate data lines 12-15. The memory 14 is arranged to permit a different "storage protection key" to be utilized for each block of 1000 addresses.

The system data bus also includes an in/out reset signal, IORS, which is generated by the central processing unit during a master protect and when an in/out reset instruction is executed. The IORS signal is used to initialize all in/out control circuits.

A crystal derived 4 MHz timing reference signal, XTL4, is also provided on the system data bus for use by in/out device controllers or selector channels.

Except for the memory protect signal, MPRT, all signals on the bus have a low potential of between 0 volts and 0.4 volts when energized or in the "on" or "true" state and a high potential of between 2.4 volts and 5.2 volts when inactive, or in the "off" or "false" states. The high potentials are produced by bus terminating networks at each physical end of the bus and the low potentials may be produced by an open collector TTL driver connected thereto.

III. CENTRAL PROCESSING UNIT

As shown in the generalized blocked diagram of FIG. 2, the central processing unit (CPU) 16 is a 16 bit parallel processor having a microprogrammed control section 52 controlling the data sequencing within the operating portion 54 of the CPU 16. In addition to the operating portion, the CPU 16 includes a diagnostic panel 20 interface 56 and a diagnostic panel 58 for detecting and locating malfunctions in the peripheral processing system 10. A control panel 60 provides operator control over the operation of the CPU 16.

The processing unit of the CPU includes a plurality of registers and logic units operating under control of the microprogrammed control unit 52 in a conventional manner. An address register 62 operates in conjunction with a program address counter 64 to control the addressing of memory locations within the peripheral processing system 10 and to control the sequencing of programmed operation. There are eight internal in/out registers 66 having hexadecimal address locations $FFF8-FFFF_{16}$. Throughout this disclosure address locations will be represented in a hexadecimal number code wherein for each character position the number 0 through 9 is equivalent to decimal number 0 through 9 and letters A through F are equivalent to decimal numbers 10 through 15, respectively. In addition to the eight memory locations assigned to the internal I/O registers 66, 248 memory locations, locations $FF00-FFF7_{16}$, are available for assignment to bus connected units as optional in/out registers. Communications with the bus connected units, such as the disk controllers 18, 20, the selector channels 24, and the key station multiplexer 22 are through these external in/out registers. For instance, the CPU sends a selection message to a CRT key station such as CRT key station No. 9 by placing the address number of the CRT key station along with the message in memory 14. The CPU 16 then places information in predetermined in/out registers of the key station multiplexer 22 indicating the location of the first word of the message and the number of bytes in the message. With this information the key station multiplexer 22 can act independent of the CPU 16 to read the message from memory 14 and transfer the information to CRT key station No. 9.

Priority control circuitry 68 controls the granting of bus and interrupt requests. An arithmetic logic unit 70 provides necessary arithmetic and logic functions for the processing of data by the CPU. Address locations $0000-0004_{16}$ are assigned to five general registers 80–84 designated A, B, X, S, and PSW respectively. The A register 80 serves as a general purpose register and accumulator, the B register 81 serves as a base address register for base addressing operations, and the X register 82 serves as an index register for indexing operations. The S register 83 serves as a stack pointer for a last in first out stack which is maintained in main memory 14. Address locations $0005-FEFF_{16}$ are actual locations in main memory 14 and the first word placed into an empty stack may be positioned at any location in main memory. As additional words are placed on the stack the address is sequentially decremented until the stack overflows upon reaching an address stored at memory location $00FF_{16}$. Upon reaching a stack overflow condition four more storage locations must be available for the storage of two words which caused the overflow and for the storage of two additional words which are stored before fetching the interrupt vector for the stack overflow routine. Normally the overflow or top of a full stack is chosen at location $0154_{16}$ permitting the stack overflow to extend down as far as location $0150_{16}$. System interrupt vectors may then be safely stored in locations $0100-014F_{16}$. Register PSW 84 stores a processor status word which keeps track of the current processor status. The four left most or most significant bit positions, bits 0–3 are utilized to automatically monitor operations of the arithmetic logic unit 70 and preserve results for future operations, such as instructions causing a subsequent instruction to be skipped under specified conditions. Bit position 0 is designated the V bit and is set to the "1" state when an operation results in an arithmetic overflow and is reset to a "0" state when an arithmetic operation does not result in an overflow. Bit position 1 is designated position "C" and is set to the "1" state whenever an arithmetic operation results in a carry or borrow from the most significant bit. The number 2 bit position of the PSW register 84 is designated the Z bit and is set to "1" state whenever the result of an arithmetic operation is equal to zero. Similarly, the fourth or "N" bit position is set to the "1" state whenever the result of an arithmetic operation is negative. In the signed two's complement binary negative number representation used in the CPU 16, a "1" at the most significant bit position indicates a negative number. Bit positions 4, 5 and 6 of the processor status word indicate the current priority level of the central processing unit 16 and bit positions 7 and 8 are always constrained to be 0. The 3 bit code of the current memory protection key is stored at bit positions 9, 10 and 11 and bit positions 12, 13 and 14 are constrained to be 0. Bit position 15 is designated bit "T" and is a trace bit which is set or cleared under program control and may be used in program debugging. If the T bit is set, when an instruction is fetched from memory a processor trap occurs upon completion of execution of the instruction. A processor trap is actually a special interrupt during which the normal execution of instructions is terminated and a special service routine specified by a two word interrupt vector at one of a set of fixed locations is executed. A different routine is provided for each processor trap. Other processor traps include power failure, bus parity error, bus time out error, stack overflow, real time clock time out, use of the emulate instruction, and use of a reserved instruction which has not been implemented. In addition to the five addressable hardware registers 80–84, a W register 86 and a T register 88 provide two additional general purpose hardware registers for temporary storage and are accessable only through microprogram instructions.

IV. Key Station Multiplexer

Figure 3:
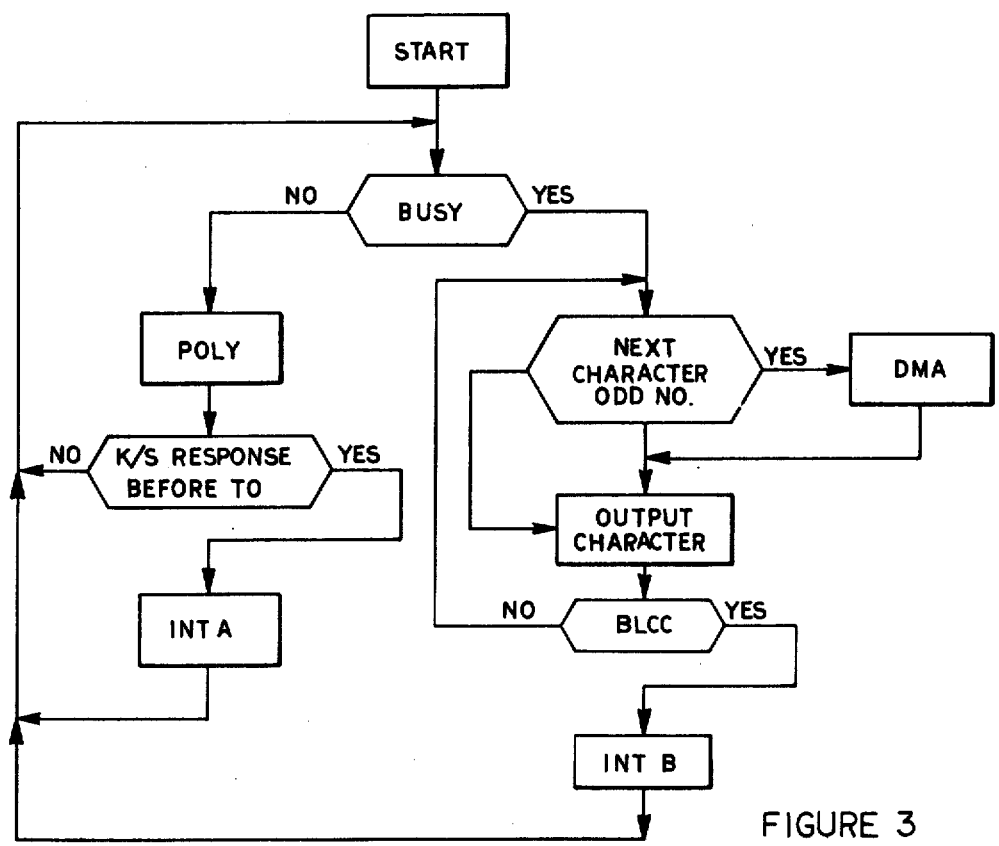
FIG. 3 is a flow chart illustrating the manner of operation of a key station multiplexer shown in FIG. 1.

Referring now to FIG. 1, the key station multiplexer 22 (KMUX), is a potential bus master which serves as a traffic coordinator between the operating software of the peripheral processing system 10 and the primarily keyboard oriented data terminals. As illustrated in FIG. 3 the KMUX 22 is designed to continuously cycle through repetitive sequences. At the start of a cycle the KMUX 22 determines whether or not a busy signal is present. A busy signal is generated when the CPU 16 commands the transfer of a selection message to a data terminal. The CPU 16 first stores the selection message in the memory 14 and then writes the beginning address of the selection message and the two's complement of the total number of eight bit bytes in the selection message into predetermined external in/out registers in the KMUX 22. The storage of this negative number in the KMUX in/out register causes the busy signal to be generated.

If the busy signal is present the KMUX 22 begins a selection sequence. If the sequential number of the next character to be output to a data terminal is odd as in the case of the first, third, fifth etc. characters, the KMUX 22 requests and executes a direct memory access during which a two byte word is obtained from memory 14. The KMUX outputs the first character to the data terminal and then determines whether or not all characters have been processed by determining whether or not a block length count complete signal is present. If the signal is not present the selection message contains at least one more character and the sequence returns to determine whether or not the next character is of even or odd number. The second character is of even number and is represented by the second byte of the previously accessed word. The second byte is output to the data terminals and the presence of the block length count complete signal is again tested. This cycle continues until the block length count complete signal is generated and the KMUX 22 pauses before generating a type B interrupt request. The interrupt request is generated either upon receipt of a selection response message from the selected data terminal indicating that the entire selection messsage was received without parity error or upon the passage of 32 microseconds without receiving a selection response. As the CPU 16 responds to the interrupt request the KMUX generates an interrupt vector on the data lines which defines the address in memory 14 which in turn contains the address of the first instruction of a subroutine for processing KMUX interrupts. In processing this subroutine the CPU 16 reads a KMUX status register which indicates whether or not this interrupt is a type B interrupt and if so, whether or not a selection response has been received. If a response has been received this response is also read by the CPU 16. The type B interrupt subroutine then causes the CPU 16 to process this information in an appropriate manner to determine what to do next.

As the type B interrupt vector is read from the KMUX 22 the interrupt request generated by the KMUX 22 is reset. When the interrupt subroutine has obtained all of the pertinent information from he KMUX the sequence returns to the cycle start point. At this time the busy signal is no longer present and the KMUX 22 enters a polling cycle. The KMUX 22 polls a selected data terminal by outputting the address of the terminal and waiting for a response. If no response is received within 32 microseconds, a counter is incremented to generate a new polling address and the polling cycle is repeated. This repetition occurs until either a selection cycle is commanded as discussed previously or until a polled data terminal responds to a polling message within the 32 microsecond interval prior to generation of the time out signal. If the key station response occurs before the time out signal, the KMUX 22 requests an interrupt. As the interrupt is processed the KMUX interrupt vector is generated on the data lines to indicate the address in main memory 14 which indicates the location in memory 14 of the first instruction of the routine for processing KMUX interrupts. As the KMUX interrupt routine is executed the CPU 16 reads selected in/out registers within the KMUX 22 to determine the status of the KMUX and thus determines that the interrupt was a type A KMUX interrupt. The content of the polling response message is then read from the KMUX. This information is then processed in an appropriate manner under program control. As the type A interrupt vector is read from the KMUX 22, the interrupt is reset and the KMUX 22 operating sequence returns to the start position to begin the execution of a new cycle when the interrupt subroutine has obtained all pertinent information from the KMUX.

All characters are transmitted by the KMUX 22 to data terminals in a standard 12 bit serial code. Four types of messages may be transmitted over the coaxial cables interconnecting the KMUX 22 and the data terminals. The multiplexer 22 may transmit a single character polling message or a multiple character selection message. Each selection message shall include a first selection address character, a last end of message (EOM) character, and up to 2046 data characters in between. In addition to the two KMUX 22 generated message types there are two substantially similar data terminal generated message types. If a data terminal is ready to send data it may respond to a polling message with a two character response. The first character is a status character indicating the current condition of the polled data terminal and the second character is an optional data character indicating accumulated data, as from a keyboard input. The second data character would normally be included in a polling response and excluded from a selection response. The first character or status character of a selection response would indicate whether or not the preceding selection message was received in its entirety without parity errors.

Characters are transmitted along the coaxial cables interconnecting the KMUX 22 and data terminals in predetermined formats. Each character is transmitted as 12 consecutive serial bits with the first bit always being a one to indicate the beginning of a transmitted character and the twelfth bit always being a zero to guarantee a separation of at least one bit between successive characters. The second bit position of a coax character indicates the type of character in which it is being transmitted, with a one indicating a control type of character and a zero indicating a data type of character. Each KMUX 22 generated message must begin and end with a control character while the data terminals are incapable of generating control character. A one in the character type bit position number two indicates that bit positions three and four contain a two bit code identifying the nature of the control character. The code "10" indicates a polling message in which the message contains only one character and the following six bits in positions five through ten contain a six bit code representing a mutually exclusive address of a polled data terminal. The code "11" in bit positions three and four indicates the beginning of a selection message in which case the mutually exclusive six bit address code of the selected data terminal also appears in bit positions five through ten of the character. A message complete or end of message character is indicated by the code "00" at data bit positions three and four. Bit positions five through ten are filled with all ones in the event of an end of message signal. A separating character identical to the end of message character except for a zero in the number two bit position permits the separation of a selection message into separate parts without terminating the message. The character type code "01" in bit positions three and four have not been implemented and are reserved for future use. The eleventh bit position of each coaxial cable character is a parity bit providing even parity over the first eleven bits of the character.

When polling, the KMUX 22 transmits a polling character, waits 32 microseconds for a response, and then transmits another polling character with the polling address incremented by one if no response is received. A selection message begins with a device address character having ones in bit positions one through four, the device address in bit positions five through ten, even parity indicated by bit position eleven, and a zero at bit position twelve. The second character of a selection message is a keyboard control character beginning with a one at bit position one, a zero to indicate data at bit position two, an eight bit control data byte in bit positions three through ten, an even parity bit in bit position eleven and a zero in bit position twelve. A one in bit position three, which is the first position of the data byte, causes the data terminal to simulate the activation of a key. As implemented, the activation of the reset key is simulated in response to a one in this bit position. A one in the number four bit position of the character, the number two bit position of the data byte, causes the CRT display to be reversed. That is light characters on a dark background would be reversed to dark characters on a light background. The fifth and sixth character bit positions, corresponding to the third and fourth data bit positions have no assigned meaning and are normally zero. The sixth and seventh character positions corresponding to the fifth and sixth data bit positions provide A and B tone pulse controls respectively. A one in the fifth data bit position causes a 500 Hz audible tone pulse A to be generated for approximately 400 milliseconds a and one in the sixth data bit position causes a 350 Hz audible tone pulse B to be generated for approximately 400 milliseconds. A one at character position nine corresponding to data bit position seven enables the generation of audible key clicks whenever keyboard keys are activated. A one in the tenth character position corresponding to the eighth data bit position enables a single automatic key repeat upon continuous depression of a key for predetermined period of time. If several repeats are required, the key repeat enable bit must be individually set by separate selection messages for each repeat required.

The third character of a selection message is a data character containing a data byte in character bit positions three through ten for control of the CRT display of a data terminal. If the first data bit position of this character contains a one a flash condition is indicated and all of the characters in the following group of update CRT characters shall be caused to flash. The number two data bit position of the third selection character is a move cursor bit and causes the display cursor to remain stationary when a zero is present in this bit position. When this bit is logic one and there are CRT update characters in the same group, the cursor is caused to be located at the position of the last character plus one more character position. When the move cursor bit position is logic one and there are no CRT update characters in the same group (that is, a separator or end of message, EOM, character occurs after the fourth or update character number) then the cursor is placed at the position defined by the update line number of character number three and the update character number of coax character number four. If different groups within a selection message contain a move cursor command, the last command is the one which is obeyed. The third data bit position of the third selection character is an erase position and when this position contains a logic zero there shall be no blanks (spaces) automatically entered on the CRT display. When this bit is a logic one and there are no CRT update characters within the group, automatic erasing starts at the position defined by the update CRT line number and update CRT character number position and continues to the last character on the last line of the CRT display. When the erase bit position contains a logic one and there are CRT update characters within the selection message group, automatic erasing starts at the position of the last update character plus one and the remainder of the display is erased. If there is more than one erase command within the same selection message, then the last command shall be the one which is obeyed. Erasing starts only after the end of message character has been received. If there are errors before the end of message character occurs the erase command shall not take place. Bit positions five through eight of the update CRT line number contain a binary number identifying the first line number of the CRT display for which the particular group of the selection message is applicable. The CRT key stations used herein have a maximum of 24 lines, though in general larger cathode ray tubes may be utilized with a greater number of lines.

The fourth character of a selection message is an update CRT character number and contains an eight bit data byte in character positions two through ten. The first data bit position is not implemented and always contains a one while the data bit positions two through eight contain a binary number identifying the character position along an identified line for which the subsequent group of CRT characters are sequentially assigned. The CRT key stations described herein have a maximum of 80 characters per line but in general larger cathode ray tubes or smaller characters may be employed to obtain a larger number of characters per line. A list of CRT characters may be provided following the fourth selection character with each CRT character being transmitted as a separate coax character. The CRT characters are provided in a standard EBCDIC code except that the character 11100000 is translated by each key station into the character 01101010. The list of CRT characters may be followed by either a separator character dividing the selection message into groups or an end of message character which terminates the selection message. A separator character is followed by an update CRT line number character having the same format and significance as the third character of the selection message and that character is followed by an update CRT character number character having the same format and significance as the fourth character of a selection message. Following these two characters and appropriate number of CRT characters may be sequentially listed until a separator character or an end of message character appears. The selection message continues with this same format until the end of message character appears to terminate the selection message.

A data terminal such as a CRT key station responds over the coaxial cable only when polled or selected. When polled, the terminal responds only when data is available for transfer to the KMUX 22. The polling response is provided in the form of two sequential data characters, the first including a status byte and the second including a data byte. Following the established convention, each character begins with a logic one start pulse in bit position one, a logic zero to indicate a data character in bit position two, the data byte in bit positions three through ten, a parity bit at bit position eleven and a spacer logic zero of at least one unit of time in bit position twelve. The first bit position of the status byte is not assigned and is output as logic zero. The second bit position of the status byte has no assigned meaning for most data terminals and is output as logic zero. However, a logic one is inserted at this number two bit position by TTY number one or number two in a response indicating that the output of a complete data character to the TTY has been completed. All subsequent bits of a teletype output complete response message are logic zero. Bit positions three, four, and five of the status byte for a polling response contain a binary number indicating the type of keyboard implemented for the polled data terminal. This code permits a single keyboard hardware configuration to be utilized for up to eight different patterns for assigning character meanings to individual keys within a single peripheral processing system 10. This three bit code enables the CPU 16 to select a conversion table from a memory location such as on one of the disk files and convert the transmitted data code which identifies only the hardware location of an activated key to a particular character meaning for the activated key. The keyboard type code is transmitted with the most significant bit of the binary number in data bit position three and the least significant bit in data bit position five. A logic one is transmitted in position six of the status data bit whenever the reset key of the polled terminal is activated. The number seven position is logic one to indicate an overflow of a small buffer provided with each data terminal and the number eight position is always transmitted as logic zero with no assigned meaning. The number one bit position of the subsequently transmitted character data byte is identified as the $S_2$ position and is logic one when either the alpha (AA) or katakana (KK) shift keys are depressed. The second character data bit position, which is identified as the $S_1$ position, is logic one whenever the numeric (NN) or katakana shift key is depressed. These two bits can then be decoded to determine the shift state of the responding data terminal. It can be seen that a "10" code indicates an alpha shift, a "01" code indicates a numeric shift and a "11" code indicates a katakana shift. Bit positions three, four and five of the data byte contain a binary number indicating the row number of an activated key. Bit position number three contains the most significant bit and position five contains the least significant bit. Similarly, positions six, seven and eight of the character data bit contain a binary number indicating the column number of an activated key. Bit position six identifies the most significant bit of the number and bit position eight the least significant bit position. Only a single status byte and a single data byte are transmitted by a data terminal in response to a polling message even if the small data buffer of the data terminal contains more than one character.

A selection response is provided by a data terminal only if a number of conditions are met for the preceding selection message. First, no parity errors can occur throughout the entire selection message. Second, the first selection character must have the control bit at character position two equal to "1", must have the selection code at character positions three and four equal to "11", and must contain the correct mutually exclusive preassigned station address at character positions five through ten. Third, at least three characters must occur between the address character and the first separator or end of message character. That is, the selection message must contain at least five characters. Fourth, at least two characters must occur between one separator character and the next separator character or end of message character. These two characters are the update CRT line number character and the update CRT character number character. Fifth, the end of message character must contain the correct code and have the control bit thereof equal to logic one. Sixth, exactly two control characters must occur during a selection message, these being the first or address character and the last or end of message character.

If all of the above conditions are met a selected data terminal responds with a two data character message. These characters follow the standard format of a logic one start pulse at the first character position, a logic zero at the second character position to identify the character as a data character, a data byte at character positions 3–10 and, a parity bit at character position eleven and a logic zero for at least one unit of time at character position twelve. In the present arrangement both response data bytes are transmitted as all zeros, but these bytes are available for the assignment of specific meanings if desired.

Figure 4A:
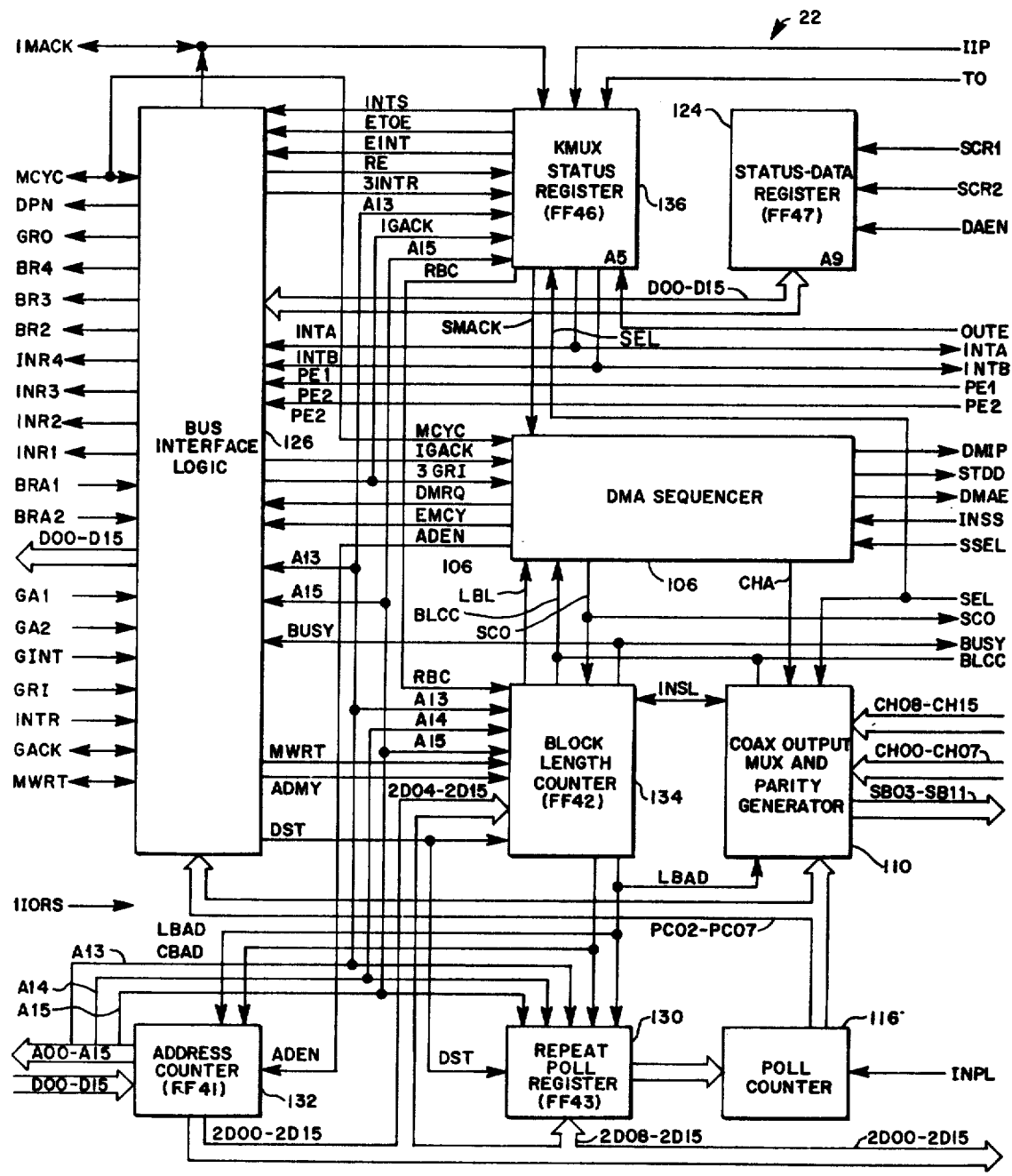
Figure 4B:
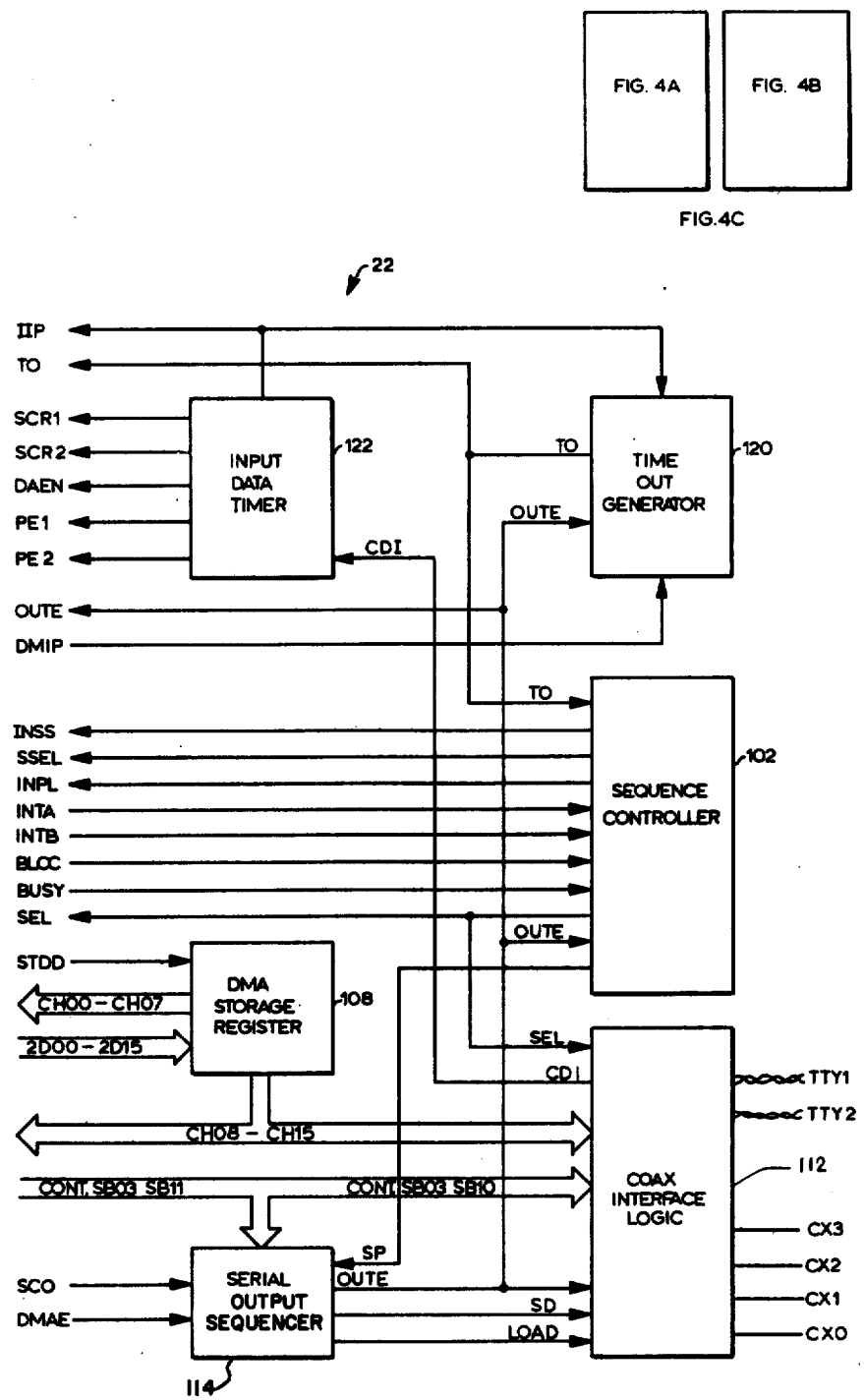

The key station multiplexer (KMUX) 22 is represented in functional block diagram form in FIG. 4 to which reference is now made. In FIG. 4 multiple parallel signals are represented by wide arrows indicating the direction in which the signals are communicated through the KMUX 22 while single pulse and serial pulse signals are indicated by single line arrows similarly indicating the direction of data communication. In the following more detailed drawings each signal identification character includes a numerical prefix wherein an even number indicates a positive logic signal where a high voltage indicates a "true" or "on" condition. An odd numbered prefix indicates the signal is transmitted as the complement of the positive logic representation. In general, the numbered prefix is sequentially incremented as a signal is operated upon logically. That is, a given signal would be identified with a zero prefix as it is generated, identified with a one prefix when it is complemented and then identified with a two prefix after it is complemented a second time. Thus the signals bearing the zero and two prefix will be logically identical except that the two prefix signal will have been complemented twice and may have a small propagation delay relative to the number zero signal. Except where required for clarity, the numerical prefix is deleted from most signal identification characters in the functional block diagram of FIG. 4, but it will be appreciated by one skilled in the art that a signal may be complemented when necessary for compatability with either the logic which originates the signal or the logic which responds to the signal. A sequence controller 102 provides the internal master control for the key station multiplexer 22. For instance, as a new KMUX cycle is about to begin the sequence controller responds to the busy signal from the block length counter 104 and, if true, communicates a start selection (SSEL) signal to a DMA sequencer 106. The DMA sequencer 106 provides the more detailed control of actually commanding that bus control be requested so that a data word can be obtained from main memory 14 in a direct memory access. Data obtained from main memory 14 during a direct memory access is temporarily stored in a DMA storage register 108. The character provided in parentheses for each of the external in/out registers indicates the system 10 address for the particular register in hexadecimal form. As explained previously these registers are accessible to bus masters by generating the proper address code on the address lines of the system data bus 12. However, because of the manner of hardware implementation some of these registers may be a read only or write only register from the viewpoint of a bus master. For instance the DMA storage register 108 is implemented in such a way that it will not respond to a read command generated on the system data bus 12. From the DMA storage register 108 the two byte data word is transferred in parallel via lines CH00-CH07 and CH08-CH15 to a coax output multiplexer and parity generator 110 for serial transmission over the coaxial cables as part of a selection message and to a coax interface logic unit 112 for serial transfer over the twisted wire pairs connecting the KMUX 22 with the two teletype units.

If the sequence controller 102 determines that the busy signal is not true at the beginning of a KMUX sequence, the sequence controller 102 communicates a start polling (SP) signal to a serial output sequencer 114 which controls the detailed implementation of a polling message much as the DMA sequencer 106 controls the detailed implementation of a direct memory access sequence. The serial output sequencer 114 responds to the SP command by assembling a polling message including a polling address received from a poll counter 116 which stores and increments the address of a data terminal which is to be polled. This address is communicated in parallel through the coax output multiplexer and parity generator 110 to the serial output sequencer 114. The coax output multiplexer and parity generator 110 adds the proper control and format bits to the polling message in accordance with the requirements of the standard polling message format and transmits the message in parallel to a serial output sequencer 114 which provides a parallel to serial conversion as the data is serially transferred to the coax interface logic 112 by a serial data, SD, signal with a proper timing for output to the coaxial cable and TTY twisted line pairs. The coax interface logic 112 actually drives the coaxial cables and twisted line pairs with the proper voltage levels.

A time out generator 120 begins a 32 microsecond count at the completion of transmission of each polling and selection message and generates a time out (TO) signal when 32 microseconds pass without a response. If polling, the KMUX 22 then transmits a new polling message with an incremented address in response to the time out signal. However, if the TO signal occurs subsequent to a selection message the KMUX 22 responds to the TO signal with a type B system interrupt request.

An input data timer 122 receives a coax data in (CDI) signal from the coax interface logic 112, provides the necessary timing to convert the serial coax signal to a serial logic signal of ones of zeros and checks for parity errors. An incoming signal is transmitted serially via a data enable (DAEN) signal to a two byte status data register 124. A first response character which is the status character is stored in the left hand or most significant byte of the status data register 124 and the subsequent data character is stored in a right hand or least significant byte of the status data register 124. The CPU 16 may the read the status and data bytes from this register as an interrupt subroutine is subsequently executed. As the status data register 124 is read, the data is transferred as parallel data signals D00-15 through bus interface logic 126 and onto the system data bus 12. The bus interface logic 126 actually drives the various lines of the system data bus 12 with the proper timing and signals representations in accordance with the standard format required for communication along the system data bus 12.

The central processing unit 16 can cause the KMUX 22 to continuously poll the same data terminal over and over again by writing the continuous poll address into the repeat poll register 130. With only six of the eight bits in the single byte register 130 being required to identify the continuous polling address, the first or most significant bit position is used as a command signal. A "1" in this bit position causes an automatic override so that an increment polling counter command (INPL) signal from sequence controller 102 causes the polling counter 116 to be loaded from bit positions D08-D015 of repeat poll register 130 which contain the repeat poll address. The contents of the poll counter are then assembled as the address portion of a polling message as explained above.

A command for the KMUX 22 to transmit a selection message is initiated when the CPU 16 writes the block starting address for the selection message into an address counter 132 which responds to the hexadecimal address FF41$_{16}$ of the processing system 10. The CPU 16 then writes the negative of the number of bytes in the selection message into the block length counter in a signed two's complement negative number representation. The presence of this negative number in block length counter 134 causes the busy signal to be generated and the sequence controller 102 responds by initiating the transmission of the commanded selection message at the beginning of the next KMUX cycle. The maximum number of bytes in a selection message is 2,048 including the data terminal address and the end of message character.

In processing an interrupt program and interrupt request, the CPU interrupt program first cause the CPU to read the contents of a KMUX status register 136 and then the contents of the status data register 124. Reading of the status data register 124 resets the interrupt request so that the KMUX 22 may continue with its normal cyclical polling operation. The various bit positions of the KMUX status word at address location FF46$_{16}$ have a predetermined significance. Bit 0, which is the most significant bit is the "busy" bit and is a logic one whenever the contents of the block length counter 134 is not zero. Bit 1 of the KMUX status register 136 is the "poll response interrupt" bit and is set to logic 1 whenever a response to a polling message occurs and is reset as the status data register 124 is read by the CPU 16. Bits 3 and 4 have no presently assigned significance. Bit 5 is the "end selection response time out error" bit and is set to logic 1 whenever the 32 microsecond time out occurs at the end of a selection message without a selection response. It is reset to logic 0 when the status data register 124 is read. Bit 6 is the status character "response parity bit" (SPAR) and is set to logic 1 whenever there is parity error in a data terminal response status character. It is reset to logic 0 when a polling or selection output to the coaxial cable transmission lines is made. Bit 7 is the data character "response parity bit" (ETAR) and is set to state logic 1 whenever there is a parity error in the data terminal response data character. It is reset to logic 0 when a polling or selection output to the coaxial transmission cables is made. The least significant byte, bit positions 8-15, are not implemented and are transmitted over the data lines of the system data bus 12 as all zeros.

The generation and timing of the major control signals for the key station multiplexer 22 is provided by a sequence controller circuit 122 which is illustrated in FIG. 5. Sequential control is provided by six type D sequencing flip-flops 501-506. Each of these flip-flops has its preset input disabled by connection to a 5 volt signal 5 VP1 and its clear inputs connected to a fanout from the peripheral processing system initialize or reset signal, 5 IORS.

Figure 6:
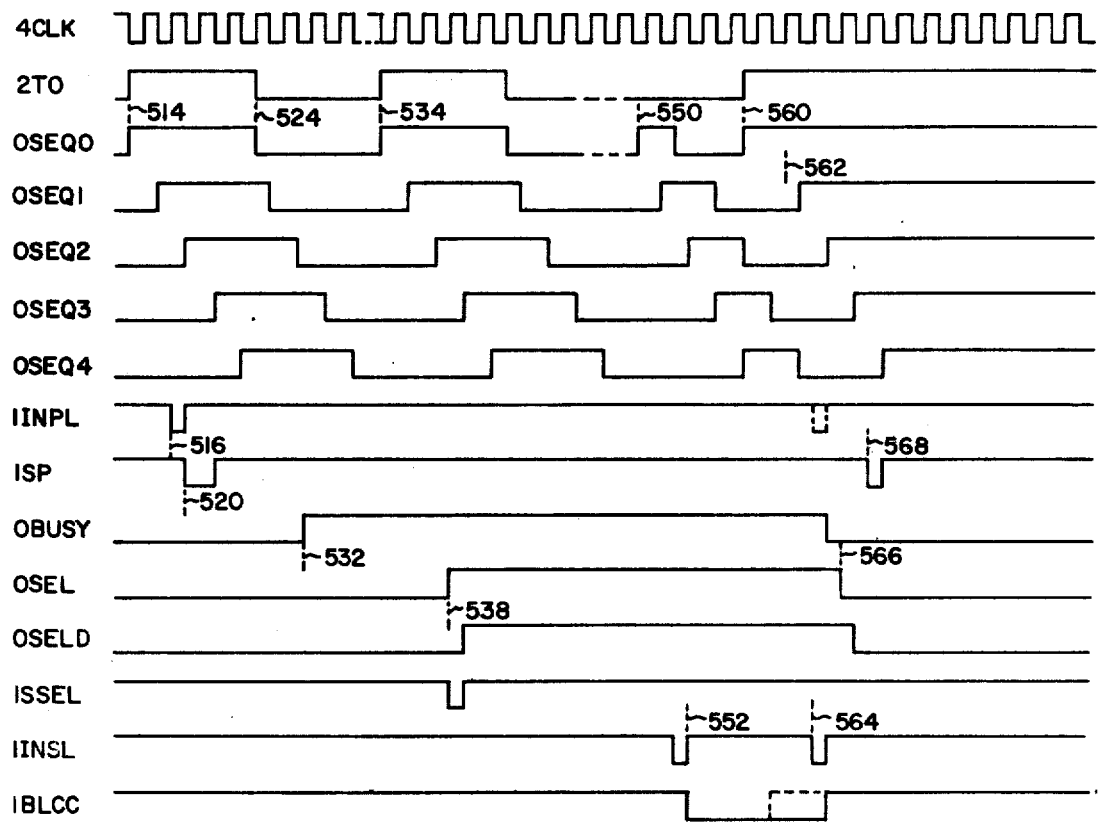
FIG. 6 is a timing diagram illustrating signals which are pertinent to the operation of the key station multiplexer shown in FIG. 4.

The operation of the sequence controller 102 is most easily understood in conjunction with the timing diagram of FIG. 6. The sequence controller 102 is synchronized by a 4 MHz clock signal, 4CLK, which is a fanout from the peripheral processing system clock signal, 4XTAL, which is provided on the system data bus 12. The sequencing of the sequence controller is triggered by a signal $0SEQ0 = \overline{TO} \ 1 \cdot (\overline{SEL} \ 1 + BLCC) \ 1 + \overline{OUTE} \ 1 \cdot SEL \ 1 \cdot \overline{BLCC}$ from combinational logic 510. The operation of the sequence controller during a polling cycle will be described presently and the operation during a selection cycle will be described subsequently.

During a polling cycle the 0BUSY input to flip-flop 505 is in the 0 state causing flip-flops 505 and 506 to be in and remain in the reset state. The preceding polling cycle may terminate in one of two different ways. If a polling response were received, a type A interrupt would be requested and the signal 1INTA would go to logic 0, disabling the clock output from NAND gate 508 and thereby disabling the operation of the sequence controller 102. Alternatively, a polling response may not be received and the preceding polling cycle is terminated when the 2TO input signal to sequential logic 510 goes true, indicating that 32 microseconds have passed without a polling response. In either case a new cycle beings when both the clock output from NAND gate 508 and the 0SEQ0 signal from sequential logic 510 becomes true. When the KMUX 202 is not in a selection mode the 0SEQ0 signal does true simultaneously with the 2TO signal at time 514 as shown in FIG. 6. After signal 0SEQ0 goes true flip-flop 501 is set at the next trailing edge of clock signal 4CLK causing the signal 0SEQ1 to go true. During the next three successive trailing edges of the 4CLK clock pulse the flip-flops 502, 503 and 504 become set causing their output signals 0SEQ2, 0SEQ3, and 0SEQ4 respectively to become true. During the ¼th microsecond interval beginning at time 516, all inputs to NAND gate 518 are true causing it to generate an increment polling counter pulse 1INPL. This signal increments the poll counter 116 (see FIG. 4) to permit the data terminal having the next sequentially higher preassigned mutually exclusive address to be polled during the upcoming polling cycle. At time 520 the 1INPL pulse is terminated and a start polling pulse, 1SP having a duration of ¼th microsecond is initiated as all inputs to a NAND gate 522 become true. The serial output sequencer 114 responds to this start polling pulse by initiating a polling cycle. As soon as the serial output sequencer 114 commands the output of a polling message to the coaxial cables, an output enable signal is generated which terminates the 2TO signal, thereby in turn disabling the 0SEQ0 signal, for example at time 524. At the trailing edge of the next clock pulse flip-flop 501 is reset and the remaining flip-flops 502-504 are sequentially reset at ¼th microsecond intervals thereafter. It no selection cycle is commanded the sequence is repeated when NAND gate 508 is enabled by the absence of an interrupt when time out signal 2TO becomes true.

If, prior to the beginning of the next polling cycle, the CPU 16 commands a selection sequence by placing an address in address counter 132 which indicates the beginning location of a selection message and a binary number in block length counter 104 to indicate the number of bytes in the selection message, the 0BUSY signal input to flip-flop 505 will be true and the sequence controller will cause the KMUX 22 to enter a selection mode at the beginning of the next KMUX cycle. Because flip-flop 505 cannot be clocked until after signal 0SEQ2 enables NAND gate 530 subsequent to the beginning of a KMUX cycle, the next KMUX cycle cannot start until time out signal 2TO is received to indicate the termination of the preceding polling cycle even though the 0BUSY signal is already true.

Assume that the 0BUSY signal goes true at an arbitrary time 532 during the preceding polling cycle and that the 2TO and 0SEQ0 signals go true at time 534 to terminate the preceding polling cycle. The flip-flops 501-504 will then follow their previous pattern of setting at sequential ¼th microsecond intervals at the trailing edge of the 4CLK clock pulses. During the ¼th microsecond interval during which signal 0SEQ2 is true and signal 0SEQ3 is still false, NAND gate 530 will be enabled and with its output inverted by inverter 536 flip-flop 502 will be clocked at the rising edge of the 4CLK signal at time 538 causing the signal 0SEL to be true. However, the 0SEL signal goes true sufficiently late in the sequence that the 0SEQ1 and 1SEQ2 inputs to a NAND gate 540 which generates an increment selection counter signal, 1INSL, are already false and the increment signal is not generated during the first subcycle of a selection cycle. In this way the block length counter 104 and address counter 132 cannot be incremented until after the first character of the selection message has been transmitted over the coaxial cables and the integrity of the counting system is maintained. As flip-flop 505 is set at time 538 a NAND gate 542 becomes enabled and generates a start selection cycle command pulse, 1SSEL. This pulse is terminated ⅛th microsecond later when flip-flop 506 generates a true selection in progress delayed signal, 0SELD at the next trailing edge of clock pulse signal 4CLK. The SSEL signal commands the direct memory access sequencer 106 to request bus control so that the first word of the selection message may be obtained from memory 14. As soon as the KMUX 22 begins transmitting the first character of the selection message over the coaxial cables the output enable signal, 0UTE will go true, causing trigger signal 0SEQ0 to go false and flip-flops 501-504 to sequentially reset at ¼th microsecond intervals. During subsequent subcycles of the selection cycle the trigger signal 0SEQ0 goes true as the output enable signal goes false when transmission of a character is completed, when the increment polling counter signal 1INPL which is generated early in the sequence is true, when signal 0SEQ1 is true and signal 0SEQ2 is false, and when the start selection signal 1SSEL is inhibited.

During the last cycle of a polling sequence the control signals are somewhat modified. If transmission of the next to the last character in the selection message is completed at time 550, the trigger signal 0SEQ0 goes true at this time and the four flip-flops 501–504 are sequentially set at ⅛th microsecond intervals at sequential trailing edges of the clock pulse 4CLK. At the rising edge of the 1INSL signal at time 552, the block length count complete signal, BLCC goes true, disabling the trigger signal 0SEQ0 so that the flip-flops 501–504 reset at ⅛th microsecond intervals.

In a normal selection cycle sequence a selection response will be received causing the generation of a type B interrupt request causing signal 1INTB to disable the sequence controller clock. However, since the BLCC signal is true, as soon as the time out signal 2TO goes true the trigger signal 0SEQ0 will go true, for instance at time 560. As soon as the type B interrupt is reset to again enable the clock pulse, for instance at time 562, the flip-flops 501–504 will begin setting at the trailing edges of the clock pulse signal 4CLK. At time 564 when signal 0SEQ1 is true and signal 0SEQ2 is false the increment selection counter pulse is generated for ⅛th microsecond beginning at time 564. The block length counter 104 changes state at the rising edge of signal 1INSL ⅛th microsecond after time 564 and overflows the count 0 causing the block length count complete signal, 1BLCC to go false. At the same time the 0BUSY signal input to selection flip-flop 505 goes false, although this flip-flop remains in the set state until it is clocked some time later.

Even though a polling sequence begins at time 562 as the type B interrupt is reset, the increment selection counter pulse, INSL, rather than the increment polling counter pulse, INPL, is generated during the first polling cycle following the transition from a selection sequence to a polling sequence. It will be observed that since the signal 0SEL is true at time 564, NAND gate 540 is enabled at this time to generate the 1INSL pulse while NAND gate 518 remains disabled and the 1INPL pulse cannot be generated. Similarly, when the sequence is in the process of changing from polling to selection the INPL signal is generated. As a result, the first data terminal to be polled following a selection sequence is one address count greater than the last data terminal to be polled before the beginning of a selection sequence.

At time 566 when signal 0SEQ2 is true and 0SEQ3 is false, selection flip-flop 505 is clocked at the rising edge of clock pulse signal 4CLK. At this time the 0BUSY signal at the D input to flip-flop 505 is false and the flip-flop resets, disabling the selection signal 0SEL. One-eighth microsecond later selection delayed flip-flop 506 is clocked at the trailing edge of clock pulse signal 4CLK to reset flip-flop 506 and disable the 0SELD signal. With flip-flop 505 reset signal 1SEL is true and NAND gate 522 is enabled to generate the start polling pulse 1SP at time 568 on the rising edge of the clock pulse signal 4CLK. From this time on the polling cycle control signal sequences are the same as previously described.

The time out generator 120 as shown in FIG. 7 and includes a pair of 4 bit binary UP counters 702, 704 connected in cascade, a pair of inverters 706, 708 and an OR gate 710 with four inverting inputs, and its output connected to the input of inverter 708. The load and parallel data inputs for the two counters 702, 704 are disabled by connection through a 1 K resistor to a +5 volt source. The count enable inputs T, P of the first stage are connected to be driven through inverter 706 by the most significant output, QD, of the most significant stage 704. The clock inputs are connected to receive the complement of the 4 MHz KMUX 22 basic clock signal 4CLK, and the clear inputs are driven by the output of inverter 708. The complement inputs to OR gate 710 are driven by the complement of the output enable signal, OUTE, the complement of the direct memory access in progress signal, DMIP, the complement of the input coax data in progress signal, IIP, and the complement of the system reset signal, IORS. So long as the accumulated count of the 8 bit counter is decimal 127 or less, the most significant output QD is false so that inverter 706 provides a true output to enable counting. The basic time out signal, 2TO is taken from the most significant QD output and the complement 1TO is taken from the output inverter 706. So long as one of the input signals to 710 is true in its uncomplemented state, the counter is constrained to be cleared and the time out signal cannot be generated. However, as soon as one of these signals is not present, in other words the four complemented inputs to OR gate 710 are all in the true state, the counter begins counting at the rate of 4 million counts per second until count 128 is reached after 32 microseconds. At this time output QD goes true causing the output of inverter 706 to go false and disable the count enable inputs T and P. Thus, once the time out signal is generated it cannot be reset except by clearing the counter through one of the four input signals to OR gate 710.

As an example of the operation of the time out generator assume that the KMUX 22 is in a polling mode and a polling message is output over the coaxial cables. While the polling message is being output the output enable signal OUTE is generated and the counter is constrained to a cleared state. As soon as transmission of the polling message over the coaxial cable is completed, the output enable signal goes false, signal 1OUTE goes high and the counter begins to count up. If 32 microseconds pass without receiving a polling response, the time out signal, 2TO is generated and the sequence controller 102 responds by initiating a new polling cycle as previously explained. However, if the polled data terminal responds with a two character polling response message, signal 1IIP goes low while the inputting of the response message is in progress and the counter is again constrained to the cleared state before it counts up to the point where the time out signal is generated. Upon completion of the transmission of the response message the counter will again begin to count and the KMUX 22 will request a type A interrupt. Polling will not then resume until 32 microseconds pass to permit signal 2TO to be generated and the type A interrupt is reset. Similarly, signal 1DMIP goes low while a direct memory access is in progress during a selection cycle to clear the counter during this time.

As shown in FIG. 8 the serial output sequencer 114 includes a pair of 5 bit parallel load shift registers 750, 752 connected cascaded in series with a type D presettable flip-flop 754 to form an 11 bit shift register, a 16 bit binary counter 756, and associated timing and control flip-flops and gates. The timing and control logic includes two J-K flip-flops SOSA 758 and SOSB 760, and a type D flip-flop SOSC 762. A NAND gate 764 is connected to output a clock signal, CLKD when flip-flop SOSA is reset and flip-flop SOSB is set. A NAND gate 766 and an AND gate 768 are connected to provide an output enable signal, OUTE, except when counter 756 stores count 13 and both flip-flops SOSA and SOSB are reset. The output enable signal is connected to drive the toggling J-K inputs to flip-flop SOSA and the D input to flip-flop SOSC. Flip-flop SOSB is connected to toggle when clocked by the high to low transition of the Q output of flip flop SOSA. Flip-flop SOSA is clocked by clock signal 4CLK which is a fanout of the 4MHz system clock signal, XTL4, provided on the system data bus 12. Clock signal CLKD is a normally high signal which is pulsed low for ¼th microsecond at 1 microsecond intervals. An OR gate 770 having three complementing inputs generates a trigger signal, START SOS, which drives the clock input to flip-flop SOSC and initiates the transmission of a character over the coaxial cables. The shift register and all flip-flops are connected to be reset by a fanout from the system reset signal, 5IORS.

All cycles of the serial output sequencer 114 are exactly the same and may be initiated by any one of three input signals to OR gate 770. The start polling signal, SP, is generated by the sequence controller 102 when the KMUX 22 is in a polling mode to initiate a new polling cycle. Another input, the direct memory access enable signal, DMAE, is generated as soon as a direct memory access is completed and initiates the transmission over the coaxial cable of odd numbered characters in a selection message for which a preceding direct memory access is required, The third signal is the start character out signal, SCO, and is generated by the DMA sequencer 106 to initiate the transmission over the coaxial cables of even numbered characters of a selection message which need not be immediately preceded by a direct memory access since two bytes are obtained during each direct memory access.

Figure 9:
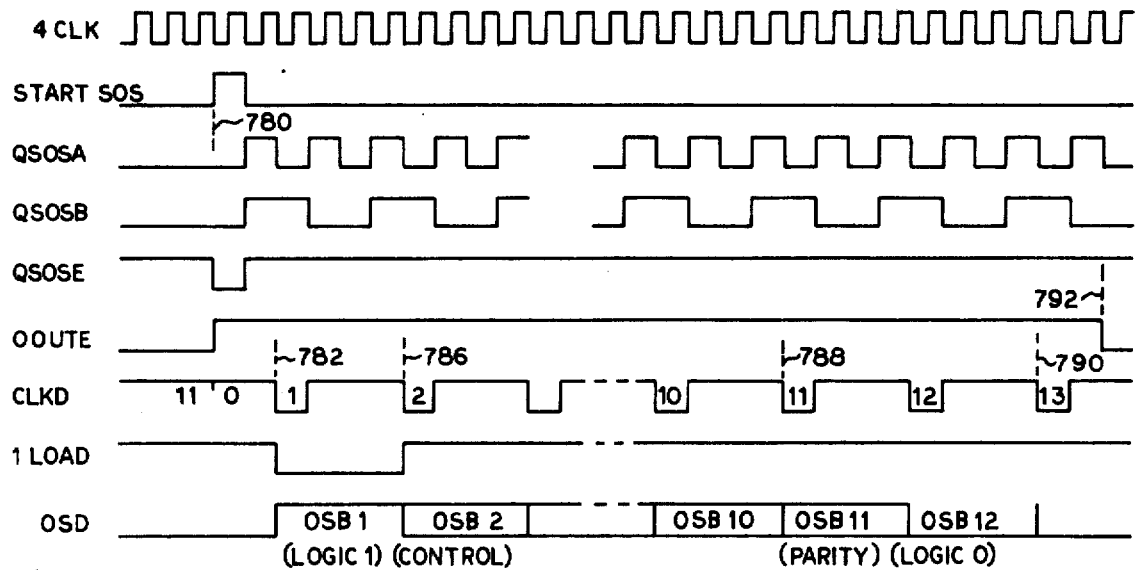
FIG. 9 is a timing diagram illustrating signals which are pertinent to the operation of the key station multiplexer shown in FIG. 4.

Referring now to the timing diagram shown in FIG. 9, when the serial output sequencer is in an idle condition the SOSA and SOSB flip-flop are reset and flip-flop SOSC is set. The output enable signal 0OUTE is at logic 0. Upon receipt of one of the three possible output command signals such as a start polling command, 1SP at time 780, flip-flop SOSC is immediately clocked and changed to the reset state since its input is driven by the logic 0 output enable signal. The resetting of flip-flop SOSC activates the reset input to counter 756 and causes the output enable signal, 0OUTE, which is dependent upon the binary counter 756, to go to logic 1. All of these changes occur substantially simultaneously at the leading edge of the trigger pulse. With the output enable signal at logic 1 the toggle connected J-K inputs to flip-flop SOSA 758 are enabled and this flip-flop begins toggling at each high to low transition of the 4MHz clock pulse signal 4CLK. Similarly, flip-flop SOSB 760 is connected to toggle at the high to low transitions of the Q̄ output from flip-flop SOSA which occur at the same time as the low to high transitions of the Q output as shown in FIG. 9. Because the inverting preset input to flip-flop SOSC 762 is driven by the Q̄ output from flip-flop SOSA, flip-flop SOSC is preset when the flip-flop SOSA is toggled to the set state for the first time after receipt of the start SOS signal. Flip-flop SOSC then remains in the set state throughout the serial output sequence and plays no further part in the control function. At time 782 NAND gate 764 is enabled as flip-flop SOSA is toggled to the reset state while flip-flop SOSB remains in the set state and generates a delayed clock signal, CLKD, which has a pulse of ¼ microsecond and is repeated at 1 microsecond intervals throughout the serial output sequence.

As the leading edge of clock signal CLKD occurs at time 782, counter 756 is incremented from state 0 to state 1. A flip-flop 784, which generates a load command signal, 1LOAD, is connected to be enabled by state 1 of counter 756. A load command pulse is thus initiated at time 782 and is connected to preset flip-flop 754 and load shift registers 750 and 752. A serial data signal, 0SD, which commands the actual coax driver circuitry, is taken from the Q output of flip-flop 754. The presetting of flip-flop 754 by the load signal thus initiates the transmission over the coaxial cables of a 12 bit character, which is required by convention to begin with a logic 1. The load command also inhibits the shifting of shift registers 750, 752 and causes them to be loaded with serial inputs 0SB11 to 0SB03 and 0CONT from the coax output multiplexer and parity generator 110 which generates a parallel polling message, and odd numbered selection character or an even numbered selection character depending upon the current mode of the key station multiplexer 22. For the example of a polling message used herein, a polling message including the control bit and the parity bit would be transferred in parallel to the serial output sequencer 114. As the next clock pulse CLKD occurs at time 786, the shift register which includes shift register 750, shift register 752 and flip-flop 754 is shifted right with the QE output of shift register 752 which designates the control bit being shifted into flip-flop 754 and a 0 being shifted into the left most bit of shift register 750. Thus, at time 786 the serial data signal 0SD commands the second of control bit, 0SB2 of the polling message. For a polling message the control bit will be a logic "1" but in general this bit may be either a "0" or a "1". Similarly, the remaining bits of the polling message are shifted through the shift register at 1 microsecond intervals with zeros being shifted in at the left. The 11th clock pulse CLKD which occurs at time 788 shifts the parity bit, 0SB11 into flip-flop 754 and increments counter 756 to decimal count 11. At this time the shift registers 750 and 752 contain all zeros and as clock pulse 12 arrives flip-flop 754 is driven to the reset state to generate bit 12 of the polling message which by convention must be logic 0 and have a duration of at least 1 microsecond. As the 13th clock pulse CLKD is initiated at time 790 the signal on the coaxial cables has been logic 0 for at least 1 microsecond, and counter 756 is incremented to output counter decimal 13. NAND gate 766 is enabled by this count 13 as soon as both flip-flops SOSA and SOSB are in the reset state at time 792 and the generation of the output enable signal, 0OUTE, is terminated to conclude the serial output sequence and inhibit further operation of the serial output sequencer 114 until another pulse on one of the three input signals to OR gate 770 initiates another cycle.

Figure 10:
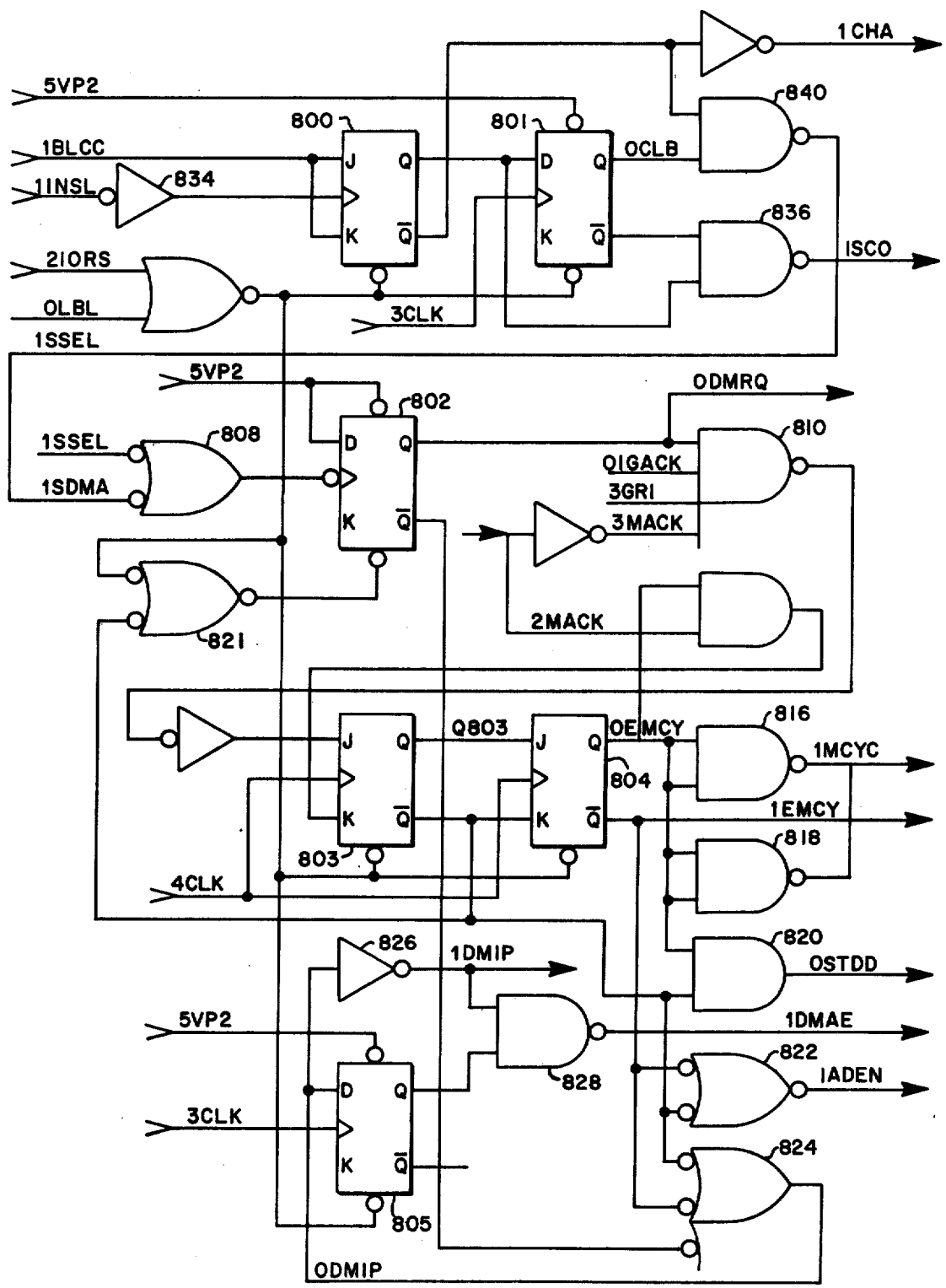
FIG. 10 is a functional block diagram and schematic representation of a DMA sequencer which forms a portion of the key station multiplexer shown in FIG. 4.

The direct memory access sequencer 106, which is illustrated in FIG. 10, provides the operational control for the key station multiplexer 22 while in a selection mode of operation. Sequencing is controlled by six flip-flops 800-805 and associated combinational logic circuits. All of the flip-flops are connected to be reset by either the system initialize or reset signal, 2IORS, or a load block length counter signal, 0LBL. This 0LBL signal loads the negative two's complement representation of the number of bytes in a selection message which is provided by the CPU 16 over the system data bus 12 into block length counter 104 and simultaneously resets the flip-flops 800–805 to insure that the DMA sequencer 106 is always completely reset at the beginning of a selection cycle.

Figure 11:
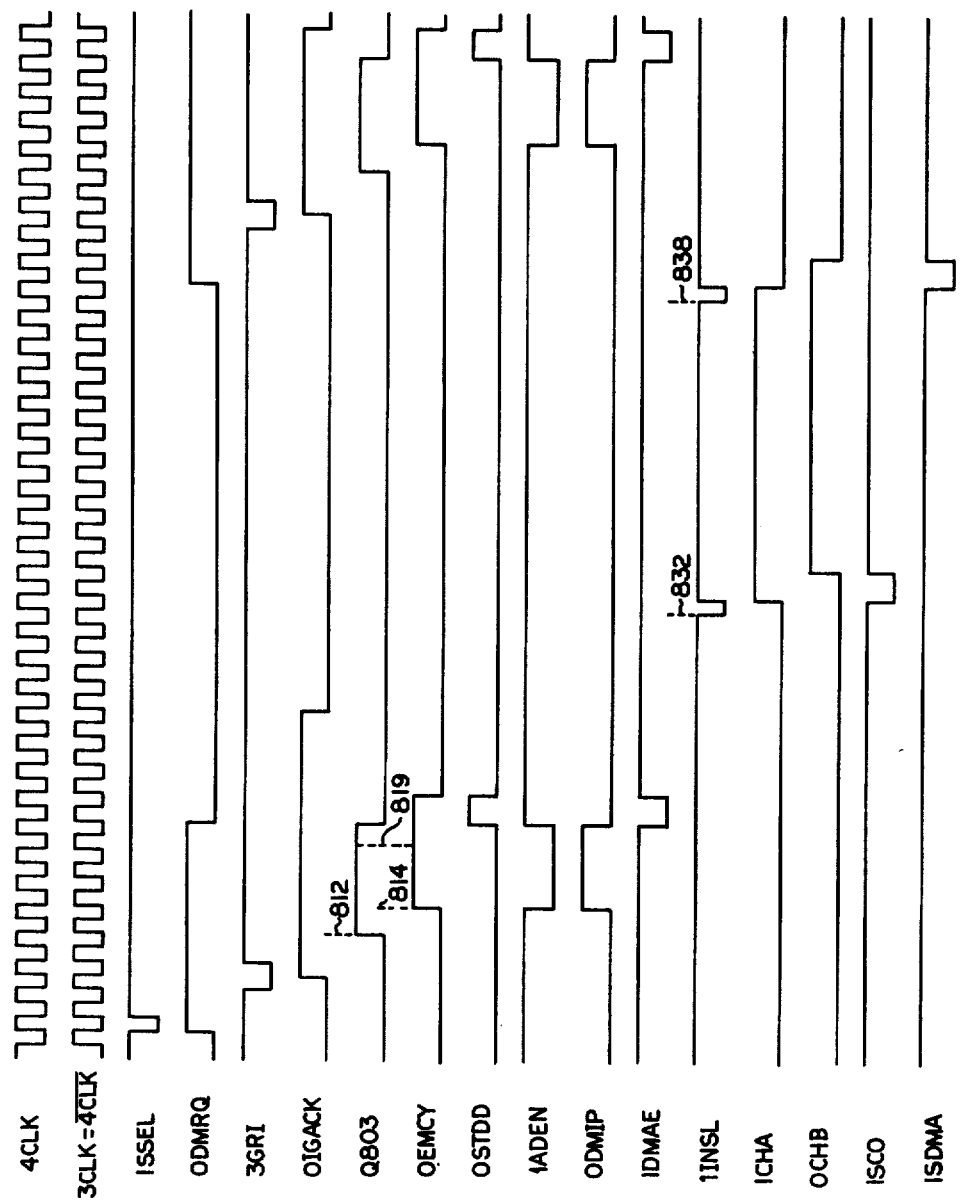
FIG. 11 is a timing diagram illustrating signals which are pertinent to the operation of the DMA sequencer shown in FIG. 10.

The operation of the DMA sequencer 106 can be best understood when further considered in connection with the timing diagram shown in FIG. 11. A selection sequence begins with the receipt of a start selection pulse on signal 1SSEL which passes through complementing input OR gate 808 to clock flip-flop 802. The clock signal input to flip-flop 802 starts a DMA cycle by switching flip-flop 802 to the set state in which it generates a direct memory access request signal, 0DMRQ, at its Q output. The signal 0DMRQ is communicated to bus interface logic 126 which requests to become bus master and then reads the first word of the selection message from memory 14. A NAND gate 810 is connected to sense the transfer of bus control to the KMUX 22. During the process of transferring the bus control the CPU generates a grant requested interrupt signal, GRI and the KMUX 22 responds with a grant acknowledge signal which is communicated to NAND gate 810 as signal 0IGACK. As soon as the CPU receives the grant acknowledge signal, it terminates the GRI signal causing its complement 3GRI to go true and enable NAND gate 810. At the next negative transition of the 4 MHz system clock pulse signal, 4CLK, at time 812, flip-flop 803 is set causing its output Q803 to go true and drive the J input to flip-flop 804 so that ¼ microsecond later at time 814 flip-flop 804 switches to the set state to generate a logic "1" enable memory cycle signal, 0EMCY. The 0EMCY signal is complemented by NAND gates 816, 818 to drive the memory cycle line of the system data bus 12. The system memory 14 responds by reading the first word of the selection message from an address location specified by address counter 132 and generating a memory acknowledge signal MACK when the data is available on the bus data lines. Assuming that the memory acknowledge signal is generated at time 819, the 3MACK complement thereof immediately disables NAND gate 810 causing the Q803 signal to go false at the trailing edge of the next clock pulse signal 4CLK. The $\overline{Q}$ output of flip-flop 803 is communicated through the complementing NOR gate 821 to clear flip-flop 802 and return the 0DMRQ signal to logic "0" as flip-flop 802 resets. With signal DMRQ at logic "0", NAND gate 810 is disabled regardless of the bus control inputs thereto and a new bus cycle cannot be initiated without a START DMA command signal input to the clock input of flip-flop 802. One-fourth microsecond after flip-flop 803 resets flip-flop 804 resets to terminate the enable memory cycle signal 0EMCY. During the ¼microsecond between the resetting of flip-flop 803 and the termination of the 0EMCY signal a strobe data delayed signal, 0STDD, is generated by an AND gate 820 to actually load the DMA storage register 108 from the data bus data lines. This delayed strobe signal allows ¼ microsecond after the appearance of the memory acknowledge signal for the elimination of any time skew that may appear on the system data bus lines. A complementing NOR gate 822 is also connected to provide an address enable signal 1ADEN which enables the contents of the address counter 132 to drive the address lines of the system data bus 12 from the time the enable memory cycle signal is generated until the memory acknowledge signal is received from the memory 14. A complementing OR gate 824 generates a direct memory access in progress signal, 0DMIP, which is at logic 1 throughout the coincidence of the 0EMCY signal, the Q803 signal, and the 0DMRQ signal. This signal is complemented by inverter 826 and coupled to the time out generator 120 as signal 1DMIP to maintain the time out generator in a cleared state throughout the direct memory access. In addition, flip-flop 805 operates in conjunction with inverter 826 to drive a NAND gate 828 to generate a direct memory access enabled signal, 1DMAE, approximately concurrent with the strobe data signal. The pulse on the 1DMAE signal is coupled to the serial output sequencer 114 and causes the generation of a start SOS pulse as shown in FIG. 9. It will be observed that loading of the shift register of the serial output sequencer 114 does not begin until ¼ microsecond after termination of the 1DMAE pulse so that there is no race problem with respect to the loading of the DMA storage register 108 by the 0STDD signal.

As illustrated in FIG. 6, the sequence controller will generate an increment selection counter signal, 1INSL, after the first byte of the first selection has been transmitted over the coaxial cable to initiate the next selection cycle. Referring now to FIGS. 10 and 11, as soon as the preceding selection character has been output over the coaxial cable the output enable signal, OUTE, goes false, the 0SEQO signal of the sequence controller 102 is enabled to start a new master control sequence and a pulse is generated on the increment selection counter signal 1INSL, for example at time 832. The signal 1INSL is communicated through an inverter 834 to the complementing clock input Q J–K flip-flop 800 to clock flip-flop 800 at the trailing edge of the increment signal. One-eighth microsecond after time 832, signal 1CHA which is derived by complementing the $\overline{Q}$ output of flip-flop 800 goes true as flip-flop 800 is clocked to indicate that the first byte of a selection word for which there must be a preceding direct memory access is not now being output to the coaxial cables and ¼microsecond after that type D flip-flop 801 is clocked to the set state, causing a 0 channel B signal, 0CHB, to be generated which indicates that the second byte of a selection word for which no direct memory access is required is about to be transmitted over the coaxial cables. During the ¼ microsecond before the toggling of flip-flop 800 and the setting of flip-flop 801, a NAND gate 836 is enabled to generate a start character out pulse, 1SCO, which is communicated to the serial output sequencer 114 where it serves the same function when the second binary selection word is being output as the DMAE signal does when the first byte is being output. That is both signals trigger the actual transmission of a selection message character over the coaxial cables. The next time an increment selection counter pulse is received for example at time 838, flip-flop 800 is toggled to the reset stage and ¼ microsecond later flip-flop 801 is reset. During this ¼ microsecond interval a NAND gate 840 is enabled and outputs a pulse on a start direct memory access signal, 1SDMA. This signal is received by a complementing input to OR gate 808 and has the same effect of triggering a direct memory access sequence as the pulse on the 1SSEL signal as explained previously. As flip-flop 800 is toggled back to the reset state the channel A signal 1CHA goes false to indicate that the first byte of a selection message will be transmitted over the coaxial cable during the current selection cycle. The KMUX 22 then continues obtaining the selection message from the memory 14 and transmitting the message over the coaxial cable one character at a time with a direct memory access being required for alternate characters under control of the toggling flip-flop 800. At the trailing edge of the increment selection counter pulse for the last character of the selection message, the complement of the block length count complete signal, 1BLCC, goes false. Since flip-flop 800 had already been toggled at this time, the BLCC signal has no effect on the operation of the DMA sequencer for the last character. As with all other characters of the message, the DMA sequencer 106 either does or does not obtain a new word from memory during a direct memory access and then outputs the appropriate byte of the selection word over the coaxial cables. However, it will be recalled from the discussion of the sequence controller, that during the transition from a selection mode to a polling mode the increment selection counter signal rather than the increment polling counter signal is generated. However, as this last increment selection counter signal is received at the beginning of the next polling sequence, the 1BLCC signal which provides the toggling input to flip-flop 800 is false so that flip-flop 800 is not toggled and the last increment selection counter signal INSL is ignored by the DMA sequencer 106. This last increment selection counter signal does however clock the block length counter 104 causing it to overflow from the negative 1 state to all zero state. As the block length counter overflows the busy signal goes false and the 1BLCC signal which enables the toggling of flip-flop 800 goes true, but by this time the last increment selection counter signal INSL has already passed and it is too late for there to be any effect on the DMA sequencer 106 until the next selection cycle is initiated.

Figure 12:
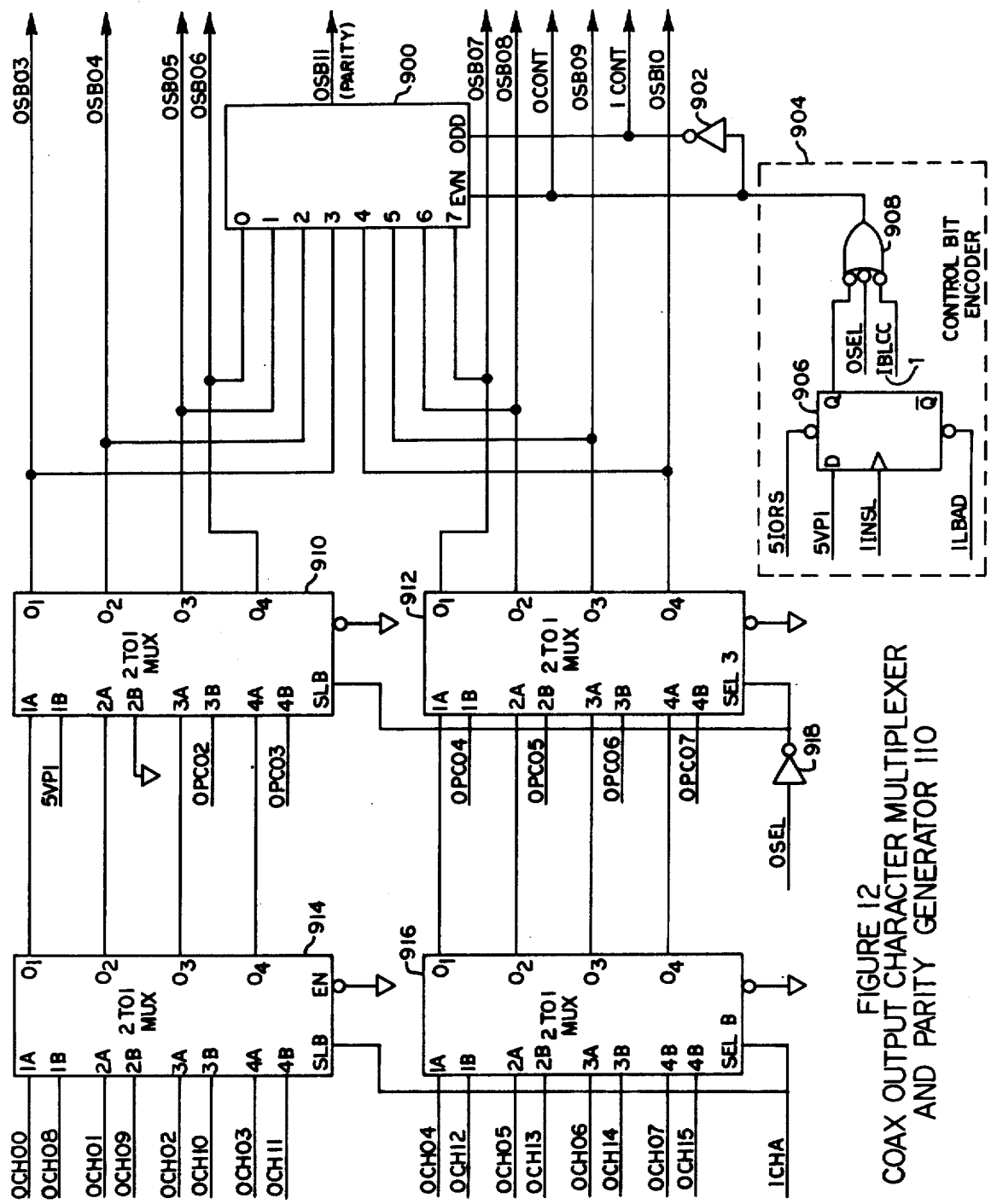
FIG. 12 is a functional block diagram and schematic representation of a coax output character multiplexer and parity generator which forms a portion of the key station multiplexer shown in FIG. 4.

The coax output character multiplexer and parity generator 110, which is shown in FIG. 12, serves as traffic controller for data which is to be transmitted over coaxial cables. The coax output character multiplexer and parity generator 110 outputs the 10 bits of a coax message that may vary from message to message. It will be recalled that the first and twelfth bits are always 1 and 0 respectively in accordance with a predetermined message format. A parity generator 900 receives the eight serial bits OSB03-OSB10 which form the 8 bits of a data byte transferred with each coax message and also responds to a control bit generated by a control bit encoder 902 to generate the message parity bit which appears at location OSB11 of a coax message. Under the established convention the parity generator must provide even parity over the first 11 bits. This is accomplished by making the odd-even parity enable inputs of a parity generator 900 responsive to the control bit which appears at positions OSB02. If the control bit is logic 1 the first and second bits of a message character are both true and even parity must be provided over bits 3–11 in accordance with the convention. Alternatively if the control bit is a 0, odd parity must be provided over bits 3–11. The control bit is thus utilized to enable the even command input to parity generator 900 while its complement, which is provided by an inverter 902 enables the odd input. A control bit encoder 904 which generates the control bit includes a type D flip-flop 906 and an OR gate 908 having complementing inputs. While the KMUX 22 is in a polling mode of operation, the selection mode signal OSEL is at logic "0" and OR gate 908 commands a logic "1" control bit as required by the established convention. Convention also requires that exactly the first and the last characters of a selection message contain logic "1" at the control bit position. This is accomplished through the other two inputs to OR gate 908. One of the other inputs is driven by the block length count complete signal, 1BLCC. It will be recalled that this signal goes to 0 approximately concurrently with the beginning of the last selection message cycle and thus appropriately causes a logic 1 control bit to be generated with the last character of the message. The Q output of flip-flop 906 drives the third complementing input to OR gate 908 to enable the generation of a logic "1" control bit with the first character of a selection message. As the location of a selection message is loaded into block address counter 132 by the load block address signal 1LBAD, the clear input of flip-flop 906 which is connected to receive the signal causes flip-flop 906 to be reset. As flip-flop 906 resets its Q output goes low and OR gate 908 is conditioned to generate a logic "1" control bit. At the beginning of the cycle for transmitting the second and subsequent characters of the selection message the increment selection counter signal, 1INSL clocks flip-flop 906, causing it to return to the set state and cease commanding a logic "1" control bit. The D input to flip-flop 906 is connected to a +5 volt positive source 5VPI to insure that the flip-flop always returns to the set state whenever it is clocked. A first set of multiplexers 910, 912 determine whether the eight data bits OSBO3-OSB10 of a coax message contain polling information or selection information and a second set of multiplexers 914, 916 determine whether the first byte or the second byte of a selection word is provided to the first set of multiplexers 910, 912. The selection message outputs of multiplexers 914, 916 are connected to the A inputs of multiplexers 910 and 912. The B inputs of multiplexers 910, 912 receive a logic "1" and "0" at bit positions OSBO3 and OSBO4 respectively to provide the proper code at these two positions for a polling message. The remaining six B inputs receive the six bit current polling address from the OPCO2-OPCO7 outputs from polling counter 116. The select inputs to multiplexers 910, 912 which cause the outputs to provide the B inputs when true is connected through an inverter 918 to the selection signal OSEL. Thus, whenever the KMUX is in the selection mode of operation the A or selection inputs are enabled and otherwise the B or polling inputs to multiplexers 910, 912 are enabled.

In a similar manner the selection input to multiplexers 914, 916 are connected to receive the channel A signal 1CHA. As the first byte of a selection word is being transmitted the 1CHA signal is at logic 0 and the A inputs which are connected to outputs OCHOO—COHO7 from the DMA storage register 108 are enabled. While the second byte is being transmitted signal 1CHA is at logic "1" and the second byte channel outputs OCHO8–OCH15, which are connected to the B inputs, are enabled.

The coax interface logic 112 includes buffers and drivers for the four coaxial cables connectable thereto as well as RO output response sequencers, registers, and drivers for two pairs of twisted wire cables having preassigned addresses "0" and "1" which are connectable to RO33 teletypewriters. The driver/buffer circuits for the coaxial cables are shown in FIG. 13. Only driver/buffer circuit 1 is shown in detail with driver/buffer circuits 2–4 being represented by block diagrams since they are identical in all respects to driver/buffer circuit 1. In addition to the four driver/buffer circuits, the coax driver/buffer 930 includes some circuitry common to all four driver/buffer circuits. A type D short circuit detection flip-flop 932 has its D input connected to a five volt positive voltage source, its clock input connected to the output enable signal OOUTE, its presetting input connected to the system initialize or reset signal, 3IORS, its clear input connected to a short circuit detection circuit 934 and its Q output connected to an AND gate 936. As the output enable signal goes true just prior to the transmission of a serial data character, flip-flop 932 is clocked to the set state to insure the enabling of AND gate 936. A short time later as the first bit of a serial data word arrives on signal input OSD, the signal is passed through AND gate 936 to the input of an inverter 938 in each of the driver/ buffers. The inverter 938 has its output coupled through a 220 ohm resistor 940 to the cathode of a first diode 942 having its anode connected to the coaxial cable and to the cathode of a second diode 944 having its anode connected through a 220 ohm resistor 946 to a positive 12 volt source. The base of a PNP transistor 948 is connected to the anode of diode 944, the collector is connected to the coaxial cable and the emitter is coupled through a 1 K resistor 950 to the plus 12 volt source. The first bit of a coaxial cable message must always be a one and as this is received at the input of inverter 938 the output of the inverter is driven to ground. The voltage divider action of resistor 946, diode 944, and resistor 940 would drive the base of transistor 948 to approximately 6.3 volts if it were not limited by the base-emitter junction of the PNP transistor 948. This voltage is sufficient to turn on transistor 948 and drive it into saturation. The coaxial cable is thus driven to a voltage of approximately 11.3 volts. Under a preassigned convention, any voltage greater than plus 5.5 volts represents a logic "1"and any voltage less than 2 volts represents logic "0". The voltage of 11.3 volts is more than sufficient to represent a logic "1" on the coaxial cables. This high voltage continues until a bit having a logic "0" information content is delivered on the serial data signal. At this time the input to inverter 938 goes low and the output goes high. At this time diode 942 becomes reverse biased and diode 944 is unable to conduct with its anode voltage going to approximately +12 volts to thereby turn off transistor 948. With transistor 948 off, no drive current is supplied to coaxial cable OCX1 and any electrical energy stored by the cable is rapidly dissipated through the 50 ohm resistor 949 and a resistive termination at the opposite end of the cable so that the voltage on the cable very rapidly approaches 0.

A PNP short circuit sensing transistor 960 has its emitter connected to the +12 volt source, its base connected through a 0.002 μf capacitor 962 to the 12 volt source and also through a 220 ohm resistor 964 to the emitter of transistor 948. Under normal operating circumstances a transition from a 0 to 1 on the coaxial cable OCX1 causes a rapid current flow and voltage decrease at the emitter of transistor 948 as the capacitance of the coaxial cable is charged. After this relatively short charging interval the current drawn by the coaxial cable becomes very small and the emitter of transistor 948 return to almost +12 volts for the remaining and largest part of a one microsecond bit time interval. In order for transistor 960 to be turned on the emitter of transistor 948 must drop to a voltage potential below 11.3 volts for a sufficient length of time to allow capacitor 962 to discharge through resistor 964 to a voltage below 11.3 volts. The time constant of capacitor 962 and resistor 964 are chosen so that transistor 960 can not be turned on during a normal 0 to 1 transition. However, if a short circuit exists on coaxial cable OCX1, the voltage at the emitter of transistor 948 may drop below 11.3 volts sufficiently long for transistor 960 to turn on and permit current to flow through the collector thereof. The collectors of each of the transistors 960 are connected through a 12 K ohm resistor 966 to the base of an NPN switching transistor 968 having its emitter connected to ground and its collector connected through a 1 K resistor to a +5 volt source and also to the complementing clear input to flip-flop 932. In the event that any of the short circuit sensing transistors 960 becomes turned on, transistor 968 is turned on causing its collector to drop to a low level and activate the clear input to flip-flop 932 which then resets and disables AND gate 936. Disabling of AND gate 936 prevents damage to the coaxx driver because of a large current surge for a long period of time. A buffer transistor 970 has its base coupled through a 1 K resistor to the coax cable, its collector connected to a +17 volt unregulated voltage source and its emitter coupled through a 12 K resistor 972 to a negative 17 volt unregulated source. The emitter of the buffer transistors 970 is also connected through a diode 974 to a pulse shaping circuit 976. The pulse shaping circuit includes conventional circuitry for squaring and complementing the signals appearing on the coaxial cables and also includes a hysteresis circuit which permits a "0" to "1" transition only when the input signal exceeds 5.5 volts and a "1" to "0" transition only when the input is less than 2 volts. The complemented output is connected through a complementing input to an OR gate 978 which provides the coax data in signal, OCDI, as its output. A second complementing input to OR gate 978 receives a complemented coax data in 5 signal, 1CDI 5. This signal carried the response of the teletypewriters and is merged with the coax responses by OR gate 978 to make a single input signal OCDI. It is thus seen that all of the coaxial cables OCX1-OCX4 are driven and sensed in parallel without distinguishing one from another.

In addition, the RO output response sequencers, registers and drivers interface with the KMUX 22 control circuitry in such a way that the KMUX 22 may treat the teletypewriters as any other data terminals having addresses 0 and 1 even though the speed and format requirements for a teletypewriter may be considerably different than for the data terminals which are connected to the KMUX via the coaxial cables. The TTY interface circuitry receives TTY selection and polling messages directly from the least significant byte, CHO8-CH15 of the DMA storage register 108 and directly from the coax output multiplexer and parity generator 110. These signals are received in parallel as they are transferred to the serial output sequencer 114 for transmission over the coaxial cables. After a selection byte has been transferred to a TTY unit at a much slower data rate than the one million bits per second rate for transmission over the coaxial cables, the TTY interface logic responds to the next polling message by generating a message which indicates that a previously received selection byte has been transferred to the polled TTY unit and that the unit is ready to receive another byte of information. The KMUX 22 continues to send TTY polling and selection messages over the coaxial side as if the teletypewriters were any other data terminal, but the TTY interface logic responds to these signals and generates response signals which the KMUX 22 is unable to distinguish from signals transmitted over the coaxial cables.

As illustrated in FIG. 14, the RO output response sequencers 1000 include combinational logic circuits 1002, a BCD to decimal decoder 1004, sequencer circuitry 1006, 1008, for the 0 and 1 TTY address locations respectively, associated gating logic, and a five bit parallel load shift register 1010. Because the TTY sequencers 1006, 1008 are identical, only the TTY1 sequencer 1008 is shown in detail with the TTY0 sequencer 1006 being represented in blocked diagram form. Combinational logic 1002 receives most of the bits of a coax character as the character is transferred in parallel to the serial output sequencer 114 for parallel to serial conversion. The sequential logic 1002 generates the complement of an RO enable signal, $\overline{OROE} = \overline{CONT} \cdot \overline{OSBO3} \cdot \overline{OSBO5} \cdot \overline{OSBO6} \cdot \overline{OSBO7} \cdot \overline{OSBO8} \cdot \overline{OSBO9} \cdot \overline{LOAD}$. The 1ROE signal is connected to the D input of BCD to decimal converter 1004 to normally enable decimal outputs 8 and 9. These outputs are connected to nothing and no response is induced when these outputs are enabled. However, when the control bit is logic 1. and bit OSBO3 is also logic 1 to indicate that either a selection message or a polling message (the TTY logic does not respond to an end of message control character indicated by bit OSBO4) character, address location 0 or 1 is being addressed and the load signal goes true, the signal 1ROE goes low to enable decimal outputs 0–7. Signal OSEL is connected to the C input of decoder 1004 to enable outpus 5 and 6 when the KMUX 22 is in a selection mode and to enable outputs 1 and 2 when the KMUX is in a polling mode of operation. Bit position OSB10 is communicated through an inverter 1012 and AND gates 1014, 1016 to inputs B and A of decoder 1004 to enable outputs 2 and 6 in response to address 0 and outputs 1 and 5 in response to address 1. As a result of this chosen connection technique, output 1 provides a signal 1POLL ADD 1 which indicates that address 1 is being polled, output 2 generates a signal 1 POLL ADD 0 which indicates when address 0 is being polled, output 5 generates a signal 1LOAD DATA 1 which indicates that a selection message is available for TTY1 and output 6 generates a signal 1LOAD DATA 0 which indicates that a selection message is available for TTY0.

A pair of complementing input NOR gates 1020, 1022 generate TTY reset signals, 1RST0, 1RST1 for the 0 and 1 teletypewriters respectively. These signals permit the interface circuitry to be reset simultaneously by the system reset signal 3IORS or individually by individually reset signal 1RES0 or 1RES1. However, the individual reset signals are not implemented in the present arrangement and are disabled by connection through inverters 1024, 1025 to ground.

The TTY1 sequencer includes six seuquence control flip-flops 1031–1036, which control the operational sequence of the TTY responses. These flip-flops are normally in an idle condition with flip-flops 1031–1034 being preset and flip-flops 1035–1036 being reset. Whenever TTY1 is selected for a data transfer, the 1LOAD DATA 1 signal goes low and is connected to clear or reset flip-flops 1031–1034. The sequence control flip-flops 1031–1036 then remain in their unchanged state until a loading complete signal OLDC1 indicates that a byte of selection information has been transferred from the interface circuitry over the twisted wire pair TTY1 to the teletypewriter assigned address 1. The OLDC1 signal is coupled through an inverter 1038 to the clock input of flip-flop 1031 which has its D input connected to +5 volts to cause flip-flop 1031 to set at the trailing edge of the OLDC1 signal. The next time that address location 1 is polled after the OLDC1 signal has been generated flip-flop 1032 which has its D input connected to the Q output of flip-flop 1031 is clocked to the set state by signal 1POLL ADD 1 from BCD to decimal decoder 1004. The 1POLL ADD 1 pulse is generated concurrently with the load command signal at a time when the signal output enable signal 1OUTE is at logic 0. At this time AND gate 1040 which has one input connected to the Q output of flip-flip 1032 and input connected to the Q output of flip-flop 1032 and drives the J input to flip-flop 1033 is disabled. However, as soon as the complete polling messafe has been transmitted over the coaxial cables, the 1OUTE signal goes to logic 1 to enable AND gate 1040 and as soon as a clock pulse is received from NAND gate 1042 flip-flop 1033 is clocked to the set state. NAND gate 1042 respons to the state 11 of flip-flops 1035, 1036 which are configured to divide the four megahertz signal 4CLK by four, to produce a one-fourth microsecond pulse which repeats every microsecond at the output of NAND gate 1042. One microsecond later flip-flop 1034 which has its D input connected to the Q output of flip-flop 1033 is clocked by the complement of the clock output from NAND gate 1042. A NAND gate 1044 senses the one microsecond between the setting of flip-flop 1033 and the setting of flip-flop 1034 to drive one complementing input of a complement input OR gate 1046 which in turn drives the load input of the 5 bit shift register 1010. During the one microsecond that the load input is activated, shift register 1010 is parallel loaded with the signal 01001 at inputs E, D, C, B and A respectively. As soon as the output from OR gate 1046 goes low, shift register 1010, which is continuously clocked by the complement of the 1 MHz clock pulse output by NAND gate 1042 begins shifting the previously loaded contents thereof out through the QE output and an inverter 1048 as a coax data in signal 1CD15.

The 1CD15 signal is connected as one of the inputs to a complementing input OR gate 978 (see FIG. 13) which provides the coax data in signals OCD1 as an output. The KMUX 22 responds only to the OCD1 signal and is unable to distinguish response messages actually received over the coaxial cables from a TTY response message. The effective TTY response message is thus a one at the first character position to indicate the beginning of the character, a zero at character position number two which is the control bit position, a zero at character bit position number three which is the first data byte position and a one at character bit position number four which is the second data byte position. All other bit positions of the character are logic zero. Since the zero at bit position 11 provides even parity over the first 11 bits of the character the response message meets the requirements of the predetermined message format and is interpreted as a proper response message. Because zeros are shifted into shift register 1010 at the left the shift register continues shifting right even after the previously loaded data has been shifted out of the register but the continuous zero output has no effect upon the KMUX 22. Only when the shift register 1010 again receives a load signal from OR gate 1046 can it again generate an output which is detectable by the KMUX 22. The TTY0 sequencer 1006 is identical to the TTY1 sequencer 1008 except that the OLDC0 load complete signal is substituted for the OLDC1 signal, the 1LOAD DATA 0 signal is substituted for the 1LOAD DATA 1 signal and the 1POLL ADD 0 signal is substituted for the 1Poll ADD 1 signal.

The RO output registers and drivers 1050 are shown in FIG. 15. This circuit includes a divide by 36,363 counter 1052, sequencing flip-flops 1054, 1056, four bit counters 1058, 1060 for addresses 0 and 1 respectively, 10 bit shift register 1062, 1064 for addresses 0 and 1 respectively and line drivers 1068, 1070 for addresses 0 and 1 respectively. Since the operation of the RO output registers and drivers 1050 for address location 0 is identical to the operation for address location 1, the system will be described only with respect to address location 1 operation but it will be appreciated by those skilled in the art that the response for address location 0 is identical.

The four megahertz system clock signal, 4CLK, is inverted by an inverter 1072 and connected to drive a divide by 36,363 counter 1052. This counter may be implemented in any suitable manner such as the series cascade connection of four bit binary counters such as TTL 74161 counters which are connected to load an appropriate number when the most significant carry output goes true. Such a counter provides a 110 Hertz rectangular wave output signal 1074 at its most significant bit position. A pair of timing flip-flops 1054, 1056 have their clock inputs connected to the output of inverter 1072. The D input to flip-flop 1054 is connected to a +5 volt source, 5VP1, and the D input to flip-flop 1056 is connected to the Q output of flip-flop 1054. These flip-flops are normally in a set condition, but the inverting clear inputs are connected to the output of an AND gate 1076 which receives the signals 1LOAD DATA 0 and 1LOAD DATA 1 as inputs. Upon receipt of one of these signals flip-flops 1054 and 1056 are temporarily reset to disable the clocking of counter 1052 whose enable inputs T and P are connected to the Q output of flip-flop 1056. At the next positive transition of the clock pulse output of inverter 1072, after the load data pulse is terminated flip-flop 1054 becomes set and one-fourth microsecond later flip-flop 1056 becomes set to again enable the counting of counter 1052. This disabling of counter 1052 insures no ambiguity can result from the generation of a clock pulse on signal 1074 while data is being loaded into the RO output register 1062 or 1064. The 1LOAD DATA 1 command is coupled through an inverter 1078 to the load input of the 10 bit shift register 1064 and through an OR gate 1080 to the reset input of counter 1060. Shift register 1064 has its clock input connected to the 110 Hertz clock signal 1074 and counter 1060 has its complementing clock input connected to the complement of clock signal 1074. Thus, as the 1LOAD DATA 1 command is generated counter 1056 is inhibited, counter 1060 is cleared and shift register 1064 is parallel loaded with a zero in the most significant bit position, a one in the next bit position and complemented outputs 1CH15-1CH08 from DMA storage register 1008 in the next 8 bit positions. The output of the most significant bit position of shift register 1064 is complemented by an inverter 1082 to obtain the serial sgnal, OR01 which is communicated to line driver 1070 which actually drives the twisted pair line connecting the address 1 teletypewriter to the KMUX 22. The twisted pair cable is driven by a line driver 1062 with RS 232 compatible signal levels in response to logic 1 and logic 0 input conditions.

As soon as the 1LOAD DATA 1 signal is terminated, counter 1052 is enabled and starts to provide 110 Hertz clock signals 1044 which simultaneously shift the contents of shift register 1064 out to the line driver 1070 and increment counter 1060. After all parallel loaded bits of the shift register 1064 have been output to line driver 1070, zeros are shifted in at the left. On the eleventh pulse shift register 1064 begins shifting these zeros out, the zeros are complemented by inverter 1082 and presented to the line driver 1070 as all ones thereafter. The eleventh clock pulse also increments counter 1060 to state 11 which enables NAND gate 1084 to generate a loading complete signal OLDC1 which enables the RO output response sequencer 1008, which is shown in FIG. 14, to respond to the next polling message.

In order for the CPU 16 to send a selection message containing a character to be printed, it first writes the selected address and character into a selected word location in memory. The teletypewriter address is written into bits 0–7 and the data character is written into bits 8–15. Next, the CPU 16 writes the address location of the first memory word into address counter 132 and the number negative two into the block length counter 104 to indicate that the selection message is two characters long. The KMUX 22 will respond by switching to a selection mode at the beginning of the next sequence and transmitting both the address and data character over the coaxial cables. As the address is transferred to the serial output sequencer 114 for serial transmission over the cables, the character at CH8–CH15 is loaded into the RO output register 1064. Since the one megahertz rate of the KMUX 22 is much faster than the 110 Hertz rate of the teletypewriter, both characters will be transmitted over the coaxial cable long before the data character is transmitted to the teletypewriter. Thirty-two microseconds after the second character is transmitted over the coaxial cables, the time out signal will go true and a type B interrupt request will be generated. As the CPU 16 processes the interrupt request the fact that a data terminal at a teletypewriter address failed to respond to a selection message will be detected and since this is a normal condition for a TTY message the interrupt subroutine will cause this response failure to be substantially ignored. Sometime later, after all of the bits of the character have been transferred to the teletypewriter the counter 1060 will cause NAND gate 1084 to generate the OLDC1 signal which will clock flip-flop 1031 in FIG. 14. The clocking of this flip-flop will then enable the RO output response sequencer 1008 to provide the predetermined TTY polling response code the next time that address one is polled by the KMUX 22.

Figures 16, 18:
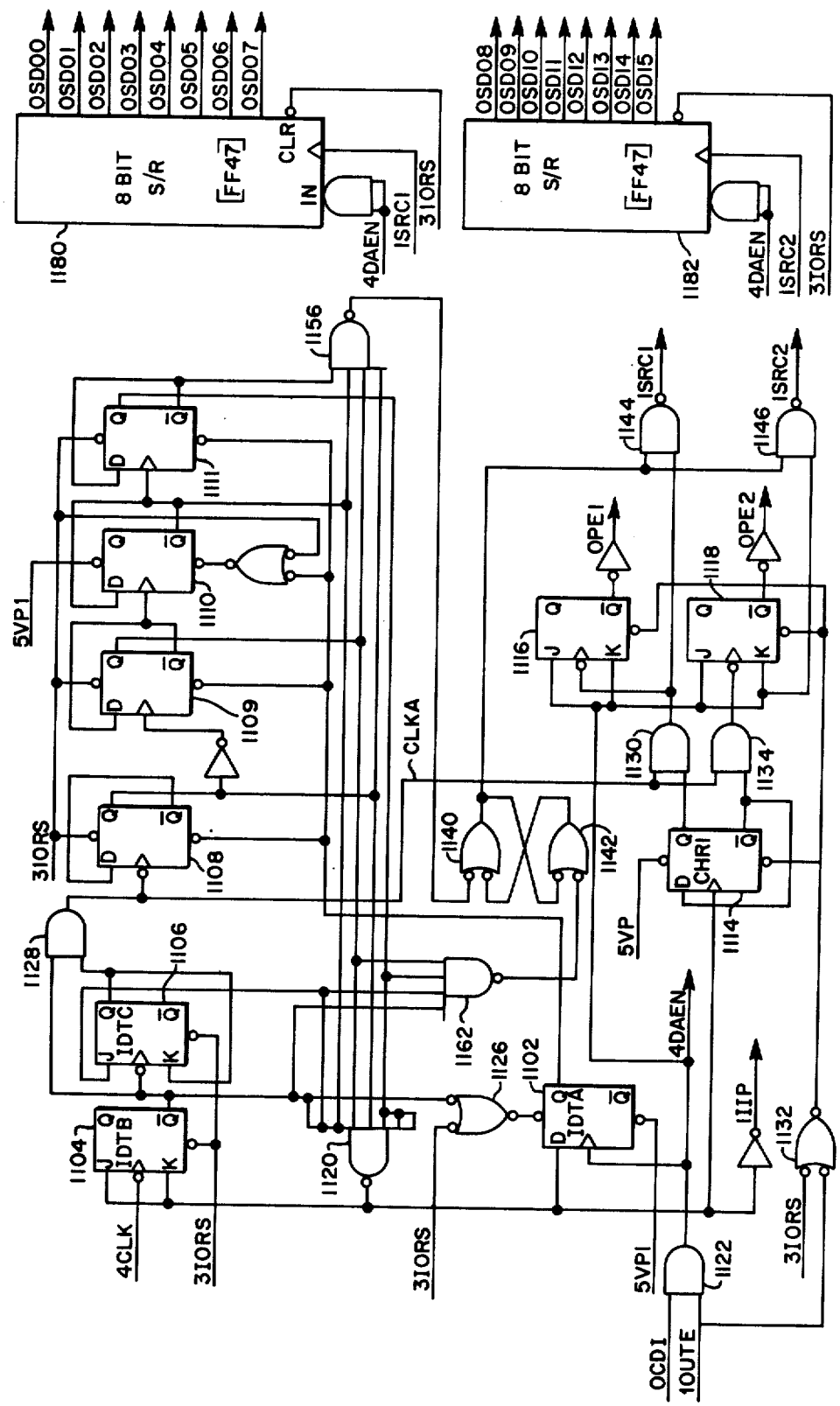
FIG. 16 is a functional block diagram and schematic representation of an input data timer whch forms a portion of the key station multiplexer shown in FIG. 4.
FIG. 18 is a functional block diagram and schematic representation of a status-data register which forms a portion of the key station multiplexer shown in FIG. 4.

The input data timer 122 receives coax and TTY responses via the buffered coax data input signal CDI, digitizes the input signal CDI, checks for parity, and serially shifts the digitized input signal into the appropriate byte position of a status data register 124 via a data enabled signal, DAEN. As shown in FIG. 16, the input data times 122 includes a type D flip-flop 1102, a pair of clocking flip-flops 1104, 1106, for clocking the counting flip-flops 1108–1111, a toggle connected type D character flip-flop 1114 and toggle connected type JK parity error checking flip-flops 1116, 1118. In addition, the input data timer 122 includes associated logic gates for properly controlling the operation of the flip-flops. The operation of the input data timer 122 is best understood in conjunction with the timing diagram shown in FIG. 17 to which further reference is now made. Signal 3IORS, which is a fanout from the system initialize or reset signal, is connected to reset clocking flip-flops 1104, 1106, preset counting flip-flops 1108-1111 to a count of binary 11, preset trigger flip-flop 1102, reset character flip-flop 1114 and reset parity error checking flip-flops 1116, 1118. At idle a NAND gate 1120, which generates the input in progress signal, OIIP, is connected to be enabled and provide a zero output under idle conditions when counter flip-flops 1108-1111 store decimal count 11 and both of the clocking flip-flops 1104, 1106 are reset. Because the signal OIIP is connected to drive the J and K inputs to clock flip-flop 1104, flip-flop 1104 is disabled during the idle state even though the four megahertz system clock signal 4CLK is continually applied to the complementing clock input thereof. An AND gate 1122 is connected to receive the buffered coax data input signal, OCDI, and pass this signal only when enabled by the complement of the output enable signal, 1OUTE. Because the OCDI signal responds to all signals on the coaxial cables whether initiated by the KMUX 22 or a data terminal, the complemented output enabled signal, 1OUTE, which is at logic 0 whenever the KMUX 22 is transmitting over the coaxial cable, is used to disable inputs to the input data timer 122 whenever the KMUX 22 is transmitting over the coaxial cable. In this way, only data terinal generated responses are passed through AND gate 1122.

As the first bit of a response message is generated the data enabled output of AND gate 1122, 4DAEN, goes true to enable the JK toggling inputs to parity checking flip-flops 1116, 1118 and to clock trigger flip-flop 1102. With the D input of flip-flop 1102 connected to the OIIP signal which is at logic 0, flip-flop 1102 becomes reset. For example, if signal 4DAEN goes true at a time 1124, the Q output of flip-flop 1102, which is designated QIDTA in FI. 17, goes true to immediately reset counter 1108-1111 to state 0 and disable NAND gate 1120 to make the input in progress signal OIIP go true. At the trailing edge of the next 4CLK clock pulse input to clocking flip-flop 1104, whose Q output is designated QIDTB in FIG. 17, flip-flop 1104 toggles and QIDTB goes true. As flip-flop 1104 toggles, the Q output, which is connected to a complementing input NOR gate 1126, causes trigger flip-flop 1102 to preset. In addition, the $\overline{Q}$ output of flip-flop 1104 drives the complementing clock input of flip-flop 1106 to toggle flip-flop 1106 each time flip-flop 1104 changes from the reset to the set state. Flip-flops 1104 and 1106 thus form a two bit recycling counter which divide the four megahertz system clock signal 4CLK to form a one megahertz clock signal as flip-fops 1104, 1106 continuously sequence through states 11, 01, 10 and 00. An AND gate 1128 is connected to sense stae 01 and generates an input data timer clock signal, CLKA, having a pulse width of one-fourth microsecond and a period of one microsecond as flip-flops 1104, 1106 sequence through state 01. As the data enabled signal generated by NAND gate 1120 goes true at time 1124 it clocks toggle connected flip-flop 1114, causing its outut QCHR1 to go true to designate that a first response character is being received, and to enable an AND gate 1130, which drives the toggle connected JK inputs to parity error checking flip-flop 1116. Flip-flops 1114, 1116 and 1118 have their clear inputs driven by complementing input NOR gate 1132. NOR gate 1132 is connected to clear these flip-flops in response to either the system reset signal or the complemented output enabled signal, 1OUTE. Since a KMUX output must precede each new response message, the three flip-flops 1114, 1116, 1118, are always in the reset state when the first bit of the first character of a response message is received. If the response message contains two characters, the input in progress signal OIIP goes low and then high again without an intervening KMUX output transmission to toggle flip-flop 1114 to the reset state to indicate that a second character is being received and enabled an AND gate 1134.

As the first clock pulse is generated on clock signal CLKA at time 1138, counter 1108-1111 is incremented from stae 0 to state 1 and flip-flop 1116 is toggled by the coincidence of the clock signal from AND gate 1130 and a logic 1 condition on signal 4DAEN which drives the toggle connected inputs thereto. Since flip-flop 1116 is initially in the reset state and toggles each time a logic 1 appears at one of the eleven bit positions for a first response character, the OPE1 parity error signal, which is derived by complementing the Q output of flip-flop 1116, indicates a parity error for character 1 if true at the end of an eleven character word. As the first clock pulse CLKA is generated a latch composed of complementing input OR gates 1140, 1142 is in a reset state and the output thereof disables a pair of NAND gates 1144, 1146. The other input to NAND gate 1146 is connected to receive the clock pulse CLKA signals from AND gate 1130 when AND gate 1130 is enabled by flip-flop 1114 as the first character of a response message is received. As the second character of a response message is received, AND gate 1134 is enabled to pass the clock pulse signals CLKA to the other input of NAND gate 1146. NAND gate 1144, when fully enabled, generates a shift register clock signal 1SRC1, which clocks the status or least significant byte of status data register 124 which receives the 4DAEN signal as an input and serially receives the response message as it is clocked by signal 1SRC1.

Figure 17:
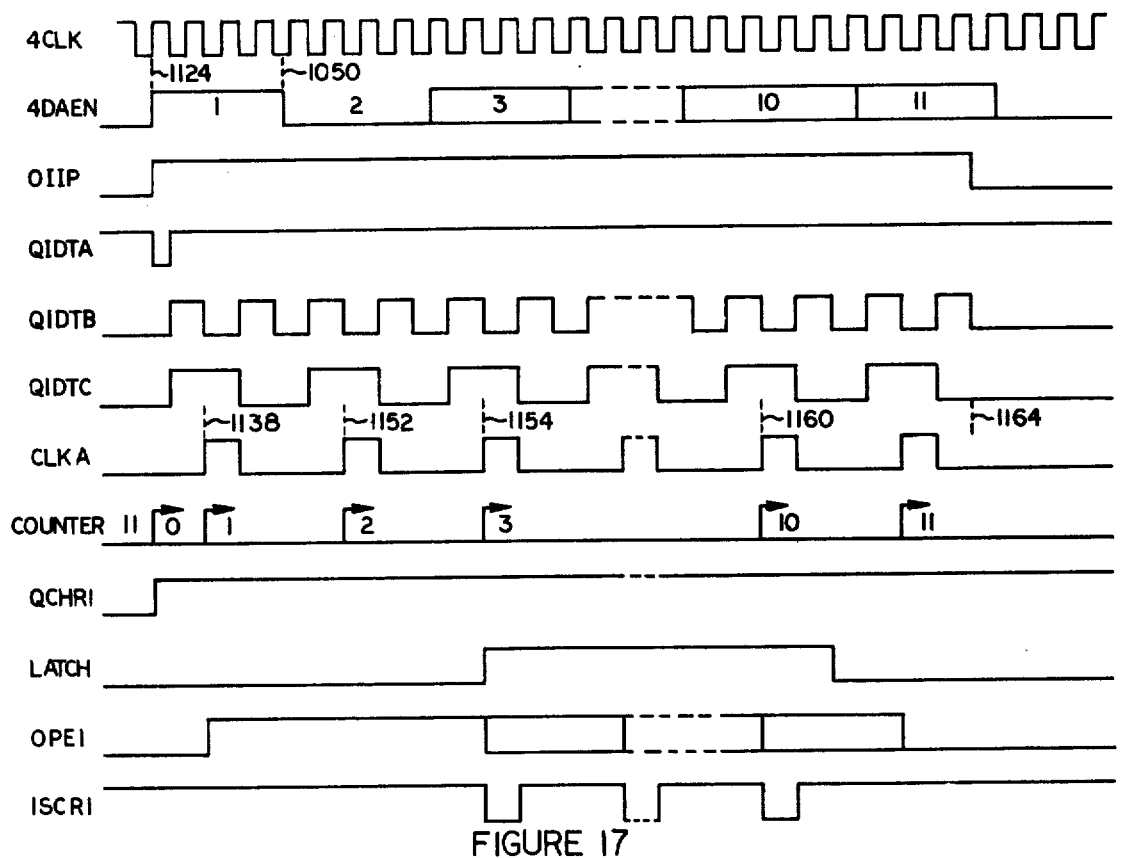
FIG. 17 is a timing diagram illustrating several signals which are pertinent to the operation of the key station multiplexer shown in FIG. 4.

At time 1050, which occurs one microsecond after time 1124, the responding data terminal ceases generating the always true first bit of the response message and begins generating the always false second or control bit of the response message. Thus, the 4DAEN signal goes to logic 0 at time 1050 and flip-flop 1116 is not toggled as the second clock pulse CLKA is generated to clock flip-flop 1116 and increment counter 1108-1111 from state $1_{10}$ to state $2_{10}$ at time 1152. Bits 3-10 of the incoming response character contain the data information and as the counter 1108-1111 is incremented from state $2_{10}$ to state $3_{10}$ at time 1154 when the third clock pulse CLKA is generated, a NAND gate 1156 senses state $3_{10}$ and sets the latch 1140, 1142. The output of the latch enables NAND gate 1144 and NAND gate 1146 to permit the CLKA clock pulse signal to appear at the 1SRC1 output of NAND gate 1144. This first shift register clock pulse signal 1SRC1, shifts the first bit of the data portion of the response character into the first bit position of the status register 124. The input data timer 122 continues to function for each character bit 3-9 of the input response character in a repetitive manner as just described. As the tenth clock pulse signal CLKA is generated at time 1160 the counter 1108-1111 is incremented from state $9_{10}$ to state $10_{10}$, flip-flop 1116 is clocked and toggled or not toggled depending upon the information content of the tenth character bit position, and the signal 1SRC1 generates a clock pulse to shift the last data bit of the status byte into the status rgister 122. As flip-flops 1104, 1106 sequence to state 00 one-fourth microsecond after the termination of clock pulse signal CLKA, a NAND gate 1162 senses count $10_{10}$ in counter 1108-1111 and the 00 state in flip-flops 1104, 1106 to reset the latch 1140, 1142. Thus, as the eleventh clock pulse CLKA is generated, at time 1164, counter 1108–1111 is incremented from state $10_{10}$ to state $11_{10}$ and flip-flop 1116 is clocked to be toggled or not toggled depending upon the information content of the parity bit, (as shown in FIG. 17 a logic 1 in the parity bit position properly toggles flip-flop 1116 to a reset state to indicate no parity error over the first eleven bits of the first response character) but NAND gate 1144 has been previously disabled by the resetting of the latch so that the eleventh clock pulse CLKA is not communicated to the status data register 124 via shift register clock signal 1SCR1. NAND gate 1120 senses the sequencing of clock flip-flops 1104, 1106 to state 00 while the counter is in state $11_{10}$ at time 1164 to drive the input in progress signal OIIP to logic 0 and disable further operation of the input data timer circuit 122. As the input in progress signal OIIP goes to logic 0 the input data timer 122 begins running and if a second character is not received before the time out signal is generated 32 microseconds later (such would be the case for a teletypewriter response) the KMUX 22 goes into a type A interrupt request mode. If however, a second response character is received before the elapse of 32 microseconds as would normally be the case for a CRT key station polling response, AND gate 1122 generates a logic 1 4DAEN signal as the first bit of the second character is received to initiate the cycling of the input data timer 122 in a manner similar to the operation described in conjunction with the first response character. However, as the second response character is received, flip-flop 1114 is toggled from the set to the reset state to indicate that a second character is being received, NAND gate 1130 is disabled to prevent further clocking of the first parity error indicating flip-flop 1116 and NAND gate 1144 is disabled to prevent the communication of further shift register clock pulses 1SRC1 to the status portion of the status data register 124. The toggling of flip-flop 1114 to the reset state also enables AND gate 1134 to permit the clocking of the second parity error indicating flip-flop 1118 for character number two and enable the passage of CLKA clock pulses through NAND gate 1146 via signal 1SRC2 to shift the data byte portion of the second character into the data register of status data register 124 as NAND gate 1146 is enabled by the latch 1140, 1142 during the 3–10 character bits of the second character of the response message.

As shown in FIG. 18, the status data register 124 includes a pair of eight bit serial in parallel out shift registers 1180, 1182. Both registers 1180, 1182 receive the data enabled signal 4DAEN as serial inputs and are connected to be cleared by the system initialize or reset signal, 3IORS. The status register portion 1180 of the status data register 124 is clocked by the first shift register clock signal, 1SRC1 and provides status data outputs OSD00–OSD07. With output OSD07 indicating the last bit shifted into the register. The data register portion 1182 of status data register 124 has its clock input connected to the second shift register clock signal, 1SRC2 and generates status data outputs OSD-08–OSD15 with output OSD15 indicating the last bit shifted into register 1182. The status data outputs are connected to multiplexers within the bus interface logic 126 for selective gating to the data line of the system data bus 12 when system address FF47 is read by the central processing unit 16.

Figure 19:
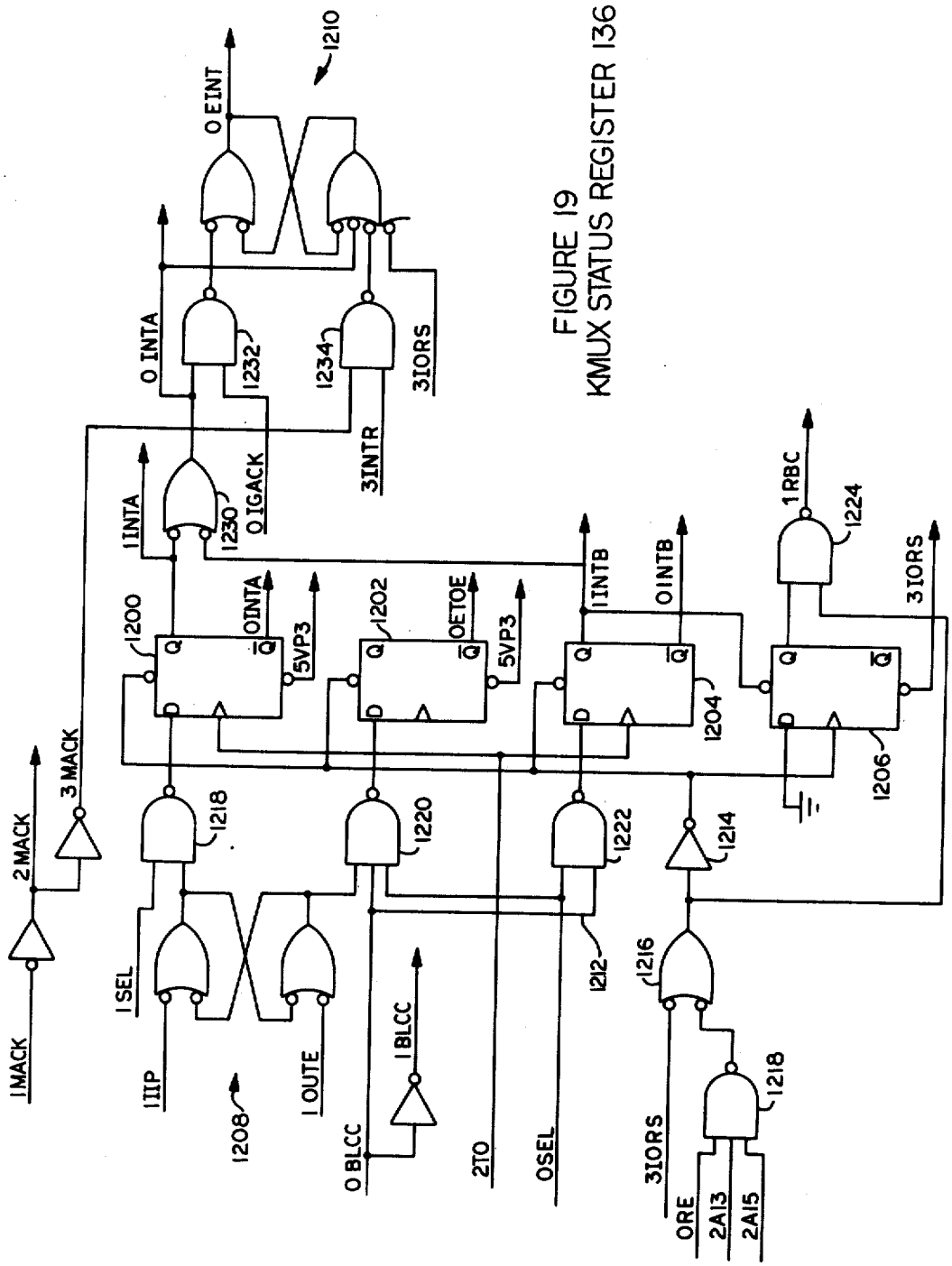
FIG. 19 is a functional block diagram and schematic representation of a KMUX status register which forms a portion of the key station multiplexer shown in FIG. 4.

A portion of the KMUX status register 136 is shown in FIG. 19. Other portions of this register are merely signals taken from operating elements scattered throughout the KMUX 22 and communicated to multiplexers within the bus interface logic 126. The portion of the KMUX status register 136 shown in FIG. 19 includes type D flip-flops 1200, 1202, 1204, 1206, and latches 1208 and 1210. A status register reset signal 1212 is connected to preset flip-flops 1200, 1202 and 1204, while resetting flip-flop 1206. The status register reset 1212 is generated by an inverter 1214 which is responsive to the output of a complemented input OR gate 1216. The system initialize or reset signal 3IORS provides one input to OR gate 1216 while a NAND gate 1218 provides the other input. NAND gate 1218 receives a read enable signal ORE and system address signals 2A13 and 2A15. The read enable signal goes true when one of the KMUX 22 registers is being addressed, the memory write signal is false (indicating a read operation), address line A14 is active and a delayed data enabled signal allowing time for the elimination of any bus address line skew has been generated. The output of NAND gate 1218 thus indicates a read command for the KMUX status register 136 and resets the register at the trailing edge of this command. Latch 1208 keeps track of whether the last KMUX 22 data terminal communication was an output or an input of data. The input in progress signal, 1IIP, is connected to set latch 1208 when data is received by the KMUX 22 and the output enable signal 1OUTE is connected to reset the latch 1208 when data is transmitted by the KMUX 22. A NAND gate 1218, which drives the D input to flip-flop 1200 receives the set output of latch 1208 and the selection mode signal 1SEL as inputs. Thus, if the KMUX 22 is in a polling mode and the last communication activity was a data input when the time out signal, 2TO, goes true (as when a polling response is received), the time out signal clocks flip-flop 1200 to the reset state to indicate an A type interrupt and activate an interrupt signal OINTA. On the other hand, if the KMUX is in a selection mode and the last activity was the transmission of the last character of a selection message as indicated by the output enable signal 1OUTE and the block length count complete signal OBLCC, a NAND gate 1220, which drives the D input of flip-flop 1202, causes flip-flop 1202 to become reset as it is clocked by the time out signal, 2TO. This situation occurs when a selection response signal is not received within 32 microseconds after the transmission of a complete selection message. An end time out error signal, OETOE, taken from the $\overline{Q}$ output of flip-flop 1202 indicates this condition. A NAND gate 1222 drives the D input to flip-flop 1204 in response to the block length count complete signal OBLCC and the selection signal OSEL. Flip-flop 1204 is thus always reset by the first time out signal following the complete transmission of a selection message to indicate a B type interrupt with a signal, OINTB, taken from the $\overline{Q}$ output of flip-flop 1204. Signal OINTB thus always indicates a selection type interrupt with signal OETOE indicating whether or not a correct selection response was received.

Flip-flop 1206 is connected to be preset by the Q output of flip-flop 1204 when a type B interrupt is indicated. When set, the Q output of flip-flop 1206 enables a NAND gate 1224 which receives the complement of the status register reset signal 1212 and generates a reset block length counter signal, 1RBC in response thereto. The reading of the KMUX status register 136 following a type B interrupt thus causes both the KMUX status register 136 and the block length counter 104 to be reset.

A small amount of system control logic is also associated with the KMUX status register 136. A complementing input OR gate 1230 has its complementing inputs connected to the Q outputs of flip-flops 1200 and 1204. The output of OR gate 1230 thus generates an interrupt signal, OINTS whenever either a type A or a type B interrupt condition is indicated. A NAND gate 1232 receives the OINTS signal and an internally generated interrupt grant acknowledge signal OIGACK. The output of NAND gate 1232 is connected to set latch 1210 as the central processing unit 16 begins processing a KMUX 22 requested interrupt. The set output of latch 1210 generates an enable interrupt signal, OEINT. The latch 1210 may be reset by the system initialize or reset signal, 3IORS, the disappearance of the interrupt signal, OINTS, or by the output of a NAND gate 1234 which receives the complement of the memory acknowledge signal 3MACK and the complement of the system interrupt signal 3INTR, which is activated by the CPU to obtain the interrupt vector which points to the address of the start of the interrupt program. This latter signal causes the latch 1210 to reset at the start of the memory acknowledge signal which indicates that the interrupt vector has been received by the CPU. The resetting of latch 1210 removes the interrupt vector from the gated CPU data bus output. (This allows the CPU to access the KMUX registers without receiving the interrupt vector ORed with the KMUX register data). The signal OEINT causes the KMUX 22 interrupt vector 0120$_{16}$ to be output by gates to the data lines approximately concurrently with the generation of the grant acknowledge signal OIGACK.

Figure 20:
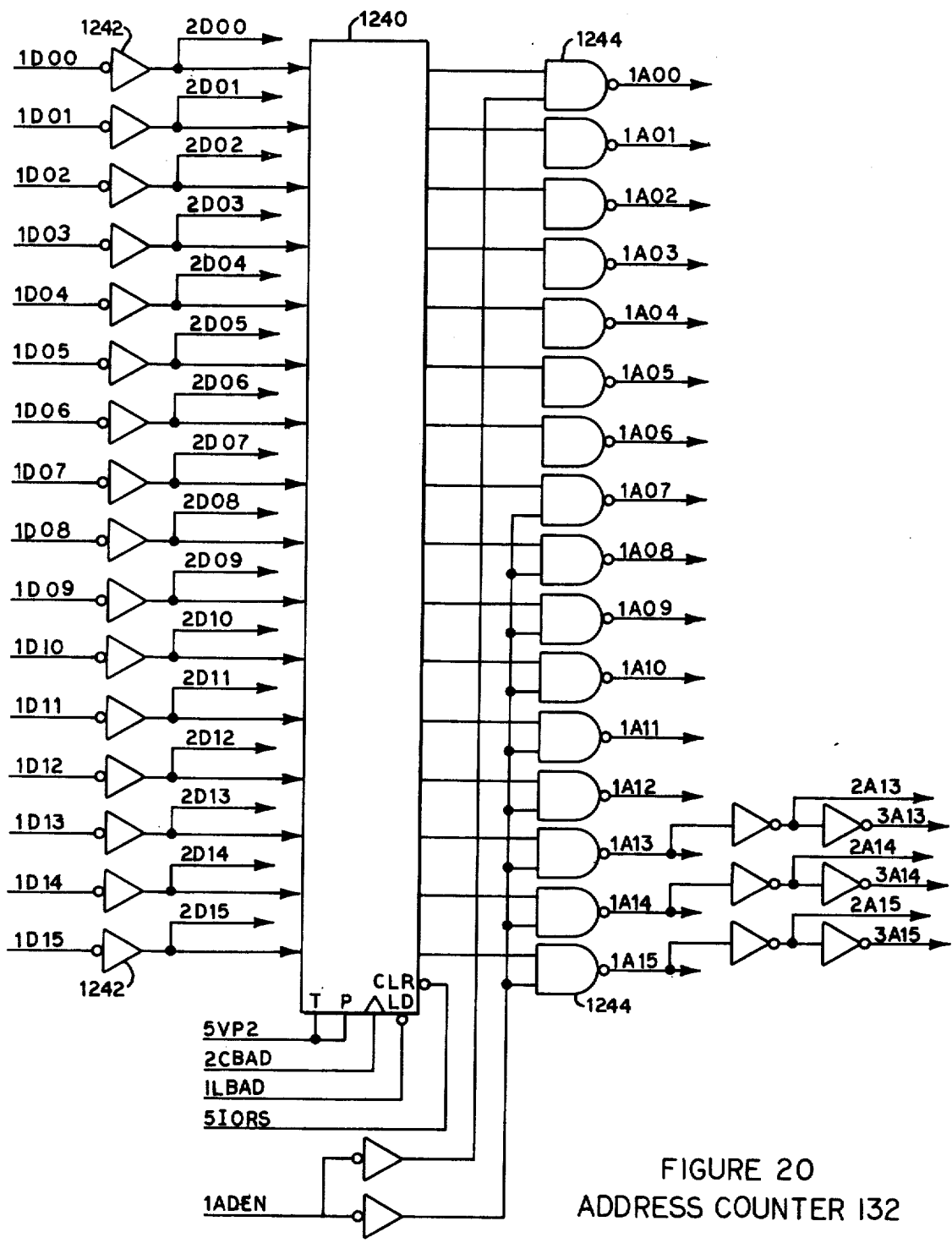
FIG. 20 is a functional block diagram and schematic representation of an address counter which forms a portion of the key station multiplexer shown in FIG. 4.

The address counter 132, which is shown in FIG. 20, is a 16 bit presettable binary up counter 1240. Sixteen inverters 1242 have their inputs connected to the data lines 1D00-1D15 of the system data bus 12 and generate data signals 2D00-2D15 at their outputs. These data signals are applied to the 16 inputs of the counter 1240 and also communicated to other parts of the KMUX 22. Each of the 16 binary outpus from counter 1240 is connected as an input to a different NAND gate 1244 which is connected to be enabled by the address enable signal 1ADEN. The outputs of the NAND gates 1244 are connected to drive the address lines 1A00-1A15 of the system data bus 12. In addition, the outputs at signals 1A13-1A15 are each twice inverted to generate signals 2A13-2A15 and 3A13-3A15 for decoding by other parts of the KMUX 22 in order to determine when one of the KMUX registers is being addressed by the CPU 16. The address enable signal is generated by the DMA sequencer 106 at a time when an address stored in address counter 132 is to be communicated to memory 14 during the course of a direct memory access in which the KMUX 22 receives a selection word from memory 14. Incrementing of address counter 132 is continuously enabled by connection of the T and P increment enable inputs to a +5 volt source. A load block address counter signal 1LBAD is generated by logic associated with the block length counter 104 in response to the data strobe signal 1DST which is generated approximately concurrently with a memory cycle command on the system data bus 12 which commands that data appearing on the bus data lines be written into an addressed location. A clock block address counter signal, 2CBAD, is connected to the clock input of address counter 132 and is also generated by logic associated with the block length counter 104. The 2CBAD signal is generated approximately concurrently with each 1LBAD signal to clock data into the counter 1240 when the load input is enabled and is also generated in response to the start character output signal, 1SCO to increment the address counter 132 in preparation for a subsequent direct memory access as previously described in conjunction with FIGS. 10 and 11.

Figure 21:
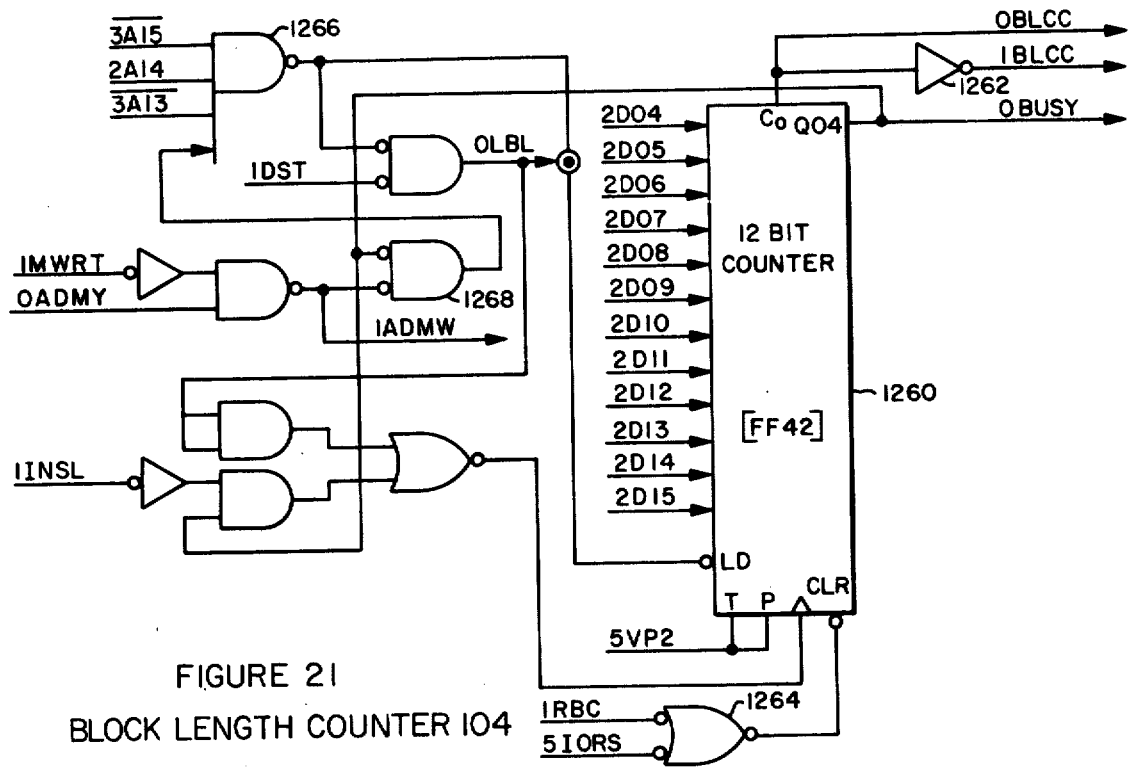
FIG. 21 is a functional block diagram and schematic representation of a block length counter which forms a portion of the key station multiplexer shown in FIG. 4.

As shown in FIG. 21, the block length counter 104 includes a presettable 12 bit binary up counter 1260 and associated sequential logic. The 12 data inputs to counter 1260 are connected to the 12 least significant, complemented bus data signals, 2D04-2D15. The carry output from counter 1260 generates a logic one block length count complete signal, OBLCC, when the counter stores all ones. An all ones information state is equivalent to a negative 1 in the signed two's complement binary negative number representation used herein. The OBLCC signal is complemented by an inverter 1262 to generate a signal 1BLCC. A busy signal, OBUSY, is generated by the most significant binary output of counter 1260. As part of the preparation for a selection cycle sequence, the central processing unit 16 loads the block length counter 104 with a negative number having a magnitude equal to the number of bytes in the selection message. This negative number always causes a logic one to appear at the busy signal. As bytes are sequentially transmitted to the selected data terminal, the block length counter 104 is incremented until it is incremented to zero following the transmission of the last byte. The busy signal thus indicates that the CPU has commanded a selection message which has not yet been completely transmitted to the selected data terminal. The all ones condition of counter 1260 causes the OBLCC signal to go true when the next increment will cause the counter 1260 to overflow to zero. Signal OBLCC thus indicates that the last byte of a selection message is being operated upon. A complementing input NOR gate 1264 drives the complementing clear input to the counter 1260 and clears the counter in response to the system initialize or reset signal 5IORS or in response to a reset block length counter signal 1RBC. The reset block length counter command, 1RBC, is generated by logic associated with the KMUX status register 136 (see FIG. 19) as the status register is reset when read by the CPU 16 following a type B selection interrupt. The clock input to counter 1260 is activated either by a load block length counter signal, OLBL, which is generated in response to the data strobe signal 1DST when the address of the block length counter 1260 is indicated on the system address lines, or by the increment selection counter signal, 1INSL only when the busy signal is at logic one. The increment selection counter signal is generated by the sequence controller 102 to initiate each selection cycle within a selection sequence. By requiring the incrementing clock signals to be enabled by the busy signal, the block length counter 104 can not be incremented out of the zero state and the 1INSL pulse that is generated by the sequence controller 102 at the transition from a selection sequence to a polling sequence subsequent to the reset block length counter signal is ineffective and can not increment the counter 1260 from state zero to state one. The counter thus remains in state one until a new negative number is loaded by the CPU 16 in preparation for another selection sequence. The complementing load input to counter 1260 is activated by the output of a NAND gate 1266 when bus address lines A13-A15 carry binary number 2, and when an AND gate 1268 is enabled by the logic zero state of the busy signal and by an address memory write signal, 1ADMW, which indicates that the CPU 16 has activated the memory write bus line and has addressed one of the memory locations assigned to the KMUX 22. This latter condition is indicated by the address memory signal 0ADMY.

Figure 22:
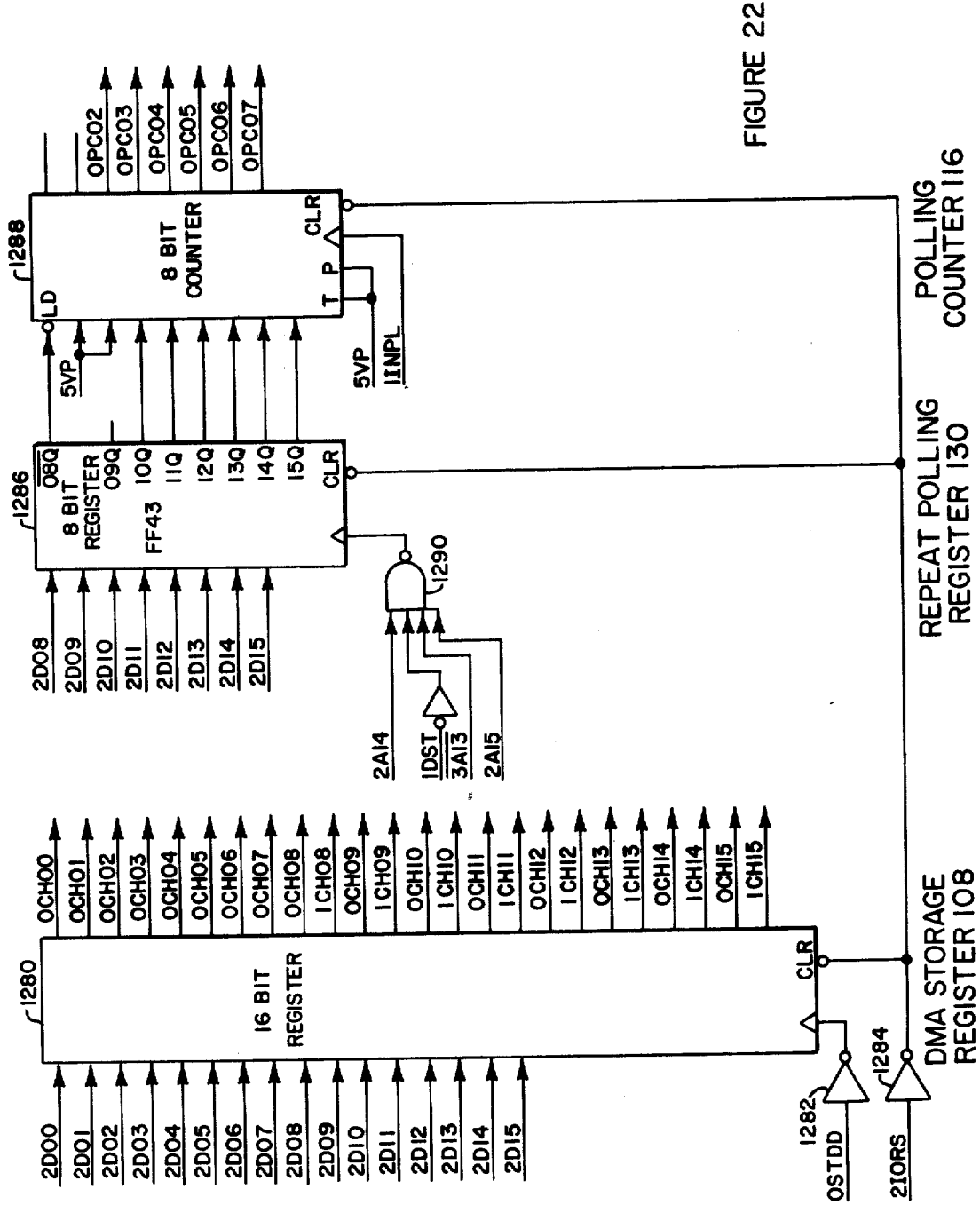
FIG. 22 is a functional block diagram and schematic representation of a DMA storage register, repeat polling register, and polling counter which form a portion of the key station multiplexer shown in FIG. 4.

The DMA storage register 108, repeat polling register 130, and polling counter 160 are shown in FIG. 22. The DMA storage register 108 includes a 16 bit parallel-in parallel-out register 1280 and associated combinational logic. The 16 inputs to register 1280 are connected to receive signals 2D00-2D15 which are derived from the system data bus 12. The outputs of register 1280 provide channel signals 0CH00-0CH15. In addition, the complement outputs are implemented for the least significant byte to provide complemented channel signals 1CH08-1CH15. An inverter 1282 complements the strobe data delayed signal, 0STDD to drive the clock input to register 1280. The strobe data delayed signal is generated in response to the memory acknowledge signal from memory 14 as memory 14 is read during a direct memory access and clocks the information provided on the system data bus data lines into DMA storage register 108. The system initialize or reset signal 2IORS is complemented by an inverter 1284 which drives the clear input to register 1280, as well as the clear inputs to an 8 bit register 1286 of the polling register and an 8 bit counter 1288 of the polling counter.

The register 1286 of the repeat polling register 130 receives the least significant byte from the data lines 2D08-2D15 when clocked by the output of a NAND gate 1290 in response to the complement of the data strobe signal 1DST and binary number 3 on address lines 2A13-2A15.

The eight bit counter 1288 of polling counter 116 receives the six least significant bits 10Q-15Q, which are output from register 1286 as inputs to the six least significant bits of counter 1288. The complement output 08Q of the most significant bit of repeat polling register 1286 which is responsive to data input 2D08 drives the complementing load command input to counter 1288. The least significant six outputs of counter 1288 generate the six bit polling counter address signals 0PC02-0PC07 which identify one of the 64 mutually exclusive addresses which are assigned to the data terminals. The two most significant bits of counter 1288 are not implemented and any overflow to or from these two most significant bit positions is ignored. The increment inputs T and P to counter 1288 are continuously enabled by connection to a 5 volt source 5VP. The clock input to counter 1288 is driven by the increment polling counter signal, 1INPL, which is generated by the sequence controller 102 to initiate each separate polling cycle. During a normal polling sequence, a polling cycle is initiated by the increment polling counter signal which increments counter 1288 to cause it to output a new address which is subsequently transmitted over the coaxial cables under control of the serial output sequencer 114. However, if the CPU 16 writes a "1" into bit position 8 of memory location FF43$_{16}$, which is the repeat polling register, the 08Q output of register 1286 enables the load input to counter 1288. This enabled load input overrides the incrementing operation of counter 1288 and the increment polling counter clock pulses cause the output 09Q-15Q from register 1286 to be loaded into the counter locations 02-07 instead of incrementing the counter. The two most significant inputs to counter 1288 are connected to 5 volts positive so that ones are automatically loaded into these positions. However, since the outputs are not implemented, these ones have no effect on system operation. Thus, once a one is loaded into bit position 08 of repeat polling register 1286 the binary address represented by bit position 09Q-15Q are continuously transmitted with each polling message until the contents of the repeat polling register are changed by the clearing thereof with a system initialize or reset signal or by the CPU 16 writing different information into the repeat polling register 130.

A bus request and interrupt processing portion 1300 of bus interface logic 126 is shown in FIG. 23. A pair of inverters 1302, 1304 generate binary coded interrupt address level signals 1INA1 and 1INA2 which determine the interrupt priority level of the KMUX 22. The inputs to inverters 1302 and 1304 are normally connected to ground and the lowest interrupt priority level, priority level one is established by this configuration. However, if the input to inverter 1304 is clipped or otherwise opened, signal 1INA2 goes to logic zero and a second priority level is established. The third priority level is established by clipping the lead input to inverter 1302 and the fourth interrupt priority level, which is the highest level, is established by clipping the lead inputs to both inverters 1302 and 1304. In similar fashion bus request address priority levels 1BRA1 and 1BRA2 are established by clipping normally grounded lead inputs to inverters 1306 and 1308. Because bus request address priority level one, which is the lowest priority level, is reserved exclusively for the central processing unit 16, at least one of the leads must be clipped. For purposes of illustation, the lead input to inverter 1308 has been clipped herein to establish bus request address priority level two. A first binary decoder 1310 responds to the binary coded interrupt address level signals and generates four decoded discrete interrupt request signals in accordance with the binary coded inputs. A set of four NAND gates having their outputs connected to the interrupt request lines 1INR1-1INR4 of the system data bus 12, receive the four decoded outputs as inputs and the interrupts signals 0INTS as a second enabling input. The interrupts signal gates the decoded interrupt request signal onto the system data bus when either a type A or a type B interrupt has been established by logic associated with the KMUX status register 136. A second binary decoder 1314 receives the bus request address priority signals 1BRA1 and 1BRA2 and drives three NAND gates 1316 with decoded outputs. The NAND gates 1316 are enabled by the direct memory access request signal 0DMRQ and activate the appropriate system data bus request line when enabled. Bus request level one is not implemented in the KMUX 22 because this level is reserved exclusively for the CPU 16. A combinational logic circuit 1318 receives the four binary coded interrupt and bus request address level signals, the 0INTS signal, the 0DMRQ signal, and the three system data bus signals 1GA1, 1GA2, and 1GINT. Signals 1GA1 and 1GA2 are binary coded signals representing the priority level of an interrupt or bus request which is being granted by the CPU 16. Signal 1GINT is at logic zero when an interrupt request is being granted and at logic one when a bus request is being granted. The sequential logic 1318 genrates a bus request enabled signal $$1BRE = [(\overline{1NA1} \oplus GA1) \cdot (\overline{BRA2} \oplus GA2) \cdot \overline{GINT} \cdot DMRQ]'$$

which indicates when a bus request is being granted on a priority level corresponding to that of the KMUX 22. Similary, the combinational logic 1318 generates an interrupt request enabled signal $$1IRE = [(\overline{DRA1} \oplus GA1) \cdot (\overline{BRA2} \oplus GA2) \cdot GINT \cdot DMRQ]'$$

which is activated when the CPU 16 grants a requested interrupt on a priority level requested by the KMUX 22. The signals 1BRE and 1IRE are connected to complementing inputs of an OR gate 1320 which drives the D input of a type D flip-flop 1322 which is normally in the set state. The grant requested interrupt bus signal, 1DRI, drives an inverter 1324 which drives the clock input to flip-flop 1322 as well as an AND gate 1326. When granting an interrupt or bus request, the CPU 16 first establishes the signals 1GA1, 1GA2 and 1GINT to indicate the type and priority level of the request which is being granted. Once these signals are established a grant request out signal is generated which is daisy chained through the various units which are connected to the bus and labeled grant request in 1GRI as it is received by the KMUX 22. If the granted request does not match a KMUX request, the D input to flip-flop 1322 is at logic zero when the clock input thereto is activated by signal 2GRI. This clock signal then causes flip-flop 1322 to switch from the set to the reset state. An inverter 1328 which drives the daisy chained bus signal grant request signal out, 1GR0 from the KMUX 22 responds to the $\overline{Q}$ output of flip-flop 1322 to drive the 1GR0 signal to logic zero as flip-flop 1322 resets. In this manner, the grant request in signal 1GRI which is received by the KMUX 22 is passed on down the line only if an existing KMUX request does not match the granted request as to type and priority level. When the intended unit farther down the system data bus receives the KMUX 1GR0 signal as a grant request in signal, it responds with a data bus grant acknowledge signal 1GACK which is inverted by an inverter 1330 to drive on input to a NAND gate 1322 to logic one. When the CPU receives the grant acknowledge signal it terminates generation of its grant request out signal and this termination is passed along the system data bus until it is received by the KMUX 22 as a return of the signal 1GRI to logic one. This return to logic one is complemented and then complemented again to cause signal 3GRI to return to logic one and fully enable NAND gate 1332. A NOR gate 1334 having complementing inputs responds to the enabling of NAND gate 1332 by driving the complementing preset input to flip-flop 1322 to logic zero and thereby presetting flip-flop 1322. This presetting of flip-flop 1322 causes a termination of the 1GR0 signal and in this manner the termination of the daisy chained grant request signal is passed down the chain much as the initiation of the signal was. OR gate 1334 is also connected to preset flip-flop 1322 in response to the system initialize or reset signal 3IORS. If a granted request matches a type and priority level of request from the KMUX 22, the D input to flip-flop 1322 is at logic one when the grant request signal in is received and flip-flop 1322 does not change states so that the grant can not be passed on by the grant request out signal 1GR0. Instead, an AND gate 1326 becomes fully enabled by the Q output of flip-flop 1322 and the complement of the grant request in signal, 2GRI. A logic one signal at the output of AND gate 1326 drives the D input to a normally reset flip-flop 1340 causing flip-flop 1340 to set at the next low to high transition of clock signal 3CLK which is the complement of the four megahertz system clock signal 4CLK. The setting of flip-flop 1340 enables an AND gate 1342 which is driven by the Q output of flip-flop 1340 and the output of AND gate 1326. The AND gate 1342 drives the J input of flip-flop 1344 which is normally reset but becomes set when its complementing clock input is clocked by the 4CLK system clock signal one-fourth microsecond after flip-flop 1340 becomes set. The Q output of flip-flop 1344 drives an internal grant acknowledge signal, 0IGACK, which is inverted by a NAND gate 1346 to drive the system data bus grant acknowledge signal, 1GACK. As the CPU 16 receives the grant acknowledge signals, 1GACK, it terminates the grant out signal which causes the signal 2GRI to return to logic zero and thereby disable AND gate 1326 so that flip-flop 1340 returns to the reset state when it is next clocked by signal 3CLK. Flip-flop 1344 however remains in the set condition causing the grant acknowledge signal 1GACK to be continuously generated on the bus lines until a requested interrupt has been processed or until the KMUX is ready to relinquish bus mastership as required for the predetermined protocol of the system data bus 12. As the CPU 16 terminates the grant request out signal and responds to receipt of the grant acknowledge signal, signal 3GRI returns to logic one to enable one input to an AND gate 1348. The other input ot AND gate 1348 is driven by the outpuf of a complementing input OR gate 1350. The output of AND gate 1348 drives the K input to flip-flop 1344. IF a KMUX interrupt request has been granted by the CPU, the CPU generates an interrupt cycle signal 1INTR on the system data bus to obtain the address of the interrupt vector. A fanout of the signal 3INTR is connected to OR gate 1350 to enable AND gate 1348 and reset flip-flop 1344 at the conclusion of an interrupt subroutine. Alternatively, an enabled memory cycle signal, 1EMCY, is connected to the input of OR gate 1350 to cause flip-flop 1344 to be reset at the end of a direct memory access cycle. The signal 1EMCY is generated concurrently with the memory acknowledge signal which is generated by memory 14 as the information content at a memory address location which has been read is established on the data bus lines of the system data bus 12. As flip-flop 1344 resets, signal 1GACK returns to logic one and either a granted interrupt is terminated or a granted bus mastership is relinquished. Flip-flops 1340 and 1344 which are normally in the reset state have their complementing clear inputs connected to the system initialize or reset signal 3IORS.

A bus data control 1360, which is shown in FIG. 24, forms a portion of the bus interface logic 126 and performs the function of communication interfacing with the system data bus 12. The bus memory cycle signal 1MCYC, which may be either locally or externally generated is received by a pair of inverters 1362, 1364 to generate a drive signal 3MCYC which is communicated to other parts of the system. A synchronization flip-flop 1366 receives the complement of the system memory write bus signal 1MWRT at its D input and is clocked by a signal 3CLK which is the complement of the four megahertz system clock signal 4CLK. The preset input to flip-flop 1366 is diabled by connection to a positive 5 volt source and the reset input is connected to the system initialized or reset signal 3IORS. The Q output of the flip-flop 1366 provides a memory write signal, 2MWRT, which is synchronized with the system clock signal. A combinational logic circuit 1368 receives bus address signals 1A00–1A12 as well as signal 3MCYC and as an output generates an address memory signal, OADMY =
MCYC·A00·A01·A02·A03·A04·A05·A06·A07·$\overline{A08}$·A09+A10·A11·A12.

This signal goes true when the system memory cycle signal is true and one of the KMUX registers having system addresses $FF40_{16}$–$FF47_{16}$ is being addressed by the address lines to the system data bus 12. Inverters 1370–1372 receive and send out the bus address lines A13–A15 for further decoding to determine which of the 8 KMUX assignable registers is being addressed. Inverters 1374 and 1375 receive and amplify the bus interrupt signal, 1INTR, to produce a siganl, 3INTR, which goes active during the execution of the last instruction of an interrupt subroutine..

A NAND gate 1376 receives the complement of the bus interrupt signal, 1INTR, and also receives the interrupt enabled signal, OEINT, to produce an output which becomes active when a KMUX 22 generated interrupt request has een enabled and the bus signal, 1INTR, is active. The output of NAND gate 1376 drives one complementing input of an OR gate 1378. Another complementing input of OR gate 1378 is driven by the complement of the address memory signal, OADMY. The output of OR gate 1378 drives the D input to a first of three type D sequencing flip-flops 1380, 1381 and 1382. These flip-flops have their preset inputs disabled by connection to a positive 5 volt source and their reset inputs connected to the system initialize or reset signal 3IORS. The clock inputs of these flip-flops 1380–1382 are connected to signal 3CLK. The D input to flip-flop 1381 is connected to the Q output of flip-flop BDCA 1380 while the D input to flip-flop BDCC 1382 is connected to an AND gate 1384 having its two inputs connected to the Q output of flip-flop BDCA 1380 and the Q output of flip-flop BDCB 1381. In addition to driving the D input to flip-flop BDCC 1382, the output of AND gate 1384 generates a data enabled signal ODES which enables 17 NAND gates 1386 which drive the system data bus data lines with the 16 data signals and the no data parity signal, 1DPN.

Two NAND gates 1388 operate in parallel to generate a locally generated memory acknowledge signal, 1MACK, when the data enabled signal ODES is true and the Q output of flip-flop 1382 is true. A NAND gate 1390 generates a data strobe signal, 1DST, when the data enabled signal ODES is true, the memory write signal 2MWRT is true and the $\overline{Q}$ output of flip-flop BDCC 1382 is true. The data strobe signal is a ¼ microsecond pulse which strobes information appearing on the data lines of the system data bus 12 into one of the KMUX 22 registers. The NAND gate 1392 is connected to produce an output which is complemented to result in a read enable signal, ORE, which goes true when the data enabled signal, ODES, is true, the address memory signal, OADMY, is true, the address signal, 2A14, is true to indicate that a register having an address FF42, FF43, FF46, or $FF47_{16}$ is being addressed, and the memory write signal, 2MWRT, is at logic 0, indicating that an addressed register is being read.

Figure 25:
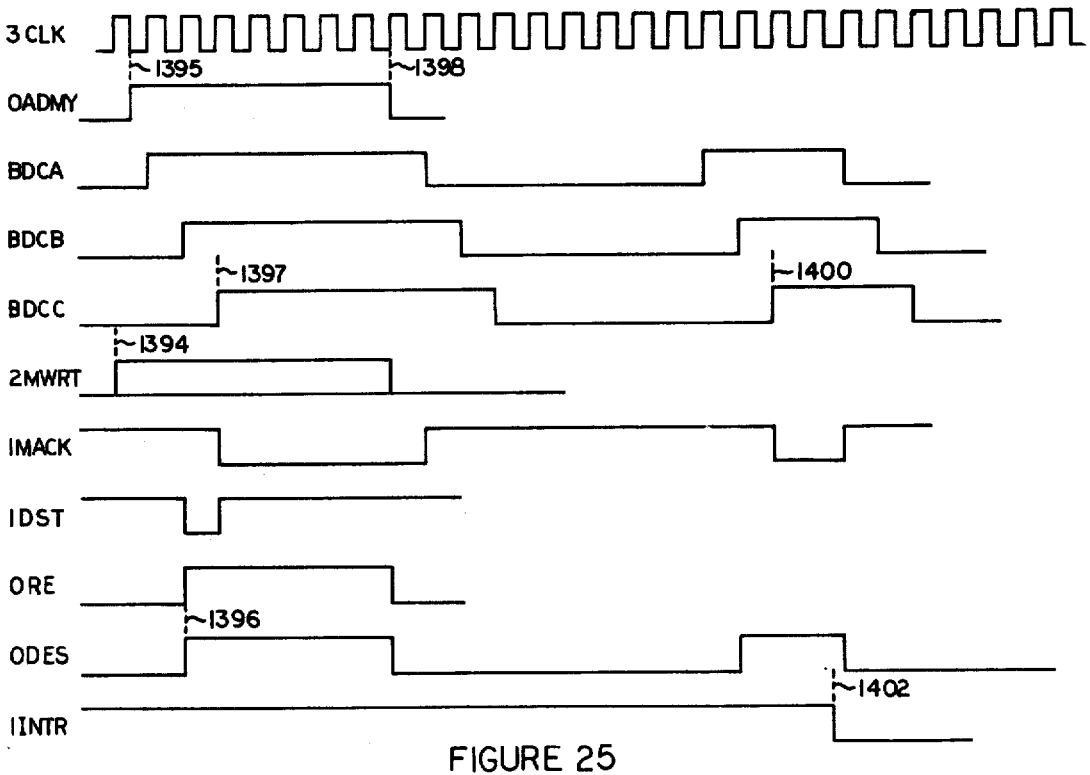
FIG. 25 is a timing diagram illustrating several signals which are pertinent to the operation of the bus data control shown in FIG. 24.

The operation of the bus data control is best understood in conjunction with the timing diagram shown in FIG. 25. As the CPU 16 reads out of or writes into the KMUX 22 it first establishes the memory write signal, 1MWRT, which is synchronized by the flip-flop 1366 to produce the synchronous memory write signal, 2MWRT, which becomes active for example at time 1394. Immediately subsequent to the establishment of the memory write signal the memory cycle signal, 1MCYC, and address signals are established to produce the address memory signal, OADMY, for example at time 1395. At the next three rising edges of the four megahertz clock signal 3CLK, the flip-flop BDCA 1380, BDCB 1381, and BDCC 1382, become set in sequence at ¼ microsecond intervals. The data enabled signal ODES goes true at time 1396 as both flip-flops 1380 and 1381 become set. If the memory write signal, 2MWRT, is true at time 1396, NAND gate 1390 is activated to generate the data strobe signal, 1DST, to clock the data into the address register. As flip-flop BDCC 1382 is set ¼ microsecond later, the data strobe signal is disabled. Alternatively, if the memory write signal, 2MWRT, is at logic 0 at time 1396, the NAND gate 1392 is activated, causing the read enable signal, ORE, to enable the resetting of interrupt flip-flops and to enable the reading of flip-flops of registers having addresses FF42, FF43, FF46, and $FF47_{16}$. As flip-flop BDCC 1382 becomes set at time 1397, NAND gates 1388 generate the the memory acknowledge signal 1MACK. The CPU 16 responds to the memory acknowledge signal by terminating the memory cycle signal, 1MCYC, a short time later to cause the termination of the address memory signal, OADMY, for example at time 1398. The three flip-flops BDCA 1380-BDCC 1382 respond by sequentially resetting at ¼ microsecond intervals. As flip-flop BDCA 1380 resets, the data enabled signal, ODES, becomes false to disable the memory acknowledge signal 1MACK. The read enable signal, ORE, becomes disabled at time 1398 as the address memory signal goes false. If the memory write signal, 2MWRT, were previously in the true condition to indicate a write operation, the bus signal is terminated approximately concurrently with the memory cycle signal and the synchronized memory write signal, 2MWRT, returns to logic 0 at the next clock pulse.

The bus data controller 1360 also responds to the bus interrupt signal, 1INTR, which is generated during execution of the first instruction of an interrupt subroutine. When a KMUX 22 interrupt is enabled, NAND gate 1376 generates an enable interrupt signal, 3EIN, to activate OR gate 1378 and drive the D input to flip-flop 1380 as the interrupt signal is generated, for example at time 1399. At the next clock pulse flip-flop BDCA 1380 becomes set and flip-flops BDCB 1381 and BDCC 1382 become set at ¼ microsecond intervals in succession. As flip-flop BDCB 1381 becomes set the data enabled signal, ODES, goes true causing the KMUX 22 interrpt vector, $0120_{16}$ to be generated on the data lines of the system data bus 12. The interrupt signal causes the processing system 10 to interpret this information on the bus data line as being an address so that the address of the subroutine for processing a KMUX interrupt can be read from memory 14. The absence of memory line and memory cycle signals disables the read enable signal, ORE, during an interrupt control sequence and the absence of a memory write signal, 2MWRT, disables the data strobe signal during an interrupt sequence. However, as flip-flop BDCC 1382 becomes set at time 1400, the memory acknowledge signal becomes active. After a sufficient period of time to permit the CPU 16 to sample the data lines, the interrupt signal is then terminated, for example at time 1402. Starting with the next clock pulse the bus data control flip-flops BDCA 1380-BDCC 1382 reset in sequence at ¼ microsecond intervals. As flip-flop BDCA resets, the memory acknowledge signal MACK is terminated and the data enabled signal, ODES, is also terminated. The bus data control 1360 thus provides control over the reading out of and writing into KMUX 22 registers at 9 normal operations as well as the reading of the KMUX interrupt vector during a KMUX interrupt.

A bus data output multiplexer 1410, which is shown in FIG. 26, forms the remaining portion of bus interface logic 126. Bus data output multiplexer 1410 includes first and second 8 bit multiplexers 1412, 1414 whose outputs respectively provide the most significant and least significant bytes of the data line outputs from the multiplexer. The complementing enable input to multiplexer 1414 is driven by the output of a NAND gate 1416 which receives signals ORE and 2A13. Since the ORE signal includes signal 2A14, multiplexer 1414 is enabled by address locations FF46$_{16}$ and FF47$_{16}$. The select B input to multiplexer 1414 is driven by address line 2A15. The 8 outputs from multiplexer 1414 provide signal 0D00-0D07. The A1 input to multiplexer 1414 receives the busy signal, OBUSY. The A2 input receives the A interrupt signal, 0INTA and the A3 input receives the B interrupt signal 0INTB. Inputs A4 and A5 are grounded to provide logic 0 and input A6 receives the end time out enabled signal, 0ET0E. The parity error signals for bytes 1 and 2, 0PE1 and 0PE2, are input to A7 and A8 respectively. These 8 A inputs to multiplexer 1414 represents the multiplexer status register inputs having preassigned a system address FF46$_{16}$. An 8 bit shift register 1418 forms the least significant portion of the status data register having system address FF47$_{16}$. Register 1418 stores the status byte of the status data register and its parallel outputs Q1-Q8 are connected to inputs B1-B8 of multiplexer 1414. The complementing clear input to shift register 1418 is connected to the system initialize or reset signal, 3I0RS, and the shifting data input is connected to receive the data enabled signal, 4DAEN. The clock input is connected to receive the byte 1 shift register clock signal, 1SRC1, which becomes active as the first or status byte of a key station response is received over a coaxial cable. The 8 outputs of 8 bit multiplexer 1412 drive data outputs 0D08-0D15. The complementing enable input to multiplexer 1412 is driven by a NAND gate 1413 in response to the ORE signal and the 2A15 signal. Multiplexer 1412 is thus enabled in response to address FF43$_{16}$ and FF47$_{16}$. The select B input to multiplexer 1412 is driven by address line 2A13 which causes the A inputs to be active unless address FF47$_{16}$ is provided on the address lines of the system data bus 12. The first two A inputs are maintained at logic 1 by connection to a positive 5 volt source. Inputs A3-A8 are connected to receive the outputs 2PC02-2PC07 respectively of polling counter 116. Thus when address location FF43$_{16}$ is read by the CPU 16, the present count of the poll counter 116 appears on data lines D10-D15 with logic 1 appearing on data lines D8 and D09. Reading address location FF47$_{16}$ causes the D inputs to drive data lines D08-D15. These B inputs are connected to the 8 Q outputs of an 8 bit shift register 1422. Shift register 1422 stores the most significant or data byte of the status data register having address location FF47$_{16}$. As with register 1418, the clear input to register 1422 is connected to the system initialized or reset signal, 3I0RS, and the shifting data input is connected to the data enabled signal, 4DAEN. However, the clock input is connected to the byte 2 shift register clock signal, 1SRC2 to clock register 1422 as the second or most significant byte of a key station response is received over the coaxial cables.

An OR gate 1424 receives the 08 output of multiplexer 1414 as one input and the enable interrupt signal, 3EIN, as the other input. The output drives data signal 3EIN. similarly, an OR gate 1426 receives the 03 output of multiplexer 1412 as one input and the enabled interrupt signal 3EIN as the other input. The output of OR gate 1426 drives data signal 0D10. These OR gates 1424 and 1426 implement the interrupt vector address and cause address location 0120$_{16}$ to appear on the data lines as the data bus interrupt signal 1INTR indicates that the first instruction of an interrupt routine is being executed.

V. CRT KEY STATION

Figure 27B:
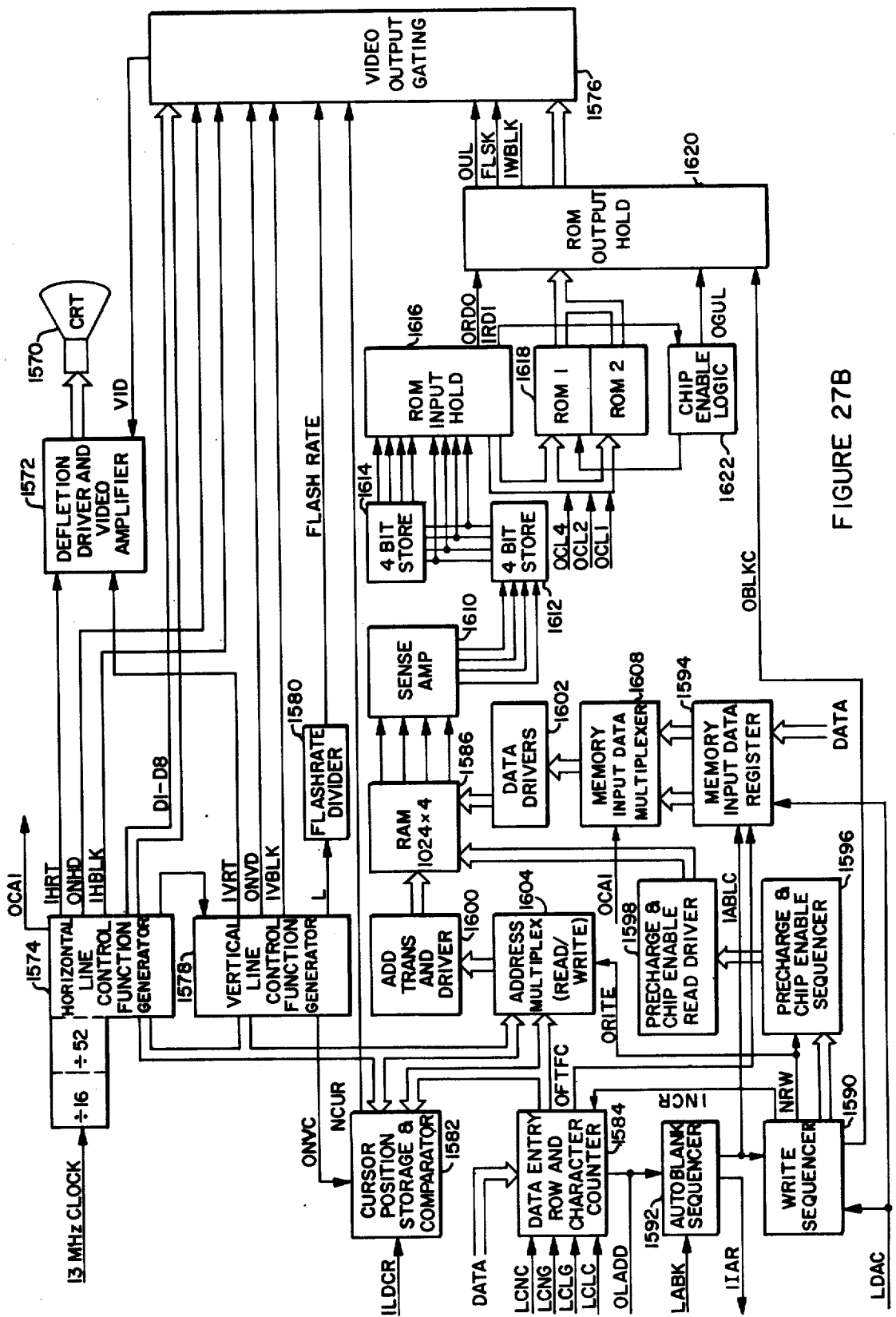

As shown in FIG. 27A and 27B, each CRT key station 1500 is connected through a disconnect relay 1502 to one of four available coaxial cables for communication therealong with the key station multiplexer 22. A 13 MHz crystal oscillator 1504 generates the basic system clock signal, 1CLK, which provides synchronization throughout the CRT key station 1500. A line receiver 1506, which includes hysteresis circuitry for removing noise from signals appearing on the coax line, is connected to receive and shape coax signals and generates a buffered input data signal, 0IDAT, which represents the signal status of the coax cable. An input data synchronizer and input data register 1508 receives the signal, 0IDAT, checks for parity, and provides the necessary synchronization to store each 11 bit character in a shift register having parallel data outputs 2DTAA, 2DTAB, 2DTA0-2DTA7, and parity.

An end of memory and separation and gating circuit 1510 responds to the parallel data to generate various control signals. A separator or end of message signal, $$1SEOM = [DTAO\cdot\overline{DTA1}\cdot DTA2\cdot DTA3\cdot DTA4\cdot D\text{-}\\TA5\cdot DTA6\cdot DTA7]',$$

indicates that either a separator character which separates one portion of CRT update message from another portion, or an end of message character is stored in the input data register. An end of message signal, $1EOM = [DTAB\cdot SEOM]'$, indicates that an end of message character is in the register while a separator signal, $1SEP = [\overline{DTAB}\cdot SEOM]'$, indicates that the register stores a separator character. A command signal, $1COMD = 2DTAB$, responds to the second or control bit position of the character to indicate the presence of a control bit. The control bit is TRUE only during the first (address) character and last (end of message) character of each message transmitted over the coaxial cable by the key station multiplexer 22.

An address decoder 1512 compares address information contained in signals 2DTA2-2DTA7 stored by the address register within input data synchronization and input data register 1508 with predetermined address signals 1KSAD2-1KSAD7 provided by an address selection package 1514 containing a hex inverter with selectively clipped input leads and unclipped leads grounded. A key station address match signal, OADMKS=(2DTA2⊕1KSAD2)·(2DTA3⊕1-
   KSAD3)·(2DTA4⊕1KSAD4)·(2DTA5⊕1-
   KSAD5)·(2DTA6⊕1KSAD6)·(2DTA7⊕1-
   KSAD7)

indicates a match between the data content of the input data register 1706 and the preselected key station address. An address match enable signal, OADME = OBSCN·2DTAB·2DTAO·$\overline{PEKS}$, enables the signal OADMKS. Begin sequence control enable signal, OBSCN has a duration of 4/13 μsec immediately after the parity bit of a coax character is clocked into the input data register 1706 and prohibits a response to the data content until the character is fully loaded. Data signals 2DTAB and 2DTAO identify the character as an address character and key station parity error signal 1PEKS inhibits the key station response if a parity error occurred during transmission of the character or the address decoder 1512 responds to these signals to generate an address signal 1ADDR = [DTA1·ADME·ADMKS·$\overline{IAR}$]', indicating that the key station has been addressed for a selection message, and a signal OPOAD = $\overline{DTA1·ADME·ADMKS·IAR}$, indicating that the key station 1500 has been addressed for polling. The inhibit address response signal, $\overline{IAR}$, prevents a response to a selection or polling message while an erase command is being executed.

The address signal, 1ADDR, thus indicates that the key station has received a character over the coaxial cable which contains control information indicating that the character is the first character of a selection message and address information matching the preassigned address of the key station. The polling address signal, POAD, similarly indicates that the key station has received a polling character matching the key station address over the coaxial cable without parity error.

A data input control and sequencer 1516 for selection messages responds to the incoming data character control signals SEOM, EOM, SEP, COMD, and ADDRKS. The data input control and sequencer 1516 performs error checks for parity and insures that selection message characters are received in the proper sequence of (1) an address character followed by (2) a key station control character, (3) an update line number character, (4) an update character number character, and (5) a data character or a separator character. Each selection message must also terminate with an end of message character. The data input control and sequencer 1516 also generates sequential control signals for the CRT key station 1500. A load character line number gate signal, LCLG, is generated from the time processing of the control character is terminated until processing of the update character line number character is terminated. A load character line number clock signal, LCLC, is generated at the termination of processing of the update character line number coax character. Similarly, load character number gate signal, LCNG, is generated from the termination of processing of the update line number coax character to the termination of processing of the update character number coax character, and a load character number clock signal, LCNC, is generated at the termination of processing of the update character number coax character. A load data clock signal, LDAC, is generated at the termination of processing of each data character. The data input control and sequencer 1516 also generates an end of message sent signal, EOMS, at the termination of input processing of an end of message character without an error in the preceding selection message.

The output data timing and control circuit 1518 responds to the key station polling address signal, POADKS, and the end of message sent signal, EOMS, to control and command the output of polling response and selection response messages.

A keyboard control register 1520 stores the control character provided as the second character of a selection message. The information is clocked into the keyboard control register 1520 from the input data register of the input data synchronizer and input data register circuit 1508 under control of the load keyboard control register signal, LKBC = OSSA·1SSB·OCKCD. In order to prevent interference with the generation of an audible tone the control register is clocked by a gated keyboard control register signal, GKBC = LKBC·$\overline{TPA}$·$\overline{TPB}$, where TPA and TPB are the tone pulse A and tone pulse B outputs of stages CR4 and CR5 respectively.

The first stage, CR0, of keyboard control register 1520 stores the key stroke simulator bit, causing a simulated response to a release of the reset key. Flip-flop CR0 has the D input thereof connected to signal 2DTAO, the clock input thereof connected to signal 2GKBC and the complementing clear input thereof connected to receive [RST+K62]'. Signal K62 is a key stroke signal indicating the release of the reset key, thus, after a key stroke simulate signal, 1KSIM, taken from the Q output of flip-flop CR0 causes the stimulation of a reset key release, flip-flop CR0 is reset. A flip-flop CR1 stores the reverse display control bit and has the D input thereof connected to receive 2DTA1, the clock input connected to receive signal 2GKBC, and the complementing preset input connected to the key station reset signal 7RST. An invert display signal 1INVT is generated by complementing the Q output of flip-flop CR1. Bit positions two and three of the control word are always logic zero for the 40×12 display and have no counterpart in the control register 1520. Time pulse A flip-flop CR4 has the D input connected to signal 2DTA4, the clock input connected to signal 2GKBC and the complementing clear input connected to a tone reset signal 1TR which is generated 647 msec after either flip-flop CR4 or CR5 becomes set. Similarly, the tone pulse B flip-flop CR5 has the D input thereof connected to signal 2DTA5, the clock input connected to signal 2GKBC and the complementing clear input connected to tone reset signal, 1TR. Tone pulse generation is controlled by a signal 1TONE = [TPA·S488+TPB·S332]', where S488 is a 488Hz continuous clock signal and S332 is a 332Hz continuous clock signal. A key click enable flip-flop CR6 has the D input thereof connected to signal 2DTA6, the clock input connected to signal 2GKBC and the complementing preset input connected to key station reset signal 7RST. A key click enable signal OKCE is taken from the Q output of flip-flop CR6. The automatic repeat bit is not latched. A NAND gate generates an automatic repeat signal 1RPT = [2DTA7·2GKBC]'.

A key repeat generating circuit 1522 receives an automatic repeat enable signal, RPT, from the keyboard control register 1520, a buffer empty signal, OBEMP, from a key stroke buffer memory 1524, and a 1 key down signal, KD1, from a level translation and 1 key down detector circuit 1526. Signal KD1 indicates that exactly one key is being actuated on a keyboard 1528. If the buffer memory is empty and the KD1 signal has been continuously active when the RPT signal is received, the key repeat generator 1522 enables a single automatic repeat. However, timing circuitry internal to the key repeat generator 1522 permits a first automatic repeat only after the lapse of 400 milliseconds from activation of the KD1 signal and subsequent repeats only at 200 millisecond intervals. To prevent the erroneous generation of a key activation signal when a keyboard key is released after enabling of automatic repeating but prior to the actual time delayed automatic repeat, a clear memory signal, CLRM, is generated by the key repeat generator 1522 to clear the key stroke buffer memory 1524 if the KD1 signal does not remain active for at least an instant after generation of the automatic repeat pulse signal, ARPTP, which is communicated to a key bounce eliminator 1530 to simulate the activation of a continuously activated key.

Under normal circumstances, the automatic repeating function works as follows. When a key is activated a binary code indicative of that key is stored in the key stroke memory 1524. The next time the key station is polled this character is transmitted over the coaxial cable and through the KMUX 22 to the CPU 16. The CPU 16 responds with a selection message which adds the latest character to the CRT display and enables the automatic repeat function. If there is a key release and reactivation during this time a new character will be stored in the key stroke memory 1524 and the buffer empty signal will be at logic "0". The key repeat generator 1522 will not be enabled when the automatic repeat pulse, RPT, appears and an automatic repeat will not be initiated. However, if the KD1 signal has been continuously active and the buffer empty signal, BEMP, is still active when the automatic repeat pulse, RPT, occurs, this means that the KD1 signal has been continuously active and an automatic repeat is initiated. After 400 milliseconds a timer, which begins running with each appearance of the KD1 signal, enables the generation of the ARPT pulse and also enables the generation of subsequent pulses at 200 millisecond intervals. The ARPTP signal causes a character to again appear in the key stroke buffer memory 1524 which is transmitted to the CPU 16 the next time the key station 1500 is polled. Again the CPU 16 responds by updating the CRT and including an automatic repeat enable signal as part of the control character of the selection message. Again, if the buffer empty signal, BEMP, and one key down signal, KD1, are active at the time an automatic repeat pulse, RPT, is received at the conclusion of processing of the keyboard control character, another automatic repeat sequence is initiated. This process continues until either the KD1 signal becomes inactive to cause a new 400 millisecond delay period or the BEMP signal is not active at the time the automatic repeat pulse, RPT, is received. The requirement that the buffer be empty at the time automatic repeating is initiated prevents the occurrence of an error caused by rapid keying or a polling delay such that by the time the key station 1500 is polled and automatic repeating is enabled, one or more key strokes have been executed and the key which is active at the time the automatic repeat signal, RPT, is generated is not the same key for which the CPU 16 enabled automatic repeating.

A tone timer generator 1534 generates a tone signal A and a tone signal B in response to command information within the key station control character. First and second frequency divider circuits within tone timer and generator 1534 continuously generate 488Hz and signals S488, S332 and a third frequency divider circuit is connected to provide a tone reset signal OTR at one of its outputs after it has been activated for 400 milliseconds. The reset input to the third divider circuit is connected to the logical or of the Q outputs of tone flip-flops CR4 and CR5. When one of the flip-flops CR4 or CR5 becomes set, the third frequency divider begins counting from zero and after 400 msec output signal OTR goes true. Signal OTR is connected to clear flip-flops CR4 and CR5 when true. Tone timer and generator 1534 also generates a 7820Hz clock signal S7820 which drives a key click generator 1538. The tone pulse signals are combined to command a speaker driver 1539 with a signal, 1TONE=[TPA·S488+TPB·S332]'.

A key click generating circuit 1538 responds to a OKCE output signal from the keyboard control register flip-flop CR6 and a key click gated clock signal 2KCG, which is generated by key bounce eliminator 1530 as data is being loaded into the key stroke buffer memory 1524. The key click generator 1538, which provides a key click pulse, 1CLICK, having a duration of 128 μsec following each occurrence of the gated keyboard clock signal, KC6, only when keyboard control flip-flop CR6 is set, may be implemented with three type D flip-flops KCA, KCB, KCC having corresponding Q and $\overline{Q}$ outputs. Flip-flop KCA has its D input connected to logic "1", its clock input connected to receive signal 2KCG, and its complementing clear input driven by signal $\overline{OQKCC}$. Flip-flop KCB has its D input driven by a signal (KCE·QKCA), its clock input driven by signal S7820 and its complementing clear input driven by reset signal 7RST. Flip-flop KCC has its D input driven by signal QKCB, its clock input driven by signal S7820 and its complementing clear input driven by reset signal 7RST. A tone signal 1CL1K=[QKCB·$\overline{QKCC}$]' drives the speaker driver 1539 which is also driven by tone signal 1TONE. As a character enters the buffer memory flip-flop KCA becomes set by signal 2KCK. Then if the key station is in a programming mode permitting key clicks the CPU 16 normally causes flip-flop CR6 to be continuously set and signal OKCE to be continuously generated at the Q output therefrom. The D input to flip-flop KCB is thus immediately enabled and at the next transition of signal S7820 flip-flop KCB becomes set to enable signal 1CC1K 128 μsec later. The next transition of signal S7820 sets flip-flop KCC to disable signal 1CC1K and clear flip-flop KCA. Flip-flops KCB and KCC then return to their initial reset conditions at successive transitions of signal S7820.

The keyboard 1528 contains up to 48 data and control keys electrically connected in a matrix having 8 columns, column 0-column 7 and 6 rows, row 0 - row 5. The activation of a key within the matrix causes the activation of a unique combination of one row and one column line. Irrespective of the character designation which is assigned to a given key, the same row and column lines are activated upon activation of the key. In addition to the matrix of 48 keys, the keyboard 1528 includes several keys having individual output signals. While not actually part of the matrix, the individual output signals of several of these keys are treated as if they are part of a seventh row, row 6. For instance, the output of a key which is normally assigned a display control function is designated 1K60 and is treated as though it represented row 6 column 0 of the matrix. The individual output of another key which is normally designated a reset key, but may be designated otherwise when a signal OJ1 is set to logic 1 by clipping leads on an integrated circuit inverter package, is assigned the designation 1K61 for row 6 column 1. The individual output of a numeric shift key is designated NN and the individual output of an alpha shift key is designated AA. The individual output of another key is designated RR and represents a reset key for Japanese keyboards having a katakana shift and is otherwise not normally implemented. A double zero key is assigned code 1K63. This 1K63 signal is connected to a level translator and one key down detector 1526 which causes the signal 1K63 to activate signals row 5 and row 7, which normally indicate the zero key, and is also connected to key bounce eliminator 1530 which responds by generating two load data pulses, OLDTA, for each activation of signal 1K63. Thus, with the key at row 5 column 7 assigned a normal designation of 0, one activation of the double zero key is treated by the key station logic as two activations of the zero key. Another key having an individual output designated KK is normally a lower case alpha key when implemented with non-Japanese keyboards but is assigned the Kana shift function when used in conjunction with a Japanese keyboard. Still another row and column signal, 1K62, is generated by the key bounce eliminator circuit 1530 in response to the deactivation of one of the shift signals, the alpha shift AA, the lower case alpha or Kana shift KK or the numeric shift NN. A 1K62 signal is also generated in response to both the activation and the deactivation of a reset signal whether the source is the Japanese reset signal RR, or a keyboard simulate signal, 1KSIM from the keyboard control register 1520. When enabled by signal OJ1, the Kana keyboard configuration reset signal RR is also processed with the other reset signals to cause the generation of a load data signal OLDTA at both the activation and deactivation thereof.

The level translator and one key down detector 1526 receives the row, column, and individual key switch signals from the keyboard 1528 and converts these signals to TTL compatible voltage levels. This circuit 1526 also includes a one key down detector which responds to the row and column signals to generate a one key down signal, OKD1, when exactly one row and exactly one column is simultaneously active. The individually generated row 6 key output signals 1K60, 1K61, and 1K63 are included in the detector circuit as row 6 and the respective column.

The shift encoder 1540 includes three type D shift latch flip-flops, each of which is connected to be preset by a different individual shift key signal, 1AA, 1KK or 1NN. In addition, the three shift key signals are ORed to generate a signal OS3=AA+KK+NN which drives a first D input to a first parallel register of key bounce eliminator 1530. The three flip-flops have their D inputs connected to ground and their clock inputs connected to receive a signal 1RSD which is generated by the output of a NAND gate within key bounce eliminator 1530 which has one input connected to the $\overline{Q}$ output of a first register corresponding to the OS3 input signal and a second input connected to the Q output of a corresponding bit position of a second parallel register which has its corresponding D input connected to the Q output of the first parallel register corresponding to signal OS3. Clock signal 1RSD goes active upon the release of a shift key, causing a load data command OLDTA to be generated and a shift release or reset signal 1K62 to be generated. The three shift latch flip-flops are reset when clocked by signal 1RSD unless constrained to remain set by the continued activation of a shift key. An encoder within shift encoder 1540 responds to the states of the three flip-flops to generate a first shift signal OS1=NN+KK and a second shift signal, OS2=AA+KK. In combination, these signals thus define a single shift key activation.

A key bounce eliminator 1530 receives the KD1 signal, the OS3 signal and other signals to generate a single load data signal, OLDTA, to represent each activation of a key.

A row and column encoder 1550 receives the row and column signals from level translation and one key down detector 1526 and the 1K62 signal from key bounce eliminator 1530 to generate binary coded row and column signals indicative of the row and column keyboard position of activated keys. Row signals OR1, OR2 and OR4 are binary coded signals which are weighted in accordance with the last numeral of their designation. Thus, OR4, OR2, OR1 equal 0, 0, 0 means that a row 0 key has been activated while signal 1, 1, 0 indicates that a row 6 key has been activated. Similarly, binary coded column signals OC1, OC2, and OC4 are weighted in accordance with the last numeral of their designation and indicate the column in which an activated key is electrically connected. Thus, the condition OC4, OC2, OC1 equal 000 indicates the activation of a column 0 key while conditions 111 respectively indicates the activation of a column 7 key.

A key stroke load generator 1552 receives the load data command, LDTA, from the key bounce eliminator 1530 as well as the transmit signal, OXMIT, from output data timing and control circuit 1518 and provides a load signal, LOAD, to key stroke memory 1524. Signal LOAD actually clocks keyed data into the key stroke memory 1524 and has a duration of one period of 1MHz clock pulse 1CLK in response to the occurrence of signal LDTA when signal OXMIT is false. The key stroke memory load generator 1552 may be implemented with first and second type D flip-flops having their preset inputs disabled by connection to a +5 volt source. The D input of the first flip-flop is connected to +5 volts and the clock input is connected to receive the load data signal, OLDTA. This first flip-flop serves as a memory flip-flop and is thus set by each activation of the load data signal OLDTA. An AND gate with complementing inputs receives the $\overline{Q}$ output of the first flip-flop at one complementing input and the transmit signal, OXMIT, at the other complementing input. The output of this AND gate drives the D input to the second flip-flop. The D input to the second flip-flop is thus activated whenever the first flip-flop is set and the key station is not transmitting information over the coaxial cable. The clock input to the second flip-flop is driven by a one megahertz clock signal, 1CLK1. The clear input of the first flip-flop is connected for activation by either the setting of the second flip-flop or activation of the key station reset signal, 5RST. The clear input to the second flip-flop is connected for activation by the key station reset signal 5RST. The load command, OLOAD, is taken from the Q output of the second flip-flop. As a keyboard key is activated, a load data command, OLDTA clocks the first flip-flop causing it to set. As soon as the key station is not transmitting, which may or may not be immediately, as indicated by the OXMIT signal, the D input to the second flip-flop is enabled and the second flip-flop is set to generate the load command at the next positive transition of the clock signal 1CLK1. The setting of the second flip-flop clears the first flip-flop to terminate the activation of the D input to the second flip-flop so that one microsecond later the second flip-flop is reset when clocked by signal 1CLK1 to terminate the load command. In this way the one microsecond load command pulse, OLOAD, is synchronized with the 1MHz clock signal 1CLK1 and is prevented from interfering with the operation of the key stroke memory 1524 as data is transmitted by the key station 1500.

The key stroke memory 1524 includes three sixteen bit buffer registers. Each register has parallel inputs and both serial and parallel outputs. The load command, OLOAD, causes the contents of the second register to be transferred to the third, the contents of the first to be transferred to the second, and newly keyed information to be transferred to the first. In this way the highest numbered buffer contains the oldest information and the contents thereof are transmitted first in response to a polling message. The bit position 14 input to the first register is connected to a +5 volt source so that the output Q14 from each register provides an indication of whether or not the register stores data.

A selection response register 1556 includes a 16 bit parallel in- serial out shift register which receives the selection response message in parallel and then shifts the message out serially as it is transmitted over the coaxial cable. The serial output is carried by an end of message data signal, 1EOMD, to a data combiner 1558. Signal 1EOMD is normally transmitted as all ones through hardware implementation with a few bits being selectively settable to zero as test signals.

The data combiner 1558 receives the three data signals from the three key stroke buffer registers and the serial data end of message signal from the selection response register 1556. Data combiner 1558 responds to control signals from an output data timing and control circuit 1582 to generate the correct character format and data information logic levels on output data signal, 00DAT, at sequential one microsecond intervals to form a coax transmission message. The coaxial cable is driven by a line driver 1560 in response to the output data signal 00DAT when enabled by the transmit signal 0XMIT.

The output data timing and control circuit 1518 controls the transmission of coax information via data combiner 1558. The output data timing and control circuit 1518 responds to a key station polling address signal, POADKS by commanding the transmission of the oldest information word stored in the key stroke buffer memory 1524 if any, and to an end of message sent signal, EOMS, by commanding the transmission of a selection response message if no parity or format errors occur during the transmission of a selection message.

The display portion of the key station 1500 functional block diagram is shown in FIG. 27B. A cathode ray tube 1570, which provides the actual display is driven by a deflection driver in video amplifier circuit 1572. The CRT is scanned horizontally from left to right and from top to bottom much as one would read a typed page.

The CRT displays up to 480 characters arranged as 12 rows with 40 characters per line. Each character position is divided into a dot matrix which is 8 dots wide and 13 dots high. An actual displayed character occupies dots 0–5 horizontally and 0–7 vertically with line 9 being used for underlining. The remaining portions of a character position are utilized to provide separation between characters.

A horizontal line control function generator 1574 receives the basic 13MHz system clock signal and generates the horizontal timing signals. The 13 MHz clock signal is first divided by 16 with a different dot signal being generated for each successive pair of clock cycles to provide eight sequential dot signals, one for each dot of a horizontal character position. A divide by 52 counter further divides a horizontal scan into 52 sets (0–51) of horizontal dots representing 52 character positions for each scan. However, only 40 character positions having horizontal address designations 0–39 are actually available for display.

As used herein, one of the 0–51 states of the divide by 52 counter is a horizontal count and the time during which a count exists is a count time. The actual horizontal display character positions are designated horizontal character addresses 0–39. The display of a character at a given horizontal address is commanded by the state of the divide by 52 counter. Thus, as the counter recycles to count zero, the display of a character at a horizontal address zero is commanded. However, two count times are required to determine the display character and convert the character to a dot pattern. Character positions having horizontal addresses 0–39 are thus displayed at horizontal count times 2–41. Because the delay is exactly two character times, the counted dot times correspond numerically with the scanning of display dot positions within a character position. A horizontal blanking signal HBLK causes video output gating circuitry 1576 to blank the display except from character time 1, dot time 1 to character time 42, dot time 6.

With the 13 MHz clock divided by 16 to provide the dot timing signals D1–D8 which are communicated to the video output gating circuitry 1576 and then further divided by 52 to provide the 52 character positions, it can be seen that the CRT is scanned horizontally at a rate of 15,625 lines per second. A horizontal control signal, HRT provides synchronization between the horizontal character counter circuitry 1574 and the horizontal portion of the deflection circuitry 1572. A latch within the horizontal line control function generator 1574 drives signal HRT to logic 0 during the seventh horizontal character time and drives HRT to logic 1 in response to a reset command or at the end of character time 40.

An enable horizontal display signal, NHD, enables video output gating circuitry 1576 to generate a video signal during horizontal count times 2 through 41 as horizontal character address positions 0–39 are scanned. Signal NHD is generated by a latch which is set at character count 2 and reset at the beginning of character count 42. At count time 48, a clock signal OCK48 is generated to increment a vertical line counter within vertical line counter and function generator 1578. In this way synchronization is maintained between the horizontal line control function generator 1574 and the vertical line control function generator 1578, both of which are synchronized with the 13MHz clock signal. The vertical line control and function generator 1578 includes a character line counter which counts from 1 to 13 to indicate the 13 lines of each row of display characters and a second display row counter which counts from 0 to 14 to divide the display into 15 rows of characters designated row 0 - row 14 with only rows 0–11 actually being illuminated. By dividing the 15,625 lines per second horizontal scan rate by 15 vertical row positions per frame and 13 lines per row position it can be seen that the CRT is completely updated at the rate of slightly greater than 80 updates per second. It thus takes approximately 12.5 milliseconds for each complete scan of the CRT.

The vertical line control function generator 1578 includes a vertical synchronization latch generating a vertical synchronization signal, VRT. The latch is reset by the system reset signal or during horizontal count time 12, during the scan time for line 2 of row 13, which is not illuminated. The signal VRT is driven to logic 1 at horizontal count 48 during the scan time for line 6 of row 13, which also is not scanned. An enable vertical display signal, NVD, enables or disables video output gating circuitry 1576 to prevent the generation of any display signal other than within selected character rows 0-11 of the CRT. The NVD signal is generated by a latch within vertical line control function generator 1578 which is set as the zero row of character positions is scanned and reset as the twelfth row of character positions is scanned to enable the display during the scan times for rows 0-11. A video blank signal, VBLK, is also generated by a latch within the vertical line control function generator 1578. Signal VBLK also enables the video output gating circuitry 1576 in synchronization with the vertical line control circuitry 1578. The latch which generates signal 1VBLK at the $\overline{Q}$ output is reset by the system reset signal RST or during the scan time for horizontal character of character line position 48, line 6, row 14. The latch which generates signal 1VBLK is set during the scanning of horizontal character position 48, line 3, row 12. This vertical blank signal, 1VBLK, thus blanks the display from character 48, line 3, row 12 through character 48, line 6, row 14. An enable vertical cursor signal, ONVC, enables the generation of a display cursor when character lines 13 and 1-8 of each row are being scanned. Since an actual character occupies character lines 1-7, the 7 × 9 cursor forms a rectangle exactly 2 dots and 2 lines larger than the displayed character with the displayed character centered in the rectangle. The row count is incremented on line count 10; causing a character row to occupy lines 11, 12, 13, 1, 2, 3, 4...10. The character is illuminated by lines 1-7 and the cursor is illuminated for lines 13, 1, 2...7, 8. A flip-flop within the vertical line control function generator 1578 is toggled by the most significant bit position signal OL8 of the character position line counter to generate a signal L having a frequency of one-half the CRT display update frequency or about 40Hz. This signal is further divided by a flash rate divider circuit 1580 to provide a flash rate signal at a frequency of 10Hz to gate video output gating circuitry 1576 to control the rate at which characters in character positions which have been selected for flashing are flashed.

A cursor position storage and comparator circuit 1582 controls the positioning of the display cursor. This symbol is displayed by reversing the display field at the character position at which the cursor is to be displayed. For instance, if bright characters are displayed on a dark background throughout the display, the cursor would display dark characters on a bright background. With no character at all being displayed at the cursor position, a bright rectangle would be displayed at the appropriate character position with no character symbol defined therein. The data input control and sequencer 1516 responds to the predetermined format of the selection message to control the loading of a display character position and line number into a cursor address register within cursor position storage and comparator 1582. A load cursor register signal, 1LDCR, is generated by data input control and sequencer 1516 to cause an address stored by a data entry row and character counter 1584 to be stored by the cursor register. The update line number character which is the second character of a selection message controls the positioning of the cursor. Bit position 1 (of bit positions 0-7) of the data word within the update line number character controls the cursor positioning. If this bit position contains logic 0 the cursor is not moved. However, if this position contains logic 1 the cursor is moved in one of two ways. If the selection message contains no data characters, i.e. it terminates after the update character number character, the update line number and update character number are first loaded into the data enter line and character counter 1584 and then this address is loaded into the cursor position register by the generation of load character register signal, LDCR. On the other hand, if at least one data character does appear between the update character number character and the separator or end of message character, all of the data characters are loaded into a random access character memory 1584 as the data enter line and character counter 1584 is sequentially incremented and then the data enter line and character counter 1584 is incremented one more time before the load character register signal, LDCR is activated. The cursor is thus displayed at the next successive character position past the last update character of the selection message. Thus, in normal operation a keyboard operator activates a selected key, the fact of the activation is communicated to the data processor in response to a polling message, and the data processor responds by generating a selection message which causes the newly keyed character to be displayed and the cursor to be moved to the next successive character position beyond the newly displayed character. In this way the cursor will indicate the character position which corresponds to the next key activation. Since each move cursor command is obeyed, it will be apparent that in the event different update messages within a given selection message contain conflicting move cursor commands, the last move cursor command will determine the position of the cursor subsequent to the execution of the selection message. In addition to the cursor position address register, the cursor position storage and comparator 1582 includes comparator circuitry for comparing the cursor address with the address of the current display position as indicated by the horizontal character position counter within horizontal line control function generator 1574 and the vertical line counter within vertical line control function generator 1578. Because of the need for a small amount of time to read the character for the next character position from memory and determine the display pattern therefor, it is necessary that the character position counter lead the actual display on the CRT. The display counters of the horizontal and vertical line control function generators 1574, 1578 are incremented between dot times 6 and 7 of a given character position but two and one-fourth character position scans occur before the newly indicated character position is actually displayed. This allows one character position scan time for random access memory 1586 to be twice addressed to determine what character is to be displayed and one character position scan time for a ROM 1618 to convert the display character code to a dot pattern dependent upon the particular character and line of the character which is being displayed.

Figure 38:
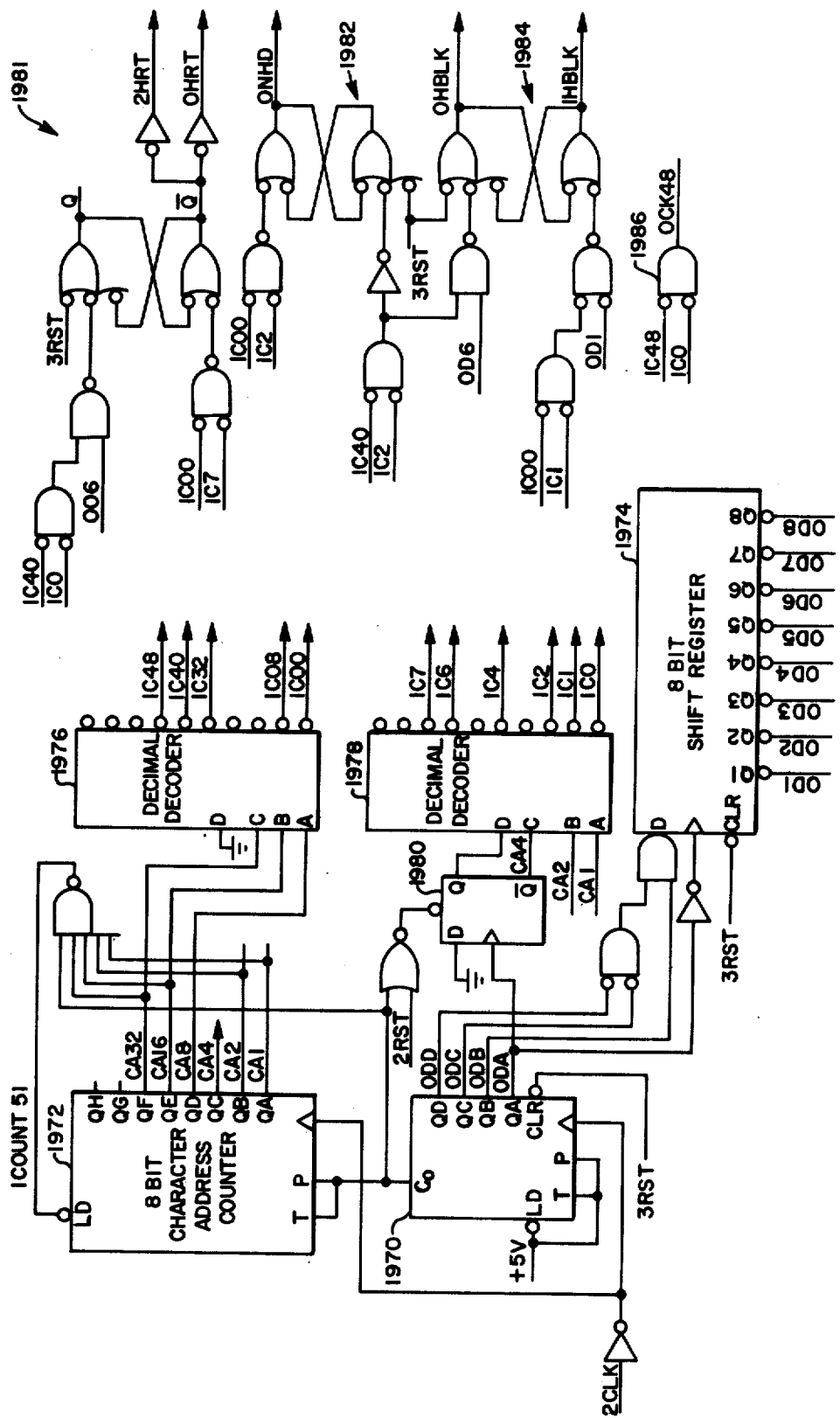
FIG. 38 is a functional block diagram and schematic representation of a horizontal line control function generator which forms a portion of the key station shown in FIG. 27.

To compensate for this delay the cursor position storage and comparator circuit 1582 includes a pair of type D delay flip-flops which are clocked by clock signal 1DD in synchronism with the incrementing of the character address counter 1972 (FIG. 38). When the incrementing of the character address counter 1972 between dot times 6 and 7 causes an identity between the character address counter 1972 and the cursor position register, a comparator which continuously makes a parallel bit by bit comparison of the character position counter and cursor location register generates an output signal 1CAC which goes from logic 1 to logic 0. Signal 1CAC drives the D input to the first flip-flop. Between dot times 6 and 7 of the next character position, simultaneously with the incrementing of the character position counter, the two flip-flops are clocked causing them to change from state 10 to 01 as the logic 0 input to the first flip-flop causes it to reset. As the character position counter is again incremented between dot times 6 and 7 of the next character position time the flip-flops are again clocked by signal 1DD. However, by this time the character position counter is no longer indicating the cursor position and signal, 1CAC, has returned to logic 1 causing the first flip-flop to be set and the second flip-flop, whose D input is driven by the Q output of the first flip-flop to be reset. As the second flip-flop is reset an enable cursor signal, ONCUR which is taken from the $\overline{Q}$ output of the second flip-flop, assumes the state logic 1 and is available two dot times later to enable the video display as the actual cursor position is scanned. Between dot times 6 and 7 of the actual scanning of the cursor position the cursor delay flip-flops are again clocked by signal 1DD causing them to assume state 11 and disable the enable cursor signal. The cursor is thus synchronized with the actual display of other types of characters.

A data entry row and character counter 1584 keeps track of sequential character address locations as a series of characters are written into the character memory in response to a selection message. Counter 1584 includes two presettable counters, one for counting character lines and the other for counting horizontal character address positions, a type D "flash" flip-flop, and a decoder responsive to the counter outputs which generates a legal address signal, OLADD=$(\overline{WL8}+\overline{WL4})\cdot(\overline{WC32}+\overline{WC8})\cdot(\overline{WC32}+\overline{WC16})$, where the WL and WC signals are the binary weighted line and column address count signals. Signal OLADD indicates when the character address position counter stores count 39 or less and the character row counter stores count 11 or less. Signal OLADD may be utilized to cause the display of a character having an improper address at a predetermined CRT location. The third character of a selection message and the first character after a separator character within a selection message is a character line number character. Bit positions 4, 5, 6 and 7 of the data portion of this character contain a line number and the most significant bit position, bit position 0 contains a flash indication. If bit position 0 is at logic 1 all characters in that portion of the selection message are to flash and if bit position 0 is at logic 0 these characters are not to flash. As the line number character is loaded into input data register 1508, a load character line number gate signal, LCLG is generated to activate the load enable input of the character line counter. At the completion of input processing of the character line coax character, a load character line clock signal, LCLC, is generated which clocks the character line counter and flash flip-flop within data entry row and character counter 1584 to load the contents of bit 0 into the "flash" flip-flop and bits 4, 5, 6 and 7 into the character line counter. As the subsequent character position coax character is processed into the input data register 1508, a load character number gate signal, LCNG is generated by data input control and sequencer 1516 to enable the loading of the character address position counter within data entry row and character counter 1584. At the completion of processing of the character position coax character a load character number clock signal, LCNC is generated to clock data bits 2–7 into the character position counter. If the selection message contains data characters between the row number coax character and a subsequent separator or end of message coax character, the data characters are loaded into random access memory 1586 at the address location indicated by the character position and row number counters within data entry row and character counter 1584 and the counters are incremented by an increment character address register signal, 1INCR, which is generated by a write sequencer 1590 immediately after a data character is written into random access memory 1586. The Q output of the "flash" flip-flop generates a flash the following characters signal, FTFC, which remains unchanged as the character position and character line number counters are incremented. Signal OFTFC drives the most significant data character storage position of random access memory 1586. Thus, any character loaded into random access memory 1586 while the "flash" flip-flop is set contains a logic 1 at the most significant bit position, which is the flash bit position, and will be flashed as it is displayed on the CRT. This flash enable technique permits the data processor to set a single bit in the character row number word of a selection message to enable the flashing of all subsequent characters in that portion of the message. The display portion of the key station operates on this command signal as though the most significant bit of each separate data character had been set even though only a single bit was set by the data processor. This technique permits a substantial savings of data processor operating time.

Bit position 2 of the data word of the load character row number coax character is an erase enable bit. A logic 1 in this bit position commands an erasure or automatic blanking of portions of the CRT display. If any data characters immediately precede the end of message character of a selection message, erasure begins at the next character position after the character position of the last character of the selection message and continues through the last character position at character address position 39 line 12. If there are no data characters immediately preceding the end of message coax character, erasure begins at the character position indicated by the character position and line number which is received as part of the standard selection message format. Erasure begins only after the end of message character has been received and all characters of a selection message have been received without parity error. The erasure command of the last portion of a multi-portion selection message is thus the one which is obeyed. If the last portion of a selection message contains a logic 1 in the erasure bit, the data input control and sequencer 1516 generates a load automatic blanking sequencer command signal, LABK, upon receipt of the end of message coax character. The signal LABK is received by an automatic blanking sequencer 1592 which includes a blanking latch which is set either by the signal LABK or the key station reset signal, RST. The latch is reset by legal address signal, OLADD, being at logic 0. Once the blanking latch is set and automatic blanking begins normal operation of the CRT key station 1500 is disabled until blanking is completed. During blanking the row and character counters are sequentially incremented and the contents of RAM 1586 at addresses indicated thereby are blanked. The reset signal RST causes the row and character counters to be initially reset to row 0, character 0 so that all positions of a display are blanked. The LABK causes blanking to begin at a display position indicated by the contents of the row and character counters. As soon as the row and character counters are incremented beyond the normal display positions to row 12, column 0, legal address signal, OLADD, goes low to reset the blanking latch. This terminates the automatic blanking sequence and enables normal operation of the CRT key station 1500.

The writing of blanks into RAM 1586 is relatively time consuming and would interrupt nonblanked portions of the display if done continuously. The actual blanking of the contents of RAM 1586 is therefore carried out on an intermittent basis. The Q output of the blanking latch drives an inverter which generates an automatic erase in progress signal, 1IAR, which indicates the state of the latch. The blanking latch output also drives a reset input of a divide by 16 recycling binary counter in such a way that counting is enabled when the blanking latch is set and the counter is constrained to be reset when the latch is reset or in response to the key station reset signal RST. The complementing clock input to the counter is driven by clock signal ODD to increment the counter between dot times 6 and 7 for each character position scan when the counter is enabled and a logic circuit responsive to the counter output signals generates an automatic blanking clock signal, 1ABLC which becomes active each time the counter stores count 15. Signal 1ABLC thus becomes active during automatic blanking for the last character position scan time of each group of each 16 character position scan times. Signal 1ABLC clears a memory input data register 1594 for random access memory 1586 and commands the initiation of a write sequence by write sequencer 1590. In response, the write sequencer 1590 writes the contents of the memory input data register 1594, which has been cleared to 0, into the memory location specified by the data entry row and character counter 1584 and then increments the row and character counter 1584. This process continues until the legal address signal resets the blanking latch of the auto blank sequencer 1592 to terminate the process. The writing of a character into random access memory 1584 disrupts the normal CRT during the time that the write cycle takes place, but since only every 16th character display position is interrupted, the interruption is not discernible by an operator.

The write sequencer 1590 provides one sequence of write signals for writing a data character into random access memory 1586 in response to each automatic blanking clock signal 1ABLC from data entry row and character counter 1584 and each load data clock signal, 1LDAC, received from data input control and sequencer 1560. Sequencer 1590 responds to a column 48 signal, C48, to generate an enable reading and writing signal, NRW, except when the sequencer 1590 is active and the column position count is greater than 47. When a write sequencer is commanded, sequencer 1590 generates the NRW signal and a write command signal, RITE, for two character position scan times which are synchronized with dot 6 clock signal OD6. An increment signal, INCR, is generated during the second character position scan time to increment the data entry row and character counter 1584.

A precharge and chip enable sequencer 1590 provides signals for controlling the operation of MOS-RAM memory 1586. It provides write, OWRT, precharge, OPCE, and chip enable, 1CEN, signals for proper memory 1586 operation.

A precharge and chip enable read driver 1598 converts signals for chip enable, precharge and the three least significant address bits from $T^2L$ to MOS voltage levels. An address translator and driver circuit 1600 converts the remaining address signals from $T^2L$ to MOS compatible voltages. Similarly data driver circuits 1602 convert $T^2L$ data signals to MOS compatible voltages.

The memory input data register 1594 is an 8 bit parallel-in parallel-out register which is connected to be reset by either the key station reset signal, 7RST, or the automatic blanking clock signal, 1ABLC. The clock input of register 1594 is responsive to the load data clock signal, 1LDAC, or the automatic blanking clock signal 1ABLC. The flash the following characters signal, OFTFC, drives the first bit position input and the complement of the underline bit, 3DTA1, drives the second bit position input to register 1594. The third and fourth inputs are driven by data signals 4DTA2, and 4DTA3, respectively. The fifth bit position input is driven by a signal having the logical function OTRANS + 4DTA4. The sixth input bit position is driven by data signal 4DTA5. The seventh bit position input signal is driven by a signal having the logical function OTRANS + 4DTA6. The eighth bit position is driven by data signal 4DTA7. By translating bit positions 5 and 7 from zero's to one's, the translate signal causes the required conversion of the code XX100000 to the code XX101010. Except when the translate signal is true, the activation of the load data clock signal 1LDAC at the completion of processing of a display character received over the coaxial cable, causes the EBCDIC code for the display character to be loaded into the input data register 1594, except that the first bit position is taken from the flash the following characters signal OFTFC and the underline bit, which is the data 1 bit, is complemented at the second bit position input to register 1594.

A memory input data multiplexer 1608 is a quadruple 2 to 1 multiplexer having its four A inputs connected to the outputs of bit positions 1–4 of memory input data register 1594 and its four B inputs connected to the outputs for bit positions 5–8 of memory input data register 1594. The four outputs of multiplexer 1608 are connected to data drivers 1602 which convert data signals from $T^2L$ logic levels to MOS logic levels and in turn drive the four data inputs to random access memory 1586. The select B input to multiplexer 1618 is driven by character address signal OCA1 which is generated by the horizontal line control function generator 1574. Thus, during the scan control times for the even numbered character positions bit positions 1–4 of the memory input data register 1594 are written into RAM 1586 and during the scan control times for odd numbered character positions bit positions 5–8 of memory input data register 1594 are written into the odd memory locations of RAM memory 1586. The four bit RAM memory 1586 is thus able to store 8 bit words by storing the most significant half of a character word in the even numbered address locations and the least significant half of a character word in odd numbered memory address locations.

Address multiplexer 1604 is an 11 stage 2 to 1 multiplexer permitting memory 1586 to be addressed by the contents of data entry row and character counter 1584 as data is written into memory 1586 and to be addressed by the character address position and row number counters of horizontal line control function generator 1574 and vertical line control function generator 1578 as data is read from memory 1586 in preparation for the generation of a display pattern for a character position scan. For the purpose of conserving integrated circuit components, the three least significant bit positions of the 11 position address multiplexer 1604 are physically implemented as part of the precharge and chip enable sequencer 1596. Logically however, the address multiplexer 1604 is implemented as a single 11 bit position multiplexer. The output signals from the address multiplexer 1604 are designated OAQ1-OAQ11. The four most significant A inputs to multiplexer 1604 are driven by the display line number signals, OL8, OL4, OL2, OL1 from the vertical line control function generator 1578. These signals represent a binary count indicative of the display line which is being scanned. The A inputs to bit positions 5-10 of address multiplexer 1604 are driven by character address signals OCA32, OCA16, OCA8, OCA4, OCA2, and OCA1. These signals represent the state of the character position counter within horizontal line control function generator 1574 and indicate a binary count that is representative of the character position that is to be scanned. The A input to the eleventh bit position of multiplexer 1604 is driven by dot timing clock signal ODD. The B inputs of address multiplexer 1604 are connected to receive the word line and character position output signals from data entry row and character counter 1584. Bit positions 1B-4B receive signals OWL8, OWL4, OWL2, and OWL1 respectively. Similarly, inputs 5B-10B are driven by the character position address signals OWC32, OWC16, OWC8, OWC4, OWC2, and OWC1, respectively from data entry row and character counter 1584. Input 11B is driven by character address count signal OCA from the horizontal line control function generator 1574 to permit the most significant half of a character word to be stored in an even numbered address location as the scan control logic commands an even numbered character position and the least significant half of a character word to be stored in an odd numbered address location as the horizontal line control function generator 1574 commands an odd numbered character position.

An address translator and driver 1600 translates the eleven address signals, OAQ1-OAQ11, from address multiplexer 1604 to ten address signals, OMAT-9-OMAT0, and converts these ten T²L logic levels to MOS voltage levels to drive random access memory 1586. Because all of the possible states of the four display row address signals and six character position address signals are not used, these ten signals can be combined into nine binary address signals. This is accomplished by letting address signal OMAT9=OAQ1+OAQ5; OMAT8=OAQ2+OAQ5; OMAT7=OAQ3; OMAT6=OAQ4; OMAT5=OAQ5+OAQ6; OMAT4=OAQ2+OAQ5; OMAT3=OAQ8; OMAT2=OAQ9; OMAT1=OAQ10; and OMAT0=OAQ11.

A sense amplifier 1610 senses the four output signals from random access memory 1586 as the memory is read. Sense amplifier 1610 generates four data signals which drive four inputs to a first four bit memory output hold register 1612. The random access memory is actually read in two steps in order to obtain a full 8 bit data character which is stored in the memory as two four bit words. During a first reading step the most significant bit of a character word is read from an even numbered address and stored in memory output hold register 1612. During the next step the most significant half of the character word is transferred from first memory output hold register 1612 to a second memory output hold register 1614 and the least significant half of the character word is transferred to first memory output hold register 1612. Both memory output hold registers 1612, 1614 are type 74175 registers having their clock inputs connected to chip enable signal 1CEN and their complementing clear inputs connected to the key station reset signal 3RST.

An 8 bit ROM input hold register 1616 receives and latches the 8 bits of a character word read from random access memory 1586. The six least significant bits output from the ROM input hold register 1616, ORD2-ORD7 are combined with 3 character line signals OCL4, OCL2 and OCL1 indicating which line of a character is being scanned to create a 9 bit read only memory address signal uniquely defining one of seven possible scan lines for each of 64 possible characters. The most significant output signal from ROM input hold register 1616, ORDO, is the flash bit and is communicated directly to a ROM output hold register 1620 where it drives the seventh of eight inputs. The second most significant output of ROM input hold register 1616, the underlined signal, 1RD1, is inverted by chip enable logic 1622 and is output as a generate underline signal, OGUL which drives the sixth bit position of ROM output hold register 1620 which in turn generates an underline output signal, OUL. The six least significant outputs from ROM input hold register 1616 which are outputs ORD-2-ORD7 are communicated along with three additional character line counter bits OCL4, OCL2 and OCL1 to form 9 address bits for read only memory 1618. In response to these 9 bits address signals, read only memory 1618 generates a 5 bit output indicative of the actual bright and dark dot pattern for a specific line of a specific character as indicated by the nine bit address input. The five bit output of ROM 1618 is latched by bit positions 1-5 of a ROM output hold register 1620. A clock input for loading ROM output hold register 1620 is driven by dot timing clock signal 1DD which loads register 1620 at positive going transitions thereof. The 5 output signals from the first 5 bit positions of ROM output hold register 1620 are labeled OROD1-OROD5. The output from the sixth bit position is the underline signal which is labeled OUL the output from the seventh bit position is the flash signal which is labeled FLSH and the output from the eighth position drives the write blank signal, 1WBLK, in response to the blank signal, OBLKC from write sequencer 1590 which prevents incorrect information from being displayed during a memory write operation. The complementing clear inputs to ROM output hold register 1620 are driven by key station reset signal 3RST.

Video output gating circuitry 1576 contains sequential gating logic for the generation of a video signal, VID, which commands a bright spot on the CRT display. Signal VID is developed in accordance with the logical function:

OVID=$\overline{VLBK}\cdot\overline{HBLK}\cdot\overline{WBLK}\cdot(INVT\oplus SIGL)$ The vertical blanking signal, $\overline{VLBK}$, disables the illumination of the CRT display at the top and bottom edges while the horizontal blanking signal, $\overline{HBLK}$, disables the illumination of the CRT display at the lefthand and righthand edges. The write blank signal, $\overline{WBLK}$, is generated by write sequencer 1590 to prevent the display of incorrect information as display characters are written into random access memory 1586. The normal display information signal, SIGL, is EXCLUSIVE-ORed with the invert signal, INVT, to control the state of the video signal when enabled by signals $\overline{VLBK}$, $\overline{HBLK}$ and $\overline{WBLK}$. The EXCLUSIVE-OR operation causes the display signal to be output in its normal state when the invert signal is at logic zero but to be complemented when the invert signal is at logic one. The invert signal thus causes the entire active portion of the display to be inverted regardless of what it otherwise would have been.

The display signal SIGL has the logical function

SIGL=NVI·NHD·($\overline{FLSH}$+$\overline{FLASH\ RATE}$)
·[FULC+(FCEC$\oplus$FDEC)]

The enable vertical display signal NVD is true for display lines 0-11 of each character display row which are the 12 of 15 counted display lines for which a display is permitted. Similarly, the enable horizontal display signal NHD, is true for horizontal character positions 2-41, which are the 40 or 52 counted horizontal character positions for which a display is permitted. The flash signal $\overline{FLSH}$, continuously enables the display signal, SIGL, whenever a flash is not commanded, but permits the display signal to be enabled only in synchronism with the $\overline{FLASH\ RATE}$ signal when flashing is commanded.

The final underline command signal,

FULC=CL9·UL·$\overline{D6}$·$\overline{D7}$·$\overline{D8}$ commands the display of an underline as dot positions D1-D5 of display line 9 are scanned while the underline signal is true. Signal CL9 is the character line 9 signal which indicates that the ninth character line of a display row is being scanned. Signal UL is the underline signal which commands the underlining of a character, and signals $\overline{D6}$, $\overline{D7}$ and $\overline{D8}$ are dot timing signals which disable the extension of the underline into horizontal dot positions D6-D8 which are not occupied by a character.

The final cursor enable command signal has the logical function,

FCEC=NVC·$\overline{D7}$·NCUR

The enable verticel cursor signal, NVC, enables the final cursor enable command signal during the display of character lines 1-8 and 13 to extend the cursor one line above and one line below the normal character display area. Dot timing signal $\overline{D7}$ disables the display of the cursor at dot position 7. The enable cursor signal, NCUR, is the basic cursor command signal which indicates that a character position at which the cursor is to be displayed is being scanned. Signal NCUR disappears prior to dot time 8 so that the cursor is actually displayed only for dot times 1-6 and for character lines 13 and 1-8. The final cursor enable command is EXCLUSIVE-ORed to cause the final display enable command to be complemented when signal FCEC is true. The final display enable command represents the normal dot pattern that is displayed and has the logical representation, FDEC=$\overline{CL3}$·(DOT1·D1+DOT2·D2+DOT-3·D3+DOT4·D4+DOT5·D5)

Signal $\overline{CL3}$ disables the final display enable command during the scanning of character lines 8-13 and the five pairs of signals in parenthesis represent the coincidence of a dot pattern command signal, DOT, and a dot timing command signal, D, associated therewith. These signals thus cause the dot pattern for dot position 1 to be displayed at dot time one, the dot pattern for dot position 2 to be displayed at dot time two and so forth.

A. INPUT DATA SYNCHRONIZER AND REGISTER 1508

Figure 28:
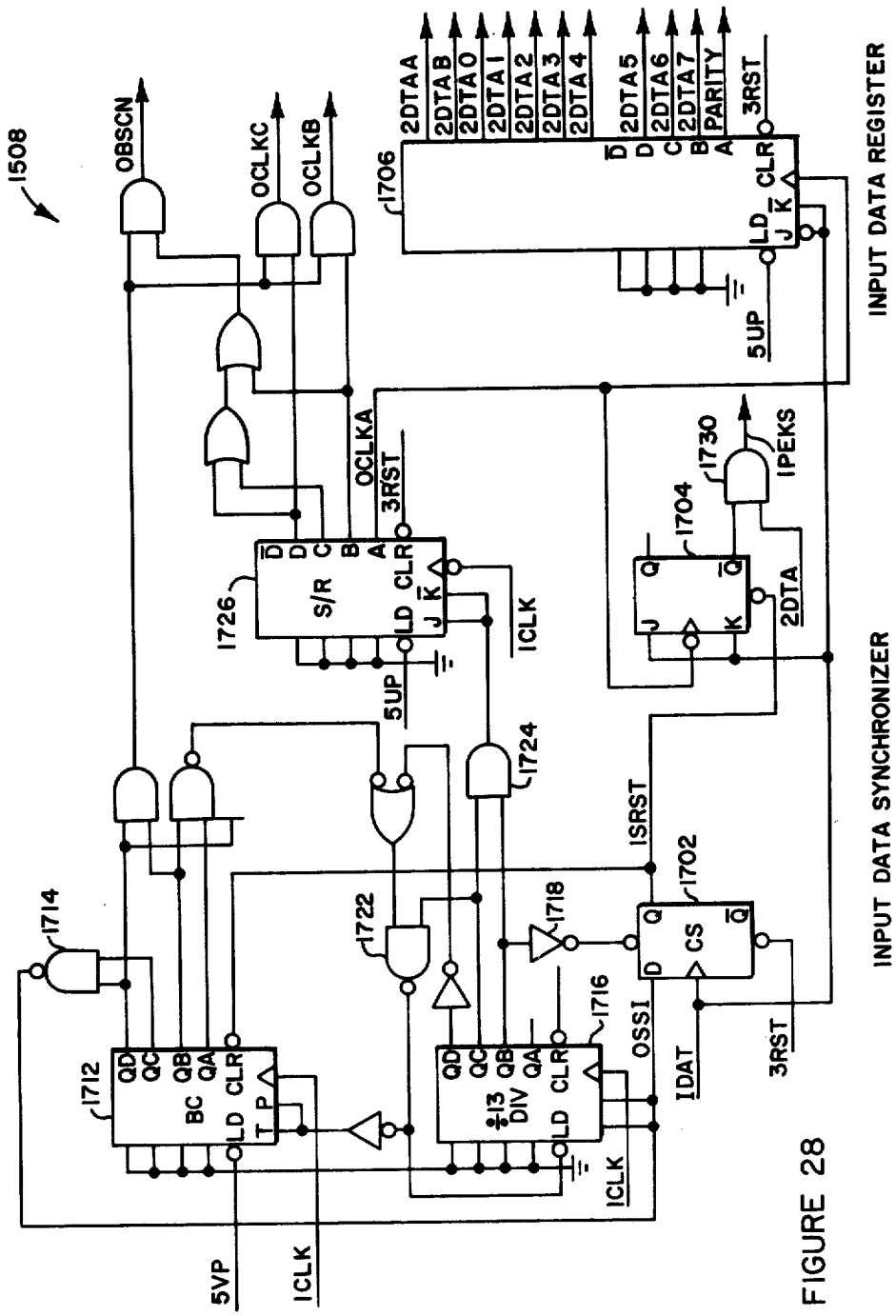
FIG. 28 is a functional block diagram and schematic representation of an input data synchronizer and an input data register which form a portion of the key station shown in FIG. 27.
Figure 29:
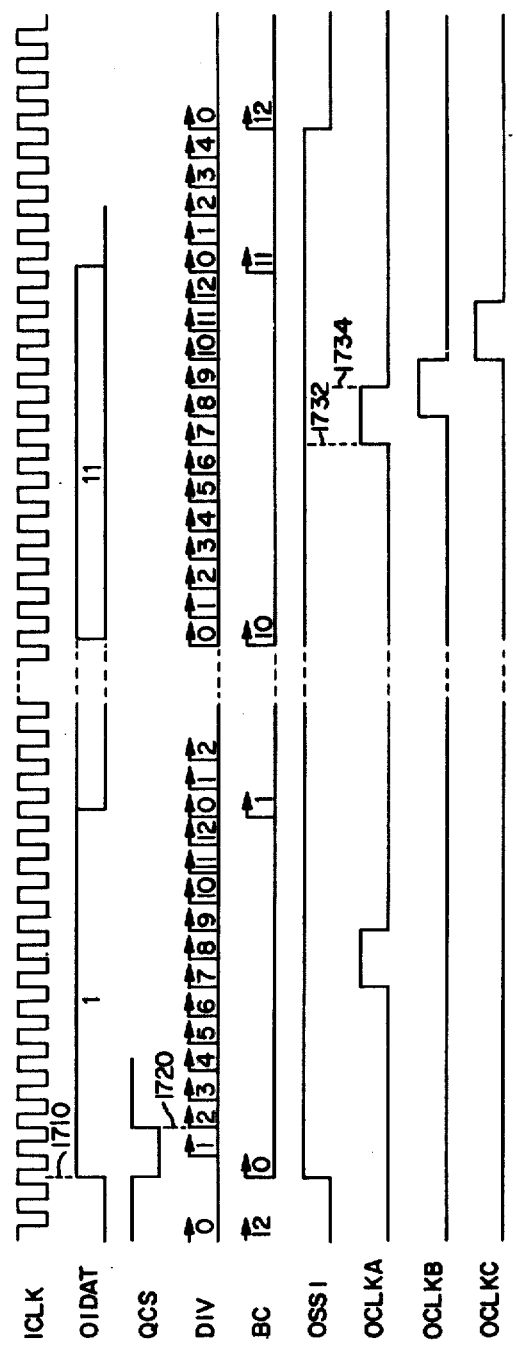
FIG. 29 is a timing diagram illustrating several signals which are pertinent to the operation of the input data synchronizer shown in FIG. 28.

The input data synchronizer and register 1408 which provides input timing, control and storage for data signals received by the key station over the coaxial cable is shown in FIG. 28 and a related timing diagram is shown in FIG. 29. The buffered input data signal, OIDAT drives the clock input to a character start flip-flop 1072, the JK toggling inputs of a parity flip-flop 1704, and the J$\overline{K}$ data inipiuts of an 11 bit shift register 1706. As illustrated in FIG. 29 character start flip-flop 1072 is normally preset but when the first bit of a coaxial character is received at time 1710, character start flip-flop 1702 is clocked while the D input thereto is at logic 0 and the QCS output thereof changes from logic 1 to logic 0. The output QCS is connected to clear the parity flip-flop 1704 and a bit counter 1708 as the signal goes low. Bit counter, BC, 1712 is a four bit binary counter having binary outputs A, B, C and D. A NAND gate 1714 has its two inputs connected to the C and D outputs of counter 1712 so that its output generates a start serial input signal, OSSI, which is at logic 0 when counter 1712 stores count 12 and at logic 1 otherwise. At time 1710 when the first bit of a coax character is received, binary counter is at state 12 causing character start flip-flop 1202 to become reset when clocked by thd first bit of the coax character. However, bit counter 1712 is immediately cleared by the resetting of character start flip-flop 1702 so that signal OSSI immediately goes to logic 1 to prevent a subsequent clocking of flip-flop 1702 by signal OIDAT as coax data is received from resetting flip-flop 1702. A four bit binary counter 1716 has its clock input connected to receive the 13 MHz, system clock signal 1CLK so that each one microsecond interval during which a bit of a coax character is received may be divided into 13 separate clock times as indicated by signal DIV in FIG. 29. The count enable inputs to counter 1716 are connected to receive signal OSSI so that counter 1716 begins counting from 0 as at the next positive transition of clock signal 1CLK after the bit counter 1712 is cleared by the receipt of the first bit of a coax character on input data signal, OIDAT. The $Q_B$ output of divider counter 1716 is coupled through an inverter 1718 to drive the complementing preset input of character start flip-flop 1702 to preset flip-flop 1702 as divider counter 1716 is incremented to count 2 at time 1720. A NAND gate 1722 has its output connected to the complementing load input to divider counter 1716 causing all zeroos to be loaded into counter 1716 when the counter 1716 reaches count 12 or when the divider counter 1716 reaches count 4 while bit counter 1712 is at count 11. The count enable inputs to bit counter 1712 are driven by the complement of the output of NAND gate 1722 causing bit counter 1712 to be incremented each time divider counter 1716 is preset to 0. The clock input to bit counter 1712 is driven by the 13 MHz system clock signal 1CLK. An AND gate 1724 is connected to generate a true output when divider counter 1716 is at count 6 or count 7. A four bit shift register 1726 has its clock input connected to the 13 MHz system clock signal 1CLK and its JK data inputs connected to the output of AND gate 1724. Thus, as divider counter 1716 reaches counts 7 and 8, a pair of sequential logic 1 signals begin shifting through shift register 1726. As illustrated in FIG. 29 three clock signals, OCLKA, OCLKB and OCLKC are derived from the outputs of shift register 1726. Clock signal OCLKA is taken directly from the A output of shift register 1726 and thus goes true for each clock time 7 and 8 of each bit time. Clock signal OCLKB is derived from the second or B output of shift register 1726 and goes true during clock times 8 and 9 but only when bit counter 1712 is at count 10 corresponding to the 1 microsecond time interval during which the 11th or parity bit of a coax character is received. Similarly, clock signal OCLKC is responsive to the D output of shift register 1726 and goes true during clock times 10 and 11 of bit time 11 when bit counter 1712 stores count 10. A begin sequence clock enable signal, OBSCN, is also generated during clock times 7, 8, 9 and 10 of bit time 11 in response to shift register 1726 and bit counter 1712.

At the beginning of clock time 7, approximately midway through the one microsecond time interval for the first bit of a coax message character, clock signal OCLKA goes true to drive the clock input of data input shift register 1706 and cause the first data bit to be loaded therein. At the end of clock time 8 signal OCLKA goes false to clock parity flip-flop 1704. Because the first bit of a coax message must always be a logic one the parity flip-flop 1704 is always toggled to the preset state 8 at the end of clock time 8 of bit time 1. Whether or not flip-flop 1704 is toggled during subsequent bit times depends upon the corresponding logic state of the input data signal OIDAT. The $\overline{Q}$ output from flip-flop 1704 thus indicates even parity over the bits of a coax message that has been clocked into shift register 1706.

Shift register 1706 provides outputs for each of the 11 bits of a coax character. Output 2DTAA represents the initial bit which is always logic 1 and output 2DTAB represents the second or control bit which is logic 1 only for polling characters beginning start selection message characters and end of selection message characters. The outputs 2DTA0-2DTA7 represents the data byte portion of the coax character which occupies character positions 3-10 of a coax character. The bit position closest to the data input to the shift register 1706 stores the parity bit at bit position 11 of a coax character after the coax character is completely loaded into shift register 1706.

The logic state for bits 2-11 of a coax character are clocked into shift register 1706 at approximately the center of each bit time interval in a manner similar to the loading of the initial bit into register 1706 as described above. An AND gate 1730 having one input connected to signal 2DTAA and the other input connected to the $\overline{Q}$ output of flip-flop 1704 is enabled as the initial bit is shifted into shift register position 2DTAA at time 1732. 2/13 of a microsecond later at time flip-flop 1704 is clocked, causing the $\overline{K}$ output therefrom to indicate even parity over all bits of the coax character as actually received by the key station. The output of AND gate 1730 thus represents the even parity condition or the complement of an error in even parity. This output from AND gate 1730 is thus designated a key station parity error signal, 1PEKS. At the conclusion of bit time 11 divider counter 1716 reaches count 12 and upon receipt of the next clock pulse signal 1CLK divider counter 1716 is preset to 0 and bit counter 1712 is incremented to count 11. With bit counter 1712 at count 11, as soon as divider counter 1716 reaches count 4, the next clock pulse causes the divider counter to be preset to 0 and bit counter 1712 to be incremented to count 12. Incrementing bit counter to count 12 causes start serial input signal OSSI to go to logic 0, thereby disabling divider counter 1716 from being incremented beyond 0 and driving the D input of character start flip-flop 1702 to logic 0 so that the character start flip-flop can be reset upon receipt of the first bit of the next coax message to initiate a new coax character input cycle. Clock signals OCLKB and OCLKC trail clock signal CLKA after the complete coax character has been clocked into shift register 1706 during bit time 11 (count 10) and are utilized by other portions of the key station logic to indicate that the input data register 1706 storees a complete coax data character.

B. DATA INPUT CONTROL AND SEQUENCER 1516

Figure 30:
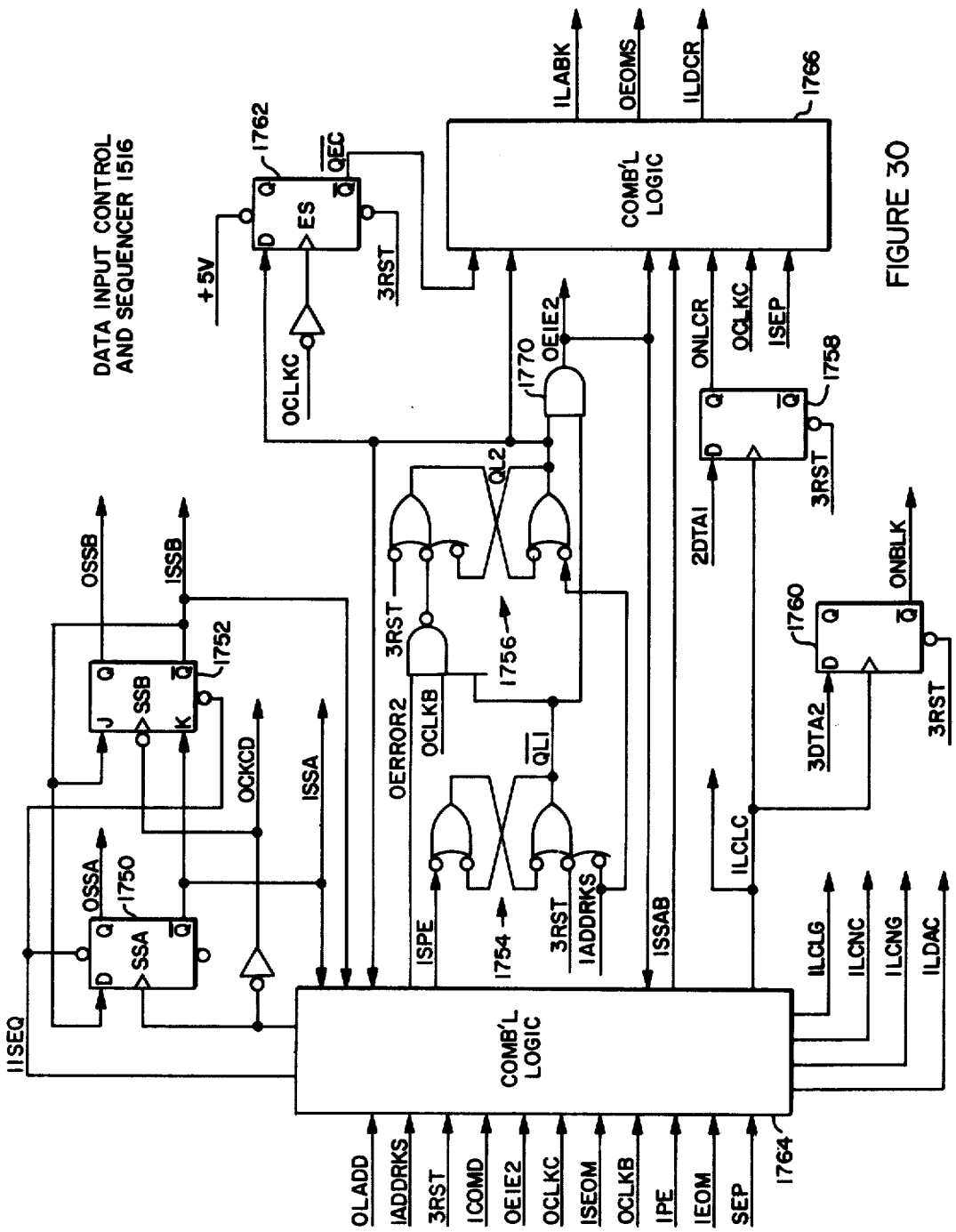
FIG. 30 is a functional block diagram and schematic representation of a data input control and sequencer which forms a portion of the key station shown in FIG. 27.

As shown in FIG. 30, the data input control and sequencer 1516 includes a pair of sequence control flip-flops SSA 1750 and SSB 1752, a first error latch QL1 1754, a second error latch QL2 1756, a curser control flip-flop 1758, an erase control flip-flop 1760, an error flip-flop, ES, 1762, combinational logic 1764 and combinational logic 1766. The input data control and sequence 1516 checks for parity errors, insures that a selection message is received in the prescribed format and responds to the occurrence of an error by prohibiting further response to a selection message and prohibiting generation of a response character. An initialize sequencer signal 1ISEQ=[ADDRKS+RST]' sets the sequence control flip-flops to their normal inactive state, SSA, SSB, equal 10. The clock inputs to flip-flops 1750 and 1752 are connected for triggering by the trailing edge of a clock signal OCKCD=$\overline{COM}$-$\overline{D}$-E1E2-CLKC-(SEOM⊕(SSA+SSB)). The D input to flip-flop 1750 is connected to the receiver signal 1SSB from the $\overline{Q}$ output of flip-flop 1752. The J input to flip-flop 1752 receives the same 1SSB signal. The K input to flip-flop 1752 is connected to the receive signal 1SSA from the $\overline{Q}$ output of flip-flop 1750. As thus arranged, the flip-flops 1750, 1752 are set to state 10 by the receipt of a matching address character or the reset signal. Upon receipt of the nect character of a selection message, which is the update row number character, the sequencing flip-flops are clocked to state 11 and the following update horizontal character address number character clocks the flip-flops to state 01. The next following data character causes the clocking of the flip-flops to state 00 where they remain until a separator or end of message character causes them to be clocked to state 11 which is the update line number state. State 00 permits the receipt of display characters.

The latches 1754 and 1756 having respective outputs QL1 and QL2 detect the occurrence of an error and drive an AND gate 1770 which generates an enabled 1 enabled 2 signals, $OE1E2 = \overline{QL1 \cdot QL2}$ which enables operation of the sequencer. The first latch is reset by either the system reset signal RST or the address key station signal 1ADDRKS which indicates the first character of a selection message for the key station. The second latch 1756 is set by the address key station signal and reset by the system reset signal. In the event of a sequence or parity error, latch 1754 is set by a sequence or parity error signal, $$1SPE = [QL2 \cdot OCLKB \cdot ((SSA + SSB) \cdot SEOM + \lambda PE + \overline{ADDRKS \cdot EOM \cdot COMD})]'$$

This signal indicates an error whenever a separator or end of message character is received while the sequence flip-flops are in other than a data state indicated by state 0, 0 or when a parity error occurs or when the command bit of a coax character is true for other than a key station address character or an end of message character. When enabled by latch 1 output $\overline{QL1}$ and clock signal OCLKB, the second latch 1756 is reset by a second error signal, $$QERROR2 = EOM \cdot \overline{SSA} \cdot \overline{SSB}.$$

This signal sets latch 1756 in response to the normal end of message signal to prevent further sequence operation until receipt of a new key station address character. The error control flip-flop 1762 has its D input connected to the QL2 output of latch 1756 and its clock input connected to the complement of the character clock signal OCLKC which occurs at the termination of input processing of each coax character. A signal $\overline{QEC}$ is generated by the $\overline{Q}$ output of flip-flop 1762.

The control flip-flops 1758 and 1760 have their clock inputs connected to the load character line number clock signal, 1LCLC, which occurs at the termination of input processing of the character line number coax character. This clock signal causes bit one, 2DTA1, and the complement of bit to, 3DTA2, of the character line number coax character to be clocked into flip-flops 1758, 1760 respectively. These are the move cursor and erase bits. Flip-flop 1758 thus latches the state of the move cursor command bit for each portion of a selection message and the Q output generates an enable cursor signal, ONLCR. Similarly, flip-flop 1760 latches the complement of the erase bit for each separate portion of a selection message and the $\overline{Q}$ output therefrom generates an enable blanking signal, ONBLK.

Combinational logic circuit 1764 generates a sequence state A or B signal, $1SSAB = [SSA + SSB]'$ to indicate whether or not the sequence flip-flops 1750, 1752 are in a data state.

Combinational logic 1766 generates an enable blanking signal, $1LABK = [ONBLK \cdot \overline{QL2} \cdot QEC \cdot CLKC]'$. The enable automatic blanking signal is thus generated when properly enabled from the time a complete error free selection message is received until the address character of a second selection message is received. Signal LABK initiates an auto blanking sequence and is not required for continued sequencer operation. Combinational logic 1766 also generates an end of message sent signal, $OEOMS = \overline{QL2} \cdot QEC$. This signal is thus true from the time that a complete selection message is received without error until the receipt of the first or address character of the next selection message for the key station. Combinational logic 1766 also generates a load character signal, $$1LDCR = [OCLKC \cdot ONLCR \cdot (EOMS \text{ or } SEP \cdot \overline{SSAB} \cdot E1E2)]'.$$

This signal thus commands the loading of the display cursor address into an address register at the termination of input processing of a character when the cursor latch 1758 is set and either a normal end of message character is received or a separator character is received while the sequencer is in a data state and no errors have occurred.

Combinational logic 1764 generates some additional clock and gating signals for loading line number, character number and data characters of a display into appropriate registers and memories. A load character line clock signal, $$1LCLC = [SSA \cdot SSB \cdot CKCD]'$$

clocks the move cursor and erase bits of the character line number coax character into flip-flops 1758 and 1760 while clocking the zero or flash bit into a flash latch and the binary representation of the update line number at bit positions 3–7 into a line number counter register. A load character line number gate signal, $$1LCLG = [SSA \cdot SSB]',$$

enables the load input of the character line counter at the time the load character line number clock signal 1LCLC is generated.

Combinational logic 1764 also generates load character line number clock and gating signals which similarly load the display character number transmitted by a selection message into a character number counter. The load character number clock signal has the representation, $$1LCNC = [\overline{SSA} \cdot SSB \cdot CKCD]'.$$

The load character number gating signal has the logical representation, $$1LCNG = [\overline{SSA} \cdot SSB \cdot CKCD]'.$$

A load data clock signal is also generated by combinational logic 1764. The load data clock signal is generated at the termination of input processing of each data character and has the logical function, $$1LDAC = [\overline{SSAB} \cdot CLKC \cdot \overline{SEP} \cdot \overline{COMD} \cdot E1E2 \cdot LADD]'.$$

Each occurrence of the load data clock signal initiates a write cycle to write the most recently received display character into the display memory 1586.

Figure 31:
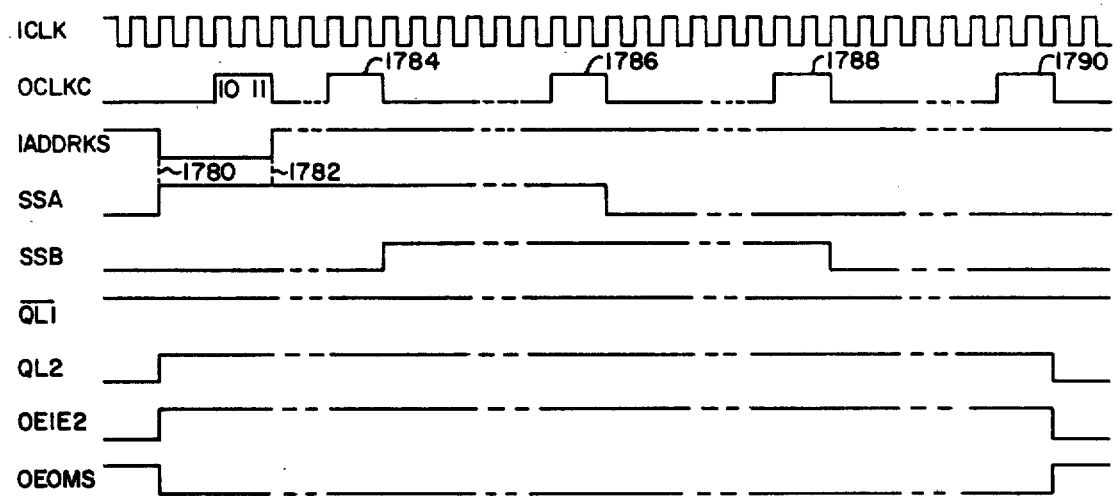
FIG. 31 is a timing diagram illustrating several signals which are pertinent to the operation of the data input control and sequencer shown in FIG. 30.

The operation of the data input control and sequencer 1516 may be better understood in connection with the timing diagram shown in FIG. 31. Initially, flip-flops SSA and SSB are reset, latch QL1 is reset, latch QL2 is reset, signal E1E2 is at logic zero and the end of message sent signal OEOMS, is at logic 1. As a character is clocked into the input data register 1706, the clocking sequence is divided into 11 bit times, one for each bit of the character, and each bit time is divided into 13 dock times. Clock signal OCLKC is generated during the tenth and eleventh clock times of the last bit time for each coax character. This signal thus indicates the termination of input processing for a coax character. As an address character for a selection message bearing the address of the key station is received, the key station address signal 1ADDRKS, is generated during clock time 8–11 as indicated by time interval 1780–1782. This ADDRKS signal sets flip-flops SSA, SSB to state 10 and latches QL1, QL2 to state 0, 1. The setting of the two latches activates the enable signal, E1E2, and terminates the end of message sent signal, EOMS. The second character of a selection message is a key station control character and a clock signal, OCLKC, generates a pulse 1784 at the completion of processing this character. Flip-flop SSB is clocked to the one state at the trailing edge of OCLKC pulse 1784. Another pulse 1786 on clock signal OCLKC is generated at the termination of input processing for the third or line number character of the selection message. At the trailing edge of pulse 1786, flip-flop SSA is reset. At the termination of input processing for the fourth or update character number character a pulse 1788 is generated on clock signal OCLKC. At the trailing edge of pulse 1788, flip-flop SSB is reset to enable the receipt of data characters. At the termination of input processing of each data character, a pulse (not shown) is generated on clock signal OCLKC similar to pulses 1784, 1786, and 1788. At the conclusion of a selection message an end of message character is generated and as input processing for the end of message character is terminated a pulse 1790 is generated on clock signal OCLKC. At the trailing edge of pulse 1790 latch QL2 is reset to terminate enable signal, E1E2, and the end of message sent signal, EOMS, goes to logic 1. If, at any time during the input processing of the selection message, a parity error or a sequence error occurs, latch QL1 is set causing enagle signal E1E2 to go to logic 0. In this event further response by the key station to the selection message is disabled and the end of message response character is not transmitted over the coaxial cable.

C. OUTPUT DATA TIMING AND CONTROL 1518

Figure 32:
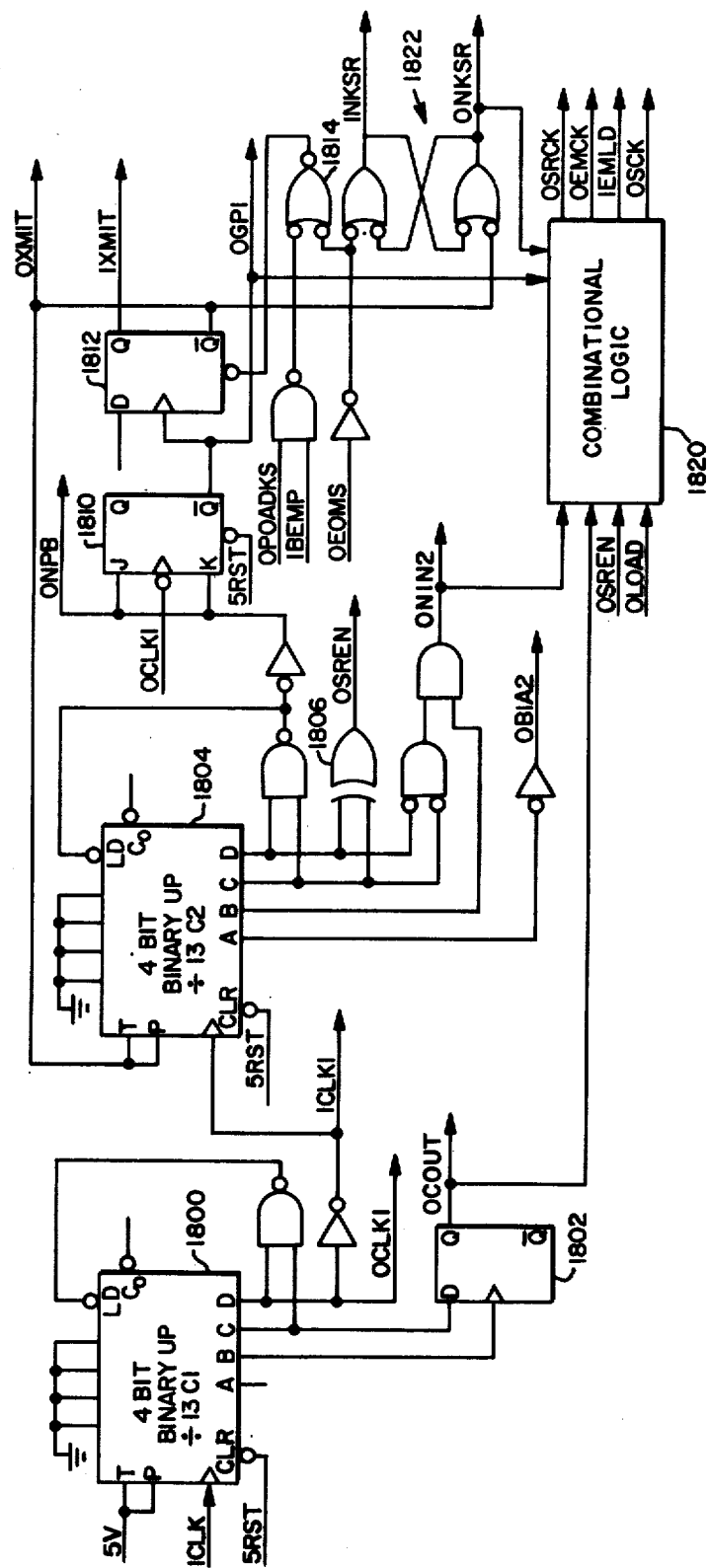
FIG. 32 is a functional block diagram and schematic representation of an output data timing and control circuit which forms a portion of the key station shown in FIG. 27.

The output data timing and control circuit 1518 is shown in FIG. 32. A four bit binary up counter C1 1800 is connected to divide the 13 megahertz clock signal, 1CLK, by 13 to generate a 1MHz clock signal OCLK1 at the D or most significant output therefrom. A type D flip-flop 1802 has a clock input connected to the B output of counter 1800 and its D input connected to the C output of counter 1800. Flip-flop 1802 thus generates a clock output signal, OCOUT, which goes true during counts 6–9 of each period of clock signal OCLK1 containing counts 0–12. A second four bit binary up counter C2 1804 is connected to count cycles of the 1MHz clock signal OCLK1 with its clock input connected to the complement thereof and recycles after counting from 0–12. Counter 1804 counts bit times for controlling the output of key station response messages. The least significant or A output of counter 1804 is inverted to generate a bit 1 and 2 signal, OB1A2, which defines the initial and control bits of each response character which must always be 1 and 0 respectively. An enable 1 enable 2 signals, ON1N2, is generated during count states 2 and 3 of counter 1804 to enable the signal, CB1A2. During counts 4–11 an EXCLUSIVE-OR gate 1806 responds to the C and D outputs of counter 1804 to generate a shift register enable signal, OSREN, which remains true for 8 bit times to permit the output of the 8 bit byte contained at bit locations 3–10 of each response character. An enable parity bit signal, ONPB, enables the transmission of the parity bit at bit position 11 of each coax response character while counter 1804 is at count state 12.

A pair of control flip-flops 1810, 1812 control the generation of the 2 output response characters which represent a key station response message. When the key station is not transmitting, flip-flop 1810 is reset and flip-flop 1812 is set. An AND gate 1814 clears flip-flop 1812 to initiate a response sequence when either the key station polling address signal, OPOADKS, goes true while the complement of the buffer empty signal, 1BEMP, is true or when the end of message sent signal, OEOMS, goes true after a complete selection message is received without parity or sequence errors. As flip-flop 1812 is cleared a generate part 1 signal, OGP1, which is taken from the $\overline{Q}$ output of flip-flop 1810 is at logic 1 and the transmit signal, OXMIT, taken from $\overline{Q}$ output of flip-flop 1812 go to logic 1. The signal, OXMIT, drives the T and P clock enable inputs to counter 1804 which immediately begins counting under control of the 1MHz clock signal 1CLK1 to define the bit times for the first character of the key station response message. During counts 2 and 3 the initial and control bits are generated as explained above, during counts 4–11 the 8 bit byte is generated and during count 12 the parity bit is generated. Flip-flop 1810 has its JK inputs connected for toggling by the enable parity bit signal and its complementing clock input connected to receive the 1MHz clock signal, OCLK1. Thus, at the next high to low transition of clock signal OCLK1 after counter 1804 reaches count 12, flip-flop 1810 is toggled, causing the generate part 1 signal, OGP1, to go to logic 0 and counter 1804 is present to count 0. As counter 1804 passes through count states 0 and 1, 2 microseconds elapse which permit the key station output logic circuitry to prepare to transmit the data portion of the second response character and to provide the required at least one microsecond between successive coax characters. At counts 2 and 3 the initial and control bits of the second response character are generated and during counts 4–11 the 8 bit data byte of the second response character is transmitted. During count 12 the parity bit is enabled as signal ONPB goes true. At the end of count 12 clock signal OCLK1 makes a high to low transition to toggle flip-flop 1810 back to the reset state and counter 1804 is preset to count 0. As flip-flop 1810 toggles back to the reset state it clocks flip-flop 1812, whose D input is connected to logic 1, to cause the setting of flip-flop 1812 to terminate the transmit signal, OXMIT, which disables counting by counter 1804. A response sequence is thus terminated after the transmission of two complete coax characters with counter 1804 at count state 0, flip-flop 1810 reset, and flip-flop 1812 set.

A latch 1822 generates an enable key stroke register signal, ONKSR, at the Q output therefrom and the complement, 1NKSR, at the $\overline{Q}$ output therefrom. This latch is normally in a set state to generate the enable key stroke register signal, ONKSR. However, when a key station response message is initiated by the end of message sense signal, EOMS, the latch is reset by this signal to inhibit operation of the key stroke buffer memory 1524 while the selection response message is being transmitted. At the termination of the transmission of the selection response message, the return of a transmit signal, OXMIT, to logic 0 cause latch 1822 to again be set to generate the enable key stroke register signal, ONKSR.

A block of combinational logic circuits 1820 generates three clock and enable signals in response to the internal signals of the output data timing and control circuit 1518 and a load signal, OLOAD which is generated by the key stroke memory load generator 1552 to command the loading of a data character into the key stroke buffer memory in response to the activation of a key. A shift register clock signal has the logicl function,

OSRCK = COUT·NKSR·SREN + LOAD·COUT, to clock the shift registers of the key stroke buffer memory as either a new character is loaded into the memory or a character is shifted out of a memory for transmission over the coaxial cable during the key station response to a polling message. An enable memory clock signal having the logical function,

OEMCK = SREN·NKSR·COUT = COUT·OGP1·N1N2, enables a response message clock signal to permit transmission of the predetermined selection message response after a complete selection message is received by the key station without error. An enable selection message load signal,

1EMLD = [N1N2·GP1]', enables the loading of the predetermined key station response signal into the selection response register 1556. Combinational logic 1820 also generates a serial clock signal,

OSCK = LOAD·XMIT.

D. KEY REPEAT GENERATOR 1522

Figure 33:
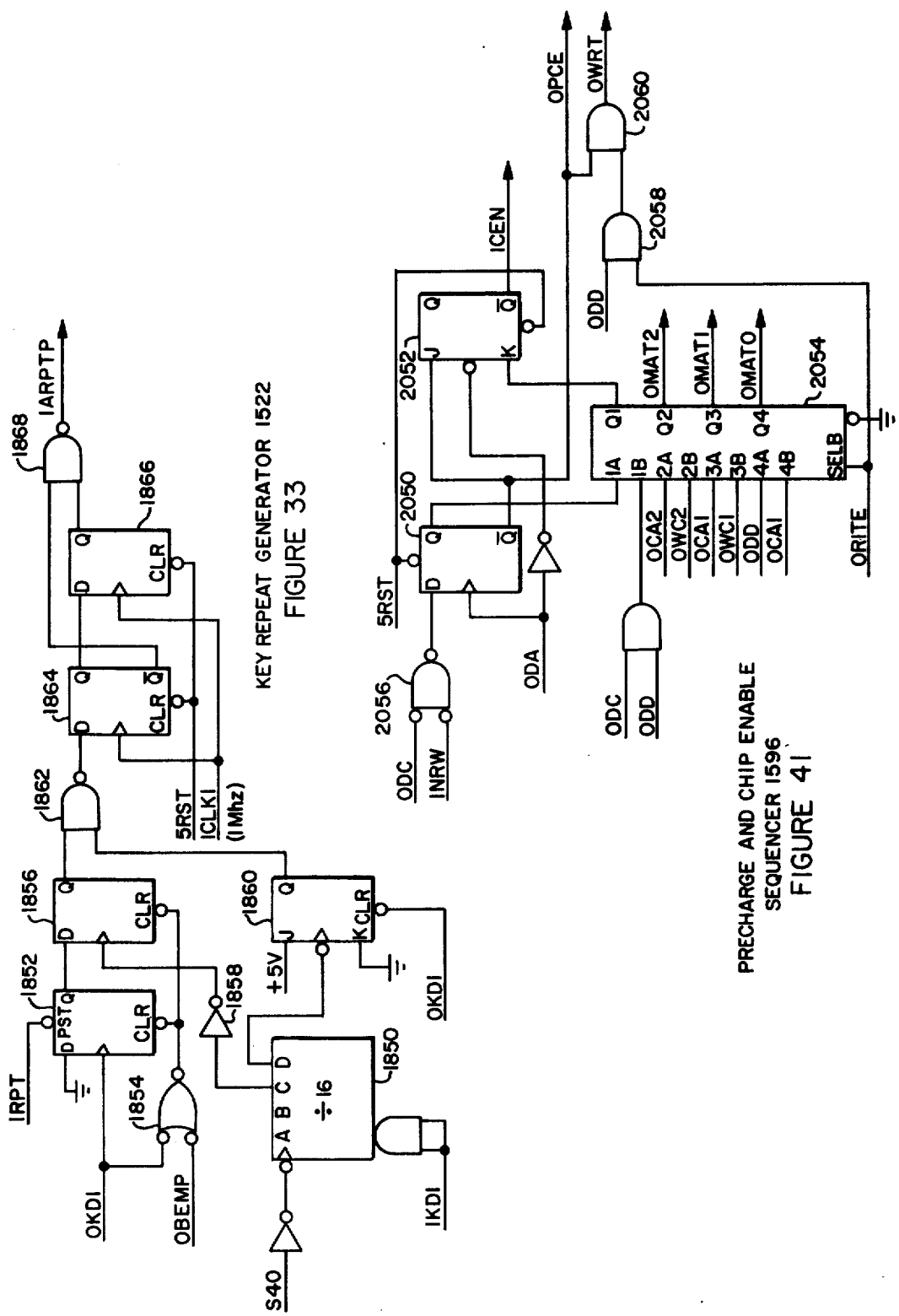
FIG. 33 is a functional block diagram and schematic representation of a key repeat generator which forms a portion of the key station shown in FIG. 27.

As shown in FIG. 33, the key repeat generator 1522 includes 5 control flip-flops and a divide by 16 counter 1850. Counter 1850 has its complementing clock input connected to a complement of a 40 hertz clock signal S40 and the reset inputs thereof connected to the complement of the 1 key down signal, 1KD1. The 1 key down signal indicates the activation of exactly 1 key on keyboard 1528. A flip-flop 1852 has the D input thereof connected to ground, the clock input connected to the 1 key down signal, OKD1, the present input connected to the automatic repeat signal, 1RPT, from the key station control register 1520, and the complementing clear input connected to the output of an AND gate 1854 receiving the signal OKD1 and the buffer empty signal OBEMP as inputs. A flip-flop 1856 has the D input thereof connected to the Q output of flip-flop 1852, the clock input connected through an inverter 1858 to the C output from divider 1850 and the complementing clear output conncted to the output of AND gate 1854. A JK flip-flop 1860 has the J input thereof connected to 5 volts, the K input connected to ground, the complementing clock input connected to the D output of counter 1850 and the complementing clear input connected to signal OKD1. A NAND gate 1862 has the two inputs thereof connected to the Q output of flip-flop 1856 and the Q output of flip-flop 1860. The output of NAND gate 1862 drives the D input to a flip-flop 1864 having the clock input connected to receive a 1MHz clock signal, 1CLK1. A flip-flop 1866 has the D input thereof connected to the Q output of flip-flop 1864 and the clock input connected to signal 1CLK1. The complementing clear inputs to flip-flop 1864 and 1866 are connected to the key station reset signal, 5RST. A NAND gate 1868 has the Q inputs thereof connected to the Q output of flip-flop 1864 and the Q output of flip-flop 1866. An automatic repeat pulse signal, 1ARPT, is taken from the output of NAND gate 1868.

The operation of key repeat generator 1522 is as follows. Assume initially that no key is depressed, then signal 1KD1 constrains counter 1850 to state O, signal OKD1 constrains flip-flops 1852, 1856 and 1860 to be cleared, and flip-flops 1864 and 1866 are both set because the output of NAND gate 1862 is at logic 1. Assume now that a keyboard key is activated, causing signal OKD1 to go true. Counter 1850 immediately begins to count cycles of the 40 hertz clock signal, S40. The clock input to flip-flop 1856 receives a low to high transition every 0.2 second after the initiation of the OKD1 signal. However so long as flip-flop 1852 remains reset, flip-flop 1856 must also remain reset. After 0.4 seconds the D output of counter 1850 makes a transition from high to low to clock flip-flop 1860 into the set state and enable NAND gate 1862. If, during this 0.4 second interval. The keyed character has been transmitted to the CPU 16 and the CPU has responded with a repeat enable signal, flip-flop 1852 has been preset by the enable automatic repeat signal, 1RPT. In this event, flip-flop 1856 will become set in response to the clocking thereof at either 0.2 or 0.4 seconds after the key depression. In either case, NAND gate 1862 becomes fully enabled after 0.4 seconds. The D inut to flip-flop 1864 is driven to logic 0 and during the 1 microsecond interval between the time flip-flop 1864 is reset and the time flip-flop 1866 is reset, NAND gate 1868 generates the automatic repeat pulse signal, 1ARPTP. This signal commands the automatic repeat, and the corresponding character is loaded into the buffer memory, causing the buffer empty signal, OBEMP, to go to logic 0 to drive AND gate 1854 to logic 0 and clear flip-flops 1852 and 1856. If the CPU 16 again enables automatic repeating, signal 1RPT presents flip-flop 1852 so that when flip-flop 1856 is again clocked 0.6 seconds after the key stroke, it can become set to again fully enable NAND gate 1862 and cause the generation of another automatic repeat character. If the key is released during the automatic repeat period, counter 1850 is reset and the 0.4 second initial period must begin anew. Similarly, if the keyboard operator has been working fast enough that the buffer memory already contains one or more characters at the time the automatic repeat key is depressed, the CPU 16 will enable automatic repeating of a character preceding the character corresponding to the continuously activated key and an erroneous automatic repeat might be initiated, except that the buffer memory would not be emptied and the buffer empty signal, OBEMP, would constrain flip-flops 1852 and 1856 to the reset state to prevent an automatic repeat. If, however, all characters are read from the buffer memory within the initial 0.4 seconds, an automatic repeat is then enabled and the key repeat generator 1522 may operate in a normal manner.

E. KEY BOUNCE ELIMINATOR CIRCUIT 1530

Figure 34:
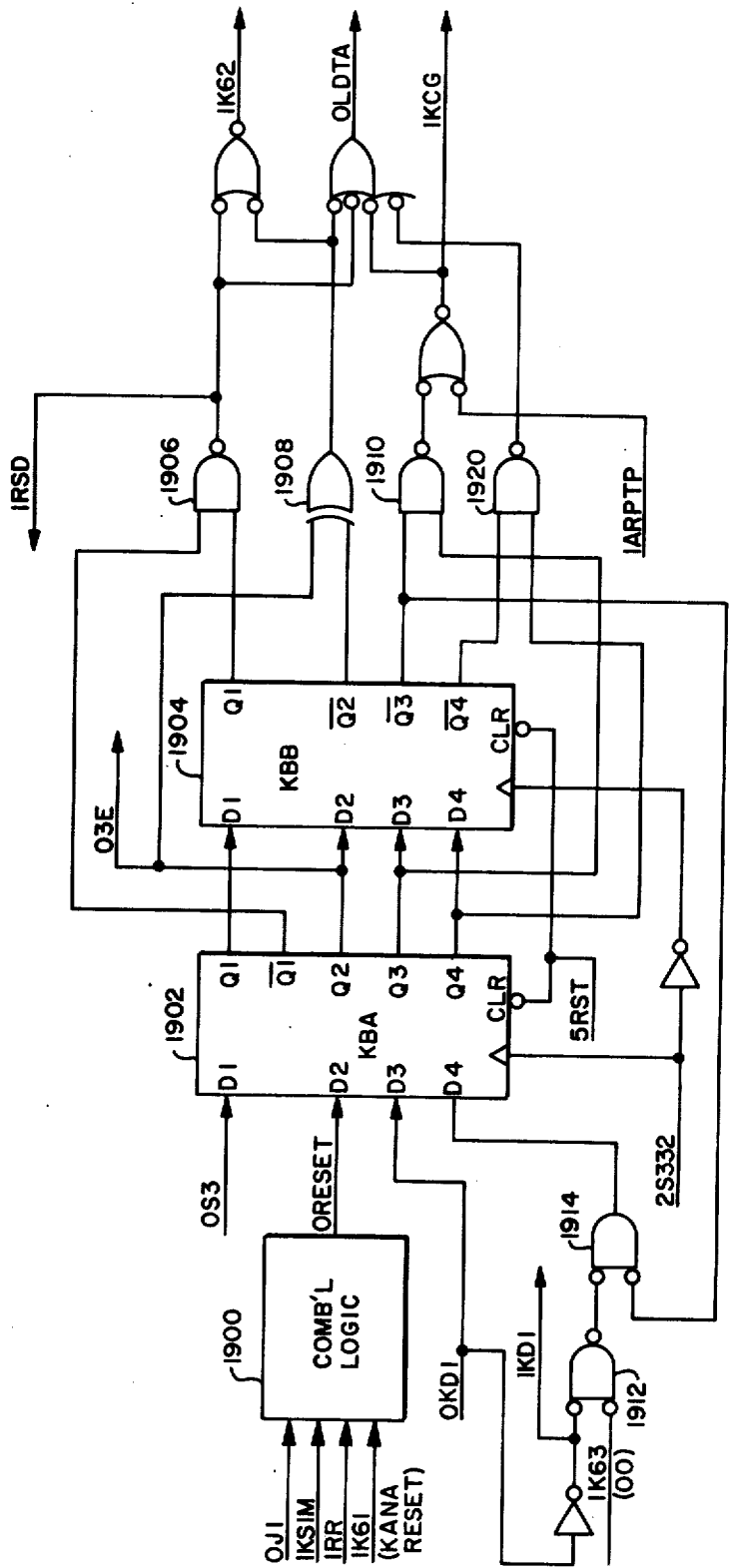
FIG. 34 is a functional block diagram and schematic representation of a key bounce eliminator which forms a portion of the key station shown in FIG. 27.

As shown in FIG. 34 the key bounce eliminator 1530 includes a block of combinational logic 1900, a first parallel in-parallel out register KBA 1902, a second parallel in-parallel out register KBB 1904 and sequential logic circuitry. Register KBA is clocked by a 332 Hz clock signal, 2S332 and register KBB is clocked by the complement of signal 2S332. In general, the key bounce eliminator 1530 operates by loading key activation signals into register KBA to set the appropriate bit position thereof and generating responsive output signals during the time interval between the setting of register KBA and the subsequent setting of register KBB approximately 1.5 millisecond later at the next transition of clock signal 2S332.

For instance, signal OS3 drives input D1 of register KBA and goes to logic 1 whenever one of the shift keys AA, KK or NN is activated. At the next low to high transition of clock signal 2S332 signal OS3 is loaded into register KBA causing output Q1 to go high. One-half clock period later, when clock signal 2S332 makes a high to low transition, register KBB is clocked causing its output to go to logic 1. As the shift key is released, output QKBA1 returns to logic 0 and one-half clock pulse time later output QKBB1 returns to logic 0. However, during the one-half clock pulse period that QKBA1 is at logic 0 and QKBB1 is at logic 1, a NAND gate 1906 generates a shift release signal, $$1RSD = [\overline{QKBA1} \cdot QKBB1]'.$$

The D2 input of register KBA is driven by a reset signal, $$ORESET = KSIM + RR + K61 \cdot OJ1.$$

The reset signal thus goes active in response to the simulated key activation signal KSIM or the activation of the English configuration reset key RR or the Kana configuration reset key, K61. After being loaded into register KBA, the reset signal is loaded into register KBB at bit position NO. 2 on the next transition of clock signal S332 one-half clock period later. An EXCLUSIVE-OR gate 1908 has one input connected to the Q output or register KBA and the output input connected to the $\overline{Q}$ output of register KBB and thus generates a logic 0 output in response to both the activation and deactivation of one of the reset key signals.

The one key down signal, OKD1, drives the D3 input to register KBA and the Q3 output of registr KBA drives the D3 input of register KBB. A NAND gate 1910 is connected to respond to each activation of the OKD1 signal during the one-half clock period time interval that output QKBA3 is true and output $\overline{QKBB3}$ is true.

An automatic double zero key is implemented by assigning key K63 the double zero function. Activation of key K62 causes one key down detection circuit 1526 to generate an indication that key, K57 at location column 5 and row 7 has been activated. The key station thus reacts as if key K57 has been activated and signal ODK1 drives the D3 input of register KBA to generate a load data strobe pulse command through NAND gate 1910. However, signal 1K63, which is generated as the double zero key is depressed, combines with the complement of the one key down signal to activate an OR gate 1912 which then enables a NOR gate 1914. As the ODK1 signal is clocked through to register KBB and the $\overline{Q3}$ output thereof goes low, gate 1914 becomes fully enabled to drive input D4 of KBA to logic 1. One-half clock pulse time later bit position 4 of register KBB is clocked to the 1 state, but during the interim, a NAND gate 1920 generates a signal, LDTA, which causes a second load data signal to be generated and the key station reacts as if the 0 key, key 57, had been depressed a second time.

Output signals from the key bounce eliminator 1530 include a reset or shift key signal, $$1K62 = [RSD + QKBA2 \oplus \overline{QKBB2}]'.$$

Signal 1K62 thus becomes active in response to each release of a shift key and each actuation or release of an actual or simulated reset key. The load data strobe signal has the logical function, $$OLDTA = RSD + QKBA2 \oplus \overline{QKBB2} +$$
$$QKBA3 \cdot \overline{QKBB3} + QKBA4 \cdot \overline{QKBB4} + ARPTP.$$

A key clock gating signal has the logical function, $$1KCG = [QKBA3 \cdot \overline{QKBB3} \text{ or } ARPTP]'.$$

This signal thus becomes activated in response to each data key activation and each automatic repeat activation.

F. KEY STROKE MEMORY 1524

As shown in FIG. 35 the key stroke memory 1524 includes 3 parallel in-parallel out 16 bit shift registers 1930, 1932 and 1934. The 16 parallel outputs of shift register 1930, Q0–Q15 drive the respective 16 parallel inputs of shift register 1932 and the 16 parallel outputs of shift register 1932, Q0–Q15 drive the respective 16 parallel inputs to shift register 1934. Registers 1930, 1932, and 1934 form buffers 1, 2, and 3 respectively. As data is loaded into the buffers in response to key stroke activations, the data is loaded in parallel first into buffer 1 then buffer 2 and buffer 3 when both buffers 1 and 2 are full. The key station responds to a polling message by transmitting serially data from the highest numbered buffer which contains information.

Parallel input D0 of buffer 1 is driven by the least significant binary coded column key signal, OC1. Similarly, input D1 is driven by signal OC2, input D2 is driven by signal OC4. Inputs D3–D5 are driven by binary coded row signals OR1, OR2 and OR4. Bit positions D0-D5 thus identify 1 row and 1 column position for each activation of a keyboard key. In similar manner inputs D6 and D7 are driven by the OS1 and OS2 shift signals to identify an activated or release shift key. Input D8 is driven by a test signal 2TST4 which is normally logic 1 but may be externally grounded. Input D9 is driven by the Q14 output of buffer 3 and indicates a buffer overflow condition. The D14 input of buffer 1 is driven by a logic 1 signal. If there are three successive load commands without an intermediate readout of the buffer memory 1524, output Q14 of buffer 3 will be at logic 1 and all of the buffers will be full. If there is a fourth occurrence of the load signal, the information in buffer 3 is lost but bit position 9 of buffer 1 is driven to logic 1 to indicate this overflow condition. The CPU is programmed to respond to the detection of an overflow condition by ignoring the data content of the character indicating the overflow and providing the keyboard operator with a warning of the overflow condition. This warning may be provided by generating a tone pulse or by causing the CRT display to flash. The operator responds by activating the reset key to indicate an awareness of the overflow condition and continuing with keyboard operation beginning at the location of the curser. Input D10 is driven with a signal OSR. This signal is generated by the keyboard associated logic to indicate that the reset key is activated. Input D11 is driven by signal 1J2, input D12 is driven by signal OJ3 and input D13 is driven by signal OJ4. As noted previously signals J1, J2, J3 and J4 are generated by selectively clipping input leads to an inverter package. The use of the J1 signal to identify the Kana shift keyboard configuration has already been discussed. Signals J2, J3 and J4 are available to identify other combinations of keyboard configurations. The CPU is thus able to utilize these signals to identify one of several possible conversion tbles of converting the row and column signals to an EBCDIC character code. These J signals thus permit a single keyboard hardware design to be utilized for several character configurations and further permit may different character configurations to be utilized within a single data entry system. As noted previously, input D14 is driven by logic 1 so that the corresponding output Q14 of each buffer is at logic 1 whenever the buffer stores information. Input D15 is driven by a test signal, 1TST3, which is normally logic 1, but can be externally grounded to cause a change to logic 0.

Inverters 1938 between bit positions 11 and 12 of each of the buffers complement serial data as it is shifted through the buffers. The outputs of each buffer at Q15 provide complement key stroke data signals 1KSD1, 1KSD2, and 1KSD3, respectively. Information stored in buffer positions 0-11 is thus considered to be in position logic 1 while information stored a bit positions 12-15 of each of the three buffers is thus considered to be in complement form. As the buffers are recirculated the serial data taken from output Q15 is complemented before driving the J, $\overline{K}$ input. Information is thus complemented twice as it is recirculated and there is no net change in the data state.

A pair of status flip-flops 1940, 1942 are clocked by a status clock signal OSCK in response to each transmit signal, OXMIT to indicate the data status of the buffer registers 2 and 3 respectively at the beginning of each polling response cycle. The D input of flip-flop 1940 is responsive to the Q14 output of buffer 2 and the D input of flip-flop 1942 is responsive to the Q14 output of buffer 3. The complementing clear inputs of flip-flops 1940 and 1942 as well as buffers 2 and 3 are driven by a clear buffer memory signal, 1CLBM = [RST + CLRM + $\overline{\text{XMIT.BEMP}}$.
OVERFLOW.$\overline{\text{LOAD}}$]'.

This signal thus clears buffer 2 and buffer 3 as well as the two flip-flops whenever there is a reset signal, a clear memory signal or a buffer overflow. A buffer overflow thus causes the character which generated the overflow to be read next so that the overflow can be immediately detected by the CPU 16. The Q output of flip-flop 1940 generates a key stroke enable A signal, OKSNA, indicating that buffer memory 2 contains data information. Similarly flip-flop 1940 generates a key stroke enable B signal, OKSNB, indicating that buffer 3 stores character information. These signals enable a data combiner 1558 to respond to serial data from the highest numbered buffer which contains information. The complementing clear input to buffer 1 is driven by a clear signal having a logical function [CLRM or RST]'. Buffer 1 is thus cleared only in response to a clear memory or reset signal and is not cleared in response to an overflow condition. A NAND gate 1944 drives the J, $\overline{K}$ inputs of buffer 1 with a signal [1KSD1.OKSNA]' which permits the contents of buffer 1 to be recirculated only when buffer 2 contains information at the beginning of a polling response cycle. Similarly, the J, $\overline{K}$ input to buffer 2 is driven with a signal [1KSD2. KSD2. ($\overline{\text{KSNA}}$+KSNB)]'. Buffer 2 is thus recirculated any time buffer 3 contains information or any time buffer 2 contains no information. If buffer 2 contains the oldest key stroke information which is to be transmitted during a polling response cycle, positive logic 0's are shifted into the buffer as the character information is shifted out. Any time buffer 2 does not contain character information, the positive logic 0 contents thereof are recirculated with no information change. The J, $\overline{K}$ input to buffer 3 is driven by a signal [$\overline{\text{KSNB}}$.KSD3]'. Buffer 3 is thus recirculated only when empty and otherwise positive logic 0's are written into the memory as information is shifted out during a polling response cycle. The clock inputs to all three buffer registers are driven by a shift register clock signal, OSRCK, which becomes active to synchronously load the registers or to shift data in the registers during a polling response cycle.

G. SELECTION RESPONSE FEGISTER 1556

As shown in FIG. 36 the selection response register circuit 1556 includes a 16 bit parallel in shaft register 1950 having parallel inputs D0-D15 and a single operative output Q15 driving an end of message data signal, 1EOMD. The complementing load input is driven by the end of message load signal, 1EMLD, and the complementing clear input is driven by key station reset signal 3RST. The J, $\overline{K}$ serial inputs are driven by a +5 V logic 1 signal. The clock input is driven by the end of message clock signal, OEMCK. The register 1950 normally stores all ones representing an all zero data information state in complement form. Test signal inputs 1TSTC-1TSTA and 1TST9-1TST4 are connected to inputs D0-D8 respectively. These inputs are normally driven at logic 1 but may be driven to logic 0 by the test signal inputs if desired. Inputs D14 and D15 are normally at logic 1 but may also be driven to logic 0 by test signal inputs 1TSTD and 1TST3 respectively. The first data byte at bit positions 8-15 thus contains all zeros in complement form as required by the preestablished convention for the end of message data signal. The data byte at bit positions 0-7 also contains all zeros in complement form, but these information bits of the second byte are available for the assignment of specific information contents at a later date is desired.

H. DATA COMBINER 1558

Figure 37:
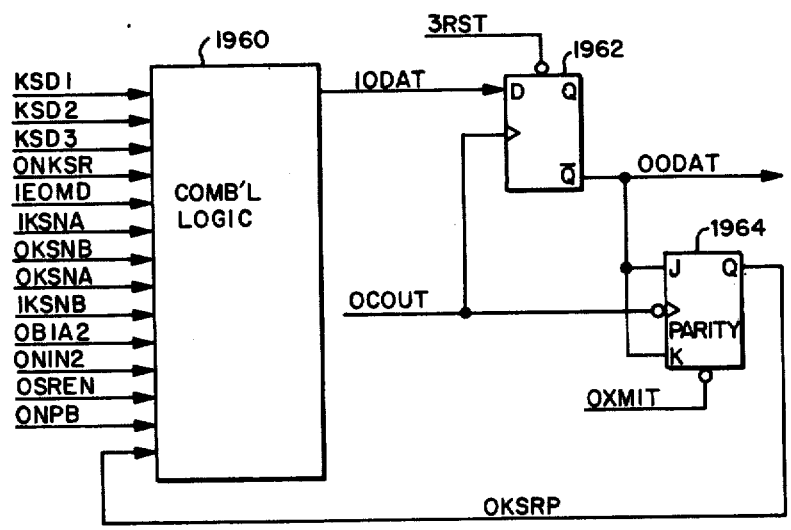
FIG. 37 is a functional block diagram and schematic representation of a data combiner which forms a portion of the key station shown in FIG. 27.

As shown in FIG. 37, the data combiner 1558 includes a block of combinational logic 1960 generating a complement output data signal, 1ODAT, a synchronization flip-flop 1962 and a parity flip-flop 1964. The sequential logic circuitry generates the complement output data signal, 1ODAT = B1A2.N1N2 + [$\overline{\text{NKSR}}$.1EOMD+
$\overline{\text{KSNA}}$.NKSR.1KSD1 + KSBN.NKSR.1KSD3
+ KSNA.$\overline{\text{KSNB}}$.NKSR.1KSD2]. SREN +
NPB.QKSRP.

The first pair of terms provide the first and second bits of the response message which are always 1 and 0 respectively for both a polling response and a selection response. The term in brackets provides the 8 bit data bytes at response character positions 3-10. The shift register enable signal, SREN, enables the data byte and the enable key stroke register signal, NKSR, determines whether or not the data is taken from the end of message response register or the key stroke memory. When signal, NKSR, is at logic 0 a selection message response is indicated and the signal 10DAT represents the end of message data signal, 1EOMD. Otherwise, the output data signal represents the complement data output of one of the three key stroke memory registers. With signal KSNA at logic 0, register buffers Q2 and Q3 contain no data and the output 1KSD1 from buffer 1 is enabled. Similarly, if signal KSNB is at logic 1, buffer 3 does contain data and output 1KSD3 is enabled. In a like manner, output 1KSD2 from buffer 2 is enabled only when buffer 2 contains information as indicated by signal KSNA and buffer 3 contains no information as indicated by signal $\overline{\text{KSNB}}$. At bit time 11, the enable parity but signal, NPB, enables the key station response parity signal, QKSRP. Synchronizing flip-flop 1962 receives the signal, 10DAT, at the D input thereto and is clocked by output clocking signal OCOUT. Utilization of the Q output of flip-flop 1962 converts the output data signal to its positive logic representation, OODAT. Parity flip-flop 1964 has its JK inputs toggle connected to the output data signal, OODAT. The complementing clock input to flip-flop 1964 is connected to the clocking output signal, OCOUT, and the complementing clear input to flip-flop 1964 receives the transmit signal, OXMIT. The Q output of flip-flop 1964 is connected to sequential logic to be transmitted as part of the signal 10DAT at bit time 11. Because flip-flop 1964 is always cleared to the reset state by the transmit signal immediately before each response sequence, and because the toggle inputs are clocked at approximately the middle of each transmission bit time, the Q output of flip-flop 1964 always represents the logic state reuired to provide even parity over the transmitted response character.

I. HORIZONTAL LINE CONTROL FUNCTION GENERATOR 1574

As shown in FIG. 38, the horizontal line control function generator 1574 provides the basic control signals for the horizontal axis of the CRT display and also divides each row of the display into 52 character positions (0-51) with 8 horizontal dot positions in each line of each character position. A four bit dot counter 1970 is clocked by the complement of the 13MHz key station clock signal 2CLK. An 8 bit character address counter 1972 has the two count enable inputs thereof, T, P, connected to the carry output from counter 1970 and the clock input connected to the complement of the key station clock signal 2CLK. Character address counter 1972 is thus incremented each time the 4 bit dot counter 1970 overflows. Counter 1972 is conncted to count to 51 and then reset to zero to define 52 horizontal character position address count times, Counter 1970 therefore divides each horizontal character position address count time into 16 dot count times. An 8 bit shift register 1974 has the intpu thereof enabled during dot count times 2 and 3 and the clock input connected to the complement of output ODA from counter 1970 to cause the clocking of shift register 1974 at each transition from an odd count time to an even count time. Thus, at the beginning of count time 4, a logic 1 is loaded into the first bit position of register 1974 and dot time 1 output signal 0D1 is activated. At the beginning of dot count tiime 6, register 1974 is clocked again causing the logic 1 to be shifted from the first bit position to the second bit position making dot time output 2, 0D2 equal to logic 1 and output 0D1 logic zero. In similar fashion, output 0D3 is active during dot count times 8 and 9, output 0D4 is active during dot count times 10 and 11, output 0D5 is active during dot count times 12 and 13, signal 0D6 is active during dot counter times 14 and 15, signal 0D7 is active during dot count times 0 and 1 as dot counter 1970 overflows, and signal 0D8 is active during dot count times 2 and 3. As the logic 1 is shifted out of the register 1974 at the transition from dot count times 3 to 4, a new logic 1 is shifted into the first bit position of the register to again make signal 0D1 true during dot count times 4 and 5. Because of the phase relationship between shift register 1974 and dot counter 1970, the character address counter 1972 is incremented to indicate the next character address and the count time at the transition from dot tims 6 to dot tims 7 as indicated by shift register 1974. Character address counter 1972 thus leads the dot time indicator register 1974 by 2 dot times.

A pair of decimal decoders 1976, 1978 are connected to partially decode binary coded outputs of character address counter 1972. The three least significant inputs A, B and C to decoder 1976 are driven by output signals CA8, CA16 and CA32 respectively. The D input is not operative. As a result of this connection arrangement, the least significant output of decoder 1976 is active during count times 0-7, the next output is active during count times 8-15 and so forth. Each labeled output thus becomes active at the count time corresponding to its numerical suffix and remains active for 8 count times. Decoder 1978 has the three least significant inputs thereof, A, B and C driven by signals CA1, CA2, and CA4 respectively to complete the octal decoding of each group of 8 count times indicated by the outputs of decoder 1976. A flip-flop 1980 is connected to disable the least significant 8 outputs of decoder 1978 during dot count times 15 and 0, which correspond to the second half of dot time 6 and the first half of dot time 7. Character address counter 1972 is incremented midway through this time interval that decoder 1978 is disabled. A horizonal synchronization latch 1981 is connected to be set by the key station reset signal, 3RST or at the end of character count time 40 during the first half of dot time 6 as indicated by dot count time 14. Latch 1981 is reset near the beginning of character address count time 7 and more specifically at dot count time 1 corresponding to the second half of dot time 7. The Q output of latch 1981 is inverted to generate horizontal synchronization signals 2HRT and OHRT. These signals permit the synchronization of the horizontal oscillator of the deflection driver 1572 to be synchronized with character address counter 1972 in such a way that each left to right horizontal scan of the CRT 1570 begins as character address counter 1972 is incremented to count 48. In this way 6 blanked out character address display locations 48-51 and 0-1 appear at the left hand edge of the screen, illuminated character address locations 2-41 appear at the center of the screen and 6 blanked out character address locations 42-47 appear at the right hand edge of the display screen.

An enable horizontal display signal, ONHD, and a horizontal blanking signal, HBLK, disable the video signal at the left and right hand edges of the screen to prevent the erroneous illumination of the CRT at the edges thereof. Signal ONHD is generated by the Q output of a latch 1982 which is set one-thirteenth microsecond after character address counter 1972 is incremented to indicate character address count 2. This is approximately one-fourth character count time before the actual display of character address location 0 at character count time 2, dot time OD1-OD5. Latch 1982 is reset by the key station reset signal, 3RST or one-thirteenth microsecond after character address counter 1972 is incremented to indicate character count time 42. Signal OHBLK is generated by the Q output of a latch 1984. The blanking latch 1984 is set either by the key station reset signal 3RST or during the second half of dot time 6 (corresponding to count time 15) for character address count time 42. The blanking latch 1984 is reset before the CRT display is to begin at dot time 1 of character address count time 1. A NOR gate 1986 generates a clock signal, OCK48, to increment a line counter at the beginning of each horizontal scan of the CRT. Clock signal OCK48 is generated one-thirteenth microsecond after character address counter 1972 is incremented to count state 48 and terminates one-thirteenth microsecond before counter 1972 is incremented to count state 49.

J. VERTICAL LINE CONTROL FUNCTION GENERATOR 1578

The vertical line control function generator 1578, as shown in FIG. 39, divides the CRT display into 15 rows of characters with 13 display scan lines in each row. The function generator 1578 further provides a control signal, 1VRT, for synchronizing the vertical deflection oscillator of the deflection driver and video amplifier 1572 with the vertical address command signals, an enable vertical cursor signal, ONVC, for determining on which lines the cursor will be displayed, a vertical blanking signal, 1VLBK, preventing erroneous illumination at the top and bottom of the CRT display, and an enable video signal, ONVD, which enables the video display at the center area of the CRT display.

A 1-13 line counter 2000 is connected to be incremented by the clock signal OCK48 at the beginning of each horizontal scan of the CRT display. Counter 2000 thus divides each row of display characters into 13 lines. A 0-14 row address counter 2002 has the clock input thereof connected to clock signal OCK48, and the count enable inputs connected to be activated when counter 2000 is at count state 10. Counter 2002 is thus incremented as counter 2000 is incremented from count state 10 to count state 11. As a result of this arrangement, row address counter 202 leads the line counter 2000 by 3 line counts and indicates the next row of characters while line counter 2000 is still counting lines 11, 12 and 13. However, there is no effect on the actual display of a character because characters are displayed during lines 1-7 and not during lines 11-13. The flip-flop 2004 is connected to divide the most significant output, 0L8, from counter 2002 by 2 to generate a flash rate clock signal 2L at a frequency of approximately 10Hz.

Decimal decoders 2006 and 2008 receive the outputs of the counter 2002 and 2004 respectively, except that the signal 0L8 is inverted before driving the most significant input to decoder 2006. Decoder 2006 thus indicates rows 8-15 at what would normally be outputs 0-7 and rows 0 and 1 at what would normally be outputs 8 and 9. Decoder 2008 provides outputs indicating character lines 0-9 in a normal fashion.

Vertical synchronization signal, 1VRT, is generated by inverting the Q output of a latch 2010. Latch 2010 is set by the key station reset signal, 3RST, or by a signal generated one-thirteenth microsecond after horizontal character address counter 1972 reaches count state 12 during the scan of character line 1 of row 13. Latch 2010 is reset by clock signal OCK48 at the beginning of the CRT scan for character line 6 of row 13. An OR gate 2012 generates the enable vertical cursor signal, ONVC, at lines 13 and 1-8 are scanned. It will be recalled that the row address counter 2002 is incremented prior to line counter 2000 reaching count 13. The character line 13 enable for signal ONVC thus activates the signal 1 character line before the normal display location of a character. Similarly, the character line 8 signal enables the cursor signal 1 character line after the normal display lines for a character. The cursor is thus one line higher and one line lower than the normal display area for a character.

A vertical blanking signal, OBLK, is generated by the Q output of a latch 2014. Latch 2014 is reset either by the system reset signal, 3RST, or by clock signal OCK48 at the beginning of the CRT scan for character line 6 of row 14. Latch 2014 is set by clock signal OCK48 at the beginning of the scan for character line 3 of row 12. This signal thus disables illumination between line 3 of row 12 and line 6 of row 14 which are normally not available for display.

An enable vertical display signal, ONVD, is generated by the Q output of a latch 2016. Latch 2016 is set to enable the display as row address counter 2002 is incremented to indicate row 0. Latch 2016 is reset to terminate the display enable as row address counter 2002 is incremented to indicate character row 12. The vertical enable signals thus permit the CRT display to be illuminated during the 12 character rows 0-11.

K. WRITE SEQUENCER 1590

As shown in FIG. 40, the write sequencer 1590 includes five type D flip-flops WSA-WSE 2020-2024 and provides the necessary timing for writing a data character into random access memory 1586. The D input to flip-flop WSA 2020 is connected to logic 1 and the D inputs of flip-flops WSB 2021-WSE 2024 are connected to the Q outputs of the preceding flip-flops in sequence. The clock input of flip-flop WSA 2020 is connected to an OR gate which responds to either the automatic blanking clock signal 2ABLC or the load data clock signal 2LDAC. Flip-flop WSB is clocked by signal ODD at each transition from dot time 6 to dot time 7 of each character scan. Flip-flops WSC, D and E have their clock inputs connected for activation by dot time 6 timing signal 0D6 which causes them to be clocked 7 dot times after the clocking of flip-flop WSB. The clear inputs to flip-flops WSA and WSB are connected fo activation by either the key station reset signal, RST, or the setting of flip-flop WSE. Flip-flops WSC-WSE are cleared only by the reset signal, RST.

Normally, all of the flip-flops WSA-WSE are reset and an enable read enable write signal, 1NRW = [$\overline{C48}$·$\overline{WSB}$ + WSC·$\overline{WSE}$]' is activated by flip-flop WSB being at logic 0 except when the character position counter of horizontal control function generator 1574 indicates character position 48 by activating signal 1C48. However, when either signal 1ABLC or 1LDAC clocks flip-flop WSA, this flip-flop becomes set. At the next transition from dot time 6 to dot time 7 flip-flop WSB is clocked and becomes set to disable reading of random access memory 1586 by inactivating signal 1NRW. Seven-eighths of a character position scan time later at the beginning of dot time 6 flip-flops WSC, D and E are clocked causing the flip-flop sequencer to assume state, 1, 1, 1, 0, 0. At this time a write signal ORITE = WSC.$\overline{\text{WSE}}$ becomes active and the same logic condition activates the read write enable signal 1NRW to permit writing. One character position scan time later dot timing signal OD6 again clocks the latter 3 flip-flops, causing the flip-flop sequencer to assume state 1, 1, 1, 1, 0. After receipt of this clock pulse, signal ORITE and 1NRW remain active and a write blank signal OBLKC = WSD becomes active. At the next occurrence of the dot time 6 clock signal, OD6, all of the flip-flops become set with the setting of flip-flop WSE immediately causing the resetting of flip-flops WSA and WSB. Signals ORITE and 1NRW are terminated by the setting of flip-flop WSE. However, signal 1NRW again becomes active to enable reading in response to the resetting of flip-flop WSB. One character position scan time later dot timing signal OD6 again clocks the last three flip-flops causing the flip-flop sequencer to assume state 0, 0, 0, 1, 1. At the next occurrence of signal OD6 flip-flop WSD becomes reset to enable generation of an increment signal 1INCR = $\overline{\text{WSD}}$.WSE. This increment signal increments the address counter of data entry row and character counter circuit 1584. Thus, whether writing zeros into the random access memory 1586 during a blanking sequence or whether writing successive data characters into the memory, the next write operation will take place at an incremented address location unless the incremented address location is superseded by a selection message. At the next occurrence of dot timing signal OD6 the write sequencer becomes completely reset and both the increment signal and the write sequence are terminated.

L. PRECHARGE and CHIP ENABLE SEQUENCER 1596

As shown in FIG. 41, the precharge and chip enable sequencer 1596, which provides the basic control signals for the MOS RAM memory 1586, includes a type D flip-flop 2050, a JK flip-flop 2052 and a 2 to 1 multiplexer 2054. Dot timing clock signal, ODA, drives the clock input to flip-flop 2050 and is complemented to drive the complementing input to flip-flop 2052. Key station reset signal, 5RST, drives the complementing preset input to flip-flop 2050 and the complementing reset input to flip-flop 2052. The D input to flip-flop 2050 is driven by an OR gate 2056 receiving dot timing clock signal, ODC, and enable read enable write signal, 1NRW, as inputs. A chip enable signal, 1CEN, is taken from the $\overline{\text{Q}}$ output of flip-flop 2052. The J input of this flip-flop is connected to the $\overline{\text{Q}}$ output of flip-flop 2050 and the K input of flip-flop 2052 is connected to output Q1 of multiplexer 2054. The Q output of flip-flop 2050 also drives a precharge signal, OPCE. The select B input to multiplexer 2054 is driven by the write signal, ORITE, and the complementing enable input is constantly activated by connection to ground. Multiplexer 2054 has input 1A connected to the Q output of flip-flop 2050 and input 1B connected to a signal having a logical function ODC.ODD. A pair of AND gates 2058, 2060 generate a write command signal, OWRT = OCTE.ODD.ORITE. Stages 2, 3 and 4 of multiplexer 2054 are actually part of the address multiplexer 1064 but are implemented as part of the precharge and chip enable sequencer 1566 in order to get full utilization of demodulator 2054. Outputs Q2, Q3 and Q4 provide signals OMAT2, OMAT1 and OMAT0 respectively. Inputs 2A, 3A and 4A receive signals OCA2, OCA1 and ODD respectively. Inputs 2B, 3B and 4B receive signals OWC2, OWC1 and OCA1 respectively. The inputs to stage 4 change state during the course of a two stage read or write cycle and permit both odd and even address locations to be accessed so that an 8 bit word can be stored as two 4 bit words at successive locations.

Although there has been shown and described a particular arrangement of a CRT key station which is responsive to centralized control in accordance with the invention for the purpose of enabling a person of ordinary skill in the art to make and use the invention, it will be appreciated that the invention is not limited thereto. Accordingly, any modifications, variations, or equivalent arrangements within the scope of the attached claims should be considered to be within the scope of the invention.

What is claimed is:

1. A data terminal comprising:
    an information input circuit connectable to receive messages for the terminal in a message format which allows each message to be divided into at least one part, each part including at least one address code indicating a location in a display memory for the terminal where all character codes included in the part are to be stored, at least one character code indicating a character to be displayed, and a variance code indicating a variance state for all of the display characters indicated by the at least one character code included in the part;
    a display memory having a plurality of address locations for storing a character code indicating a display character and the presence or absence of a display variance command, each display memory address location corresponding to a character display position;
    an optical display device providing an illuminated display having normal and varied optical characteristics in response to display control signals;
    a display driver system including means responsive to the display memory for providing to the optical display device display control signals causing the display device to display characters indicated by the character codes stored in the display memory, said display control signals selectively commanding a normal or varied display in response to a variance code portion of the stored character code indicating the character being displayed; and
    memory write circuitry responsive to the messages for the data terminal received by the information input circuit, the memory write circuitry including means responsive to each part of a received message for writing character codes included in the part of the received message into the display memory at a location indicated by the at least one address code for the part of the message, and including means responsive to the variance code included in the part of the received message for including in each of the character codes written into the display memory a variance code portion indicative of the variance code included in the part of the received message.

2. The data terminal as set forth in claim 1 above, wherein a normal optical characteristic with which the display driver causes a character to be displayed is a display which appears to the eye to be continuous with a selected normal intensity and a varied optical characteristic is a display which appears to the eye to be continuous with an intensity distinguishable from the normal intensity.

3. The data terminal as set forth in claim 1, above, wherein a normal optical characteristic with which the display driver causes a character to be displayed is a display which appears to the eye to be continuous and a varied optical characteristic is a display which appears to the eye to flash.

4. A data terminal connectable to receive messages for the terminal which include a separator code for dividing each message into at least one part, said one part including address codes indicating display positions for display characters, a message display variance code which indicates a normal or varied display for each display character indicated by a character code included in the part of the message, and at least one character code indicating a character to be displayed, the data terminal comprisng:
- a display memory having a plurality of addressable character code storage locations for storing character codes, each storage location including at least one bit of modify information indicating a normal or varied display;
- input circuitry responsive to messages from an associated data processing system and connected to write character codes included in a part of a received message into display memory storage locations indicated by the address codes included in the part of the received message, the input circuitry further being coupled to respond to a message display variance code included in the part of the received message by setting each of the at least one bit of modify information at each of said indicated memory storage locations to indicate a normal display or a varied display as indicated by said message display variance code;
- a display device having a plurality of character display positions;
- a driver circuit connected to drive the display device to cause the display device to optically display at the display positions thereof characters indicated by character codes stored at corresponding address locations in the display memory, the driver circuit causing a character to be displayed with a normal optical characteristic when the at least one modify bit stored at the memory storage location of the character code therefor indicates a normal display and with a varied optical characteristic optically distinguishable from the normal optical characteristic when the at least one modify bit stored at the memory storage location of the character code therefor indicates a varied display.

* * * * *

UNITED STATES PATENT AND TRADEMARK OFFICE
CERTIFICATE OF CORRECTION

PATENT NO. : 4,064,561
DATED : December 20, 1977
INVENTOR(S) : Alan K. Jennings

It is certified that error appears in the above-identified patent and that said Letters Patent are hereby corrected as shown below:

Col. 5, line 41, "whch" should read --which--.
Col. 6, line 34, "periheral" should read --peripheral--.
Col. 7, line 63, "systems" should read --system--. Col. 8, line 51, "DO8" should read --D08--; line 52, "DOO" should read --D00--; line 57, after "bus" and before "master", insert --by the bus--; line 62, "DOO" should read --D00--.
Col. 10, line 60, "has" should read --as--. Col. 11, line 17, "requestor" should read --requester--. Col. 12, line 11, "moniter" should read --monitor--; line 33, "protection" should read --protect--; line 39, "applied" should read --applies--; line 40, after "to" and before "store", insert --a--; line 52, after "protection", "bity" should read --bit--. Col. 16, line 60, after "which" and before "the", insert --case--. Col. 17, line 43, after "milliseconds" strike "a"; line 43, after "and" insert --a--; line 61, "data" should read --date--. Col. 18, line 1, "updata" should read --update--; line 64, "and" should read --an--.
Col. 21, line 67, after "ones", strike "of" and substitute --and--. Col. 22, line 49, "cause" should read --causes--.
Col. 23, line 2, after "is" insert --a--; line 30, after "SEL 1·" strike the period ("."); line 48, "beings" should read --begins--. Col. 24, line 62, "0UTE" should read --OUTE--. Col. 27, line 42, "flip-flop" (first occurrence) should read --flip-flops--. Col. 28, line 35, after "second", "of" should read --or--. Col. 29, line 55, "1/4microsecond" should read --1/4 microsecond--. Col. 30, line 22, after "selection", insert --word--; line 27, "0SEQO" should read --0SEQ0--; line 39, "1/4mi-" should read --1/4 mi- --.
Col. 31, line 65, "OSEL" should read --0SEL--. Col. 32, line 27, "OSB03-OSB10" should read --0SB03-0SB10--; line 35, "OSB03 and OSB04" should read --0SB03 and 0SB04--;

UNITED STATES PATENT AND TRADEMARK OFFICE
CERTIFICATE OF CORRECTION

PATENT NO. : 4,064,561
DATED : December 20, 1977
INVENTOR(S) : Alan K. Jennings

It is certified that error appears in the above-identified patent and that said Letters Patent are hereby corrected as shown below:

lines 38 and 39, "OPCO2-OPCO7" should read --0PC02-0PC07--; line 42, "OSEL" should read --0SEL--; line 51, "OCHOO" should read --0CH00--; line 52, "COHO7" should read --0CH07--; line 55, "OCH08-OCH15" should read --0CH08-0CH15--. Col. 33, line 4, "OOUTE" should read --0OUTE--; line 12, "OSD" should read --0SD--; line 45, "OCX1" should read --0CX1--; line 56, "OCX1" should read --0CX1--. Col. 34, line 2, "OCX1" should read --0CX1--; line 17, "coaxx" should read --coax--; line 33, "OCDI" should read --0CDI--; line 38, "OCDI" should read --0CDI--; line 39, "OCX1-OCX4" should read --0CX1-0CX4--; line 51, "CH08" should read --CH08--; line 66, "side" should read --cable--. Col. 35, line 10, "TTYO" should read --TTY0--; line 16, "OROE" should read --0ROE--; line 17, "OSB03 · $\overline{OSB05}$ · $\overline{OSB06}$ · $\overline{OSB07}$ · $\overline{OSB08}$ ·" should read --0SB03 · $\overline{OSB05}$ · $\overline{OSB06}$ · $\overline{OSB07}$ · $\overline{OSB08}$ ·-- line 18, "$\overline{OSB09}$" should read --$\overline{OSB09}$--; line 23, after "logic 1" strike the period and substitute a comma --,--; line 23, "OSB03" should read --0SB03--; line 26, "OSB04" should read --0SB04--; line 29, "OSEL" should read --0SEL--; line 33, "OSB10" should read --0SB10--; line 40, "1 POLL" should read --1POLL--; line 47, "1RSTO" should read --1RST0--; line 51, "1RESO" should read --1RES0--; line 55, "seuquence" should read --sequence--; line 64, "OLDC1" should read --0LDC1--; line 68, "OLDC1" should read --0LDC1--. Col. 36, line 3, "OLDC1" should read --0LDC1--; line 4, "OLDC1" should read --0LDC1--; line 14, "messafe" should read --message--; lines 18 and 19, "respons" should read --response--; line 42, "OCD1" should read --0CD1--; line 43, "OCD1" should read --0CD1--; line 68, "DATA O" should read --DATA 0--. Col. 37, line 2, "1Poll" should read --1POLL--. Col. 38, line 10, "OLDC1" should read

UNITED STATES PATENT AND TRADEMARK OFFICE
CERTIFICATE OF CORRECTION

PATENT NO. : 4,064,561
DATED : December 20, 1977
INVENTOR(S) : Alan K. Jennings

It is certified that error appears in the above-identified patent and that said Letters Patent are hereby corrected as shown below:

--OLDC1--; line 44, "OLDC1" should read --OLDC1--; line 56, "times" should read --timer--. Col. 39, line 6, "OIIP" should read --OIIP--; line 9, "OIIP" should read --OIIP--; line 15, "OCDI" should read --OCDI--; line 17, "OCDI" should read --OCDI--; line 24, "terinal" should read --terminal--; line 31, "OIIP" should read --OIIP--; line 34, "FI." should read --FIG.--; line 36, "OIIP" should read --OIIP--; line 49, "flip-fops" should read --flip-flops--. Col. 40, line 2, "OIIP" should read --OIIP--; line 9, "stae 0" should read --state 0--; line 15, "OPE1" should read --OPE1--. Col. 41, line 15, "OIIP" should read --OIIP--; line 17, "OIIP" should read --OIIP--; line 56, "OSDO0-OSDO7" should read --OSD00-OSD07--; line 56, "OSDO7" should read --OSD07--; line 60, "OSD" should read --OSD--; line 61, "OSD15" should read --OSD15--; line 61, "OSD15" (second occurrence) should read --OSD15--. Col. 42, line 14, "ORE" should read --ORE--; line 38, "OINTA" should read --OINTA--; line 42, "OBLCC" should read --OBLCC--; line 49, "OETOE" should read --OETOE--; line 53, "OBLCC" should read --OBLCC--; line 56, "OINTB" should read --OINTB--; line 57, "OINTB" should read --OINTB--; line 59, "OETOE" should read --OETOE--. Col. 43, line 8, "OINTS" should read --OINTS--; line 10, "OINTS" should read --OINTS--; line 11, "OIGACK" should read --OIGACK--; line 15, "OEINT" should read --OEINT--; line 18, "OINTS" should read --OINTS--; line 31, "OEINT" should read --OEINT--; line 34, "OIGACK" should read --OIGACK--. Col. 44, line 15, "OBLCC" should read --OBLCC--; line 19, "OBLCC" should read --OBLCC--; line 21, "OBUSY" should read --OBUSY--; line 35, "OBLCC" should read --OBLCC--; line 37, "OBLCC" should read --OBLCC--; line 49, "OLBL" should read --OLBL--. Col. 46, line 53, "ODMRQ" should read --ODMRQ--; line 59, "OINTS" should read --OINTS--; line 59, "ODMRQ" should read --ODMRQ--; line 66, "genrates" should read --generates--.

UNITED STATES PATENT AND TRADEMARK OFFICE
CERTIFICATE OF CORRECTION

PATENT NO. : 4,064,561

DATED : December 20, 1977

INVENTOR(S) : Alan K. Jennings

It is certified that error appears in the above-identified patent and that said Letters Patent are hereby corrected as shown below:

Col. 47, line 8, "($\overline{\text{DRAI}}$" should read --($\overline{\text{BRAI}}$--; line 17, "1DRI" should read --1GRI--; line 32, "1GR0" should read --1GRO--; line 34, "1GR0" should read --1GRO--; line 40, "1GR0" should read --1GRO--; line 43, "on" should read --one--; line 56, "1GR0" should read --1GRO--; line 66, "1GR0" should read --1GRO--. Col. 48, line 17, "signals" should read --signal--; line 31, after "input", "ot" should read --to--; line 31, "outpuf" should read --output--; line 33, after "1344.", "IF" should read --If--; line 66, "diabled" should read --disabled--. Col. 49, line 9, "A09+A10A11A12" should read --A09+$\overline{\text{A10}}\cdot\overline{\text{A11}}\cdot\overline{\text{A12}}$--

Col. 50, line 13, "flip-flop" should read --flip-flops--; line 57, "interrpt" should read --interrupt--. Col. 51, line 35, "represents" should read --represent--; line 65, "D" should read --B--. Col. 52, line 12, after "0D07.", "similarly" should read --Similarly--; line 44, "DTAO" should read --DTA0--. Col. 53, line 1, "0ADMKS" should read --0ADMKS--; line 9, "0ADME" should read --0ADME--; line 10, "0BSCN" should read --0BSCN--; line 10, "2DTAO" should read --2DTA0--; line 11, "0ADMKS" should read --0ADMKS--; line 12, "0BSCN" should read --0BSCN--; line 16, "2DATO" should read --2DTA0--; line 24, "0POAD" should read --0POAD--. Col. 54, line 14, "0SSA" should read --0SSA--; line 14, "0CKCD" should read --0CKCD--; line 21, "CRO" should read --CR0--; line 25, "2DTAO" should read --2DTA0--; line 30, "CRO" should read --CR0--; line 31, "CRO" should read --CR0--; line 33, after "receiver" insert --signal--; line 63, "0BEMP" should read --0BEMP--. Col. 55, line 68, after "and" and before "sig-" insert --332Hz--. Col. 56, line 29, "$\overline{\text{0QKCC}}$" should read --$\overline{\text{0QKCC}}$--; line 41, "0KCE" should read --0KCE--; line 68, "0J1" should read

UNITED STATES PATENT AND TRADEMARK OFFICE
CERTIFICATE OF CORRECTION

PATENT NO. : 4,064,561

Page 5 of 12

DATED : December 20, 1977

INVENTOR(S) : Alan K. Jennings

It is certified that error appears in the above-identified patent and that said Letters Patent are hereby corrected as shown below:

--OJ1--. Col. 57, line 14, "OLDTA" should read --OLDTA--; line 32, "OJ1" should read --OJ1--; line 34, "OLDTA" should read --OLDTA--; line 42, "OKD1" should read --OKD1--; line 58, "OS3" should read --OS3--; line 65, "OLDTA" should read --OLDTA--. Col. 58, line 3, "OS1" should read --OS1--; line 4, "OS2" should read --OS2--; line 7, "OS3" should read --OS3--; line 8, "OLDTA" should read --OLDTA--; line 15, "OR1" should read --OR1--; line 16, "OR2 and OR3" should read --OR2 and OR3--; line 18, "OR4, OR2, OR1" should read --OR4, OR2, OR1--; line 21, "OC1, OC2, and OC4" should read --OCL, OC2, and OC4--; line 25, "OC4, OC2, OC1" should read --OC4, OC2, OC1--; line 30, OXMIT" should read --OXMIT--; line 36, "OXMIT" should read --OXMIT--; line 42, "OLDTA" should read --OLDTA--; line 44, "OLDTA" should read --OLDTA--; line 47, "OXMIT" should read --OXMIT--; line 59, "OLOAD" should read --OLOAD--; line 61, "OLDTA" should read --OLDTA--; line 64, "OXMIT" should read --OXMIT--. Col. 59, line 4, "OLOAD" should read --OLOAD--; line 12, "OLOAD" should read --OLOAD--. Col. 60, line 53, "OCK48" should read --OCK4800--; line 67,"15,625lines" should read --15,625 lines--. Col. 61, line 34, "ONVC" should read --ONVC--; line 46, "OL8" should read --OL8--. Col. 63, line 47, "OLADD" should read --OLADD--; line 50, "OLADD" should read --OLADD--; line 53, "OLADD" should read --OLADD--. Col. 64, line 29, "OFTFC" should read --OFTFC--. Col. 65, line 5, "OLADD" should read --OLADD--; line 19, "OLADD" should read --OLADD--; line 36, "ODD" should read --ODD--.
line 11, "OWRT" should read --OWRT--; line 12, "OPCE" should read --OPEC--; line 29, "OFTFC" should read --OFTFC--; line 34, "OTRANS" should read --OTRANS--; line 48, "OFTFC" should read --OFTFC--; line 61, "OCA1" should read --OCA1--. Col. 67, line 23, "OAQ1-OAQ11" should read --OAQ1-OAQ11--;

UNITED STATES PATENT AND TRADEMARK OFFICE
CERTIFICATE OF CORRECTION

PATENT NO. : 4,064,561
DATED : December 20, 1977
INVENTOR(S) : Alan K. Jennings

It is certified that error appears in the above-identified patent and that said Letters Patent are hereby corrected as shown below:

line 25, "OL8, OL4, OL2," should read --OL8, OL4, OL2,--; line 26, "OL1" should read --OL1--; line 30, "OCA32, OCA16" should read --OCA32, OCA16--; line 31, "OCA8, OCA4, OCA2, and OCA1" should read --OCA8, OCA4, OCA2, and OCA1--; line 37, "ODD" should read --ODD--; line 41, "OWL8, OWL4, OWL2, and OWL1" should read --OWL8, OWL4, OWL2, and OWL1--; line 43, "OWC32, OWC16," should read --OWC32, OWC16,--; line 44, "OWC8, OWC4, OWC2, and OWC1" should read --OWC8, OWC4, OWC2, and OWC1--; line 46, "OCA" should read --OCA--; line 56, "OAQ1-OAQ11" should read --OAQ1-OAQ11--; line 57, "OMAT-" should read --OMAT- --; line 58, "9-OMATO" should read --9-OMAT0--; lines 65-68, "OMAT9=OAQ1+OAQ5; OMAT8=OAQ2+OAQ5; OMAT7+OAQ3; OMAT6=OAQ4; OMAT5=OAQ5+OAQ6; OMAT4=OAQ2+OAQ5; OMAT3" should read --OMAT9=OAQ1+OAQ5; OMAT8=OAQ2+OAQ5; OMAT7+OAQ3; OMAT6=OAQ4; OMAT5=OAQ5+OAQ6; OMAT4=OAQ2+OAQ5; OMAT3--.

Col. 68, lines 1 and 2,

"=OAQ8; OMAT2+OAQ9; OMAT1+OAQ10; and OMAT0=OAQ11" should read

--+OAQ8; OMAT2+OAQ9; OMAT1+OAQ10; and OMAT0=OAQ11--;

line 26, "ORD2-ORD7" should read --ORD2-ORD7--; line 27, "OCL4" should read --OCL4--; line 28, "OCL2 and OCL1" should read --OCL2 and OCL1--; line 33, "ORDO," should read --ORD0,--; line 38, "OGUL" should read --OGUL--; line 41, "OUL" should read --OUL--; lines 42 and 43, "ORD2-ORD7" should read --ORD2-ORD7--; line 44, "OCL4, OCL2 and OCL1" should read --OCL4, OCL2 and OCL1--; line 56, "OROD1-OROD5." should read --OROD1-OROD5.--; line 58, "OUL" should read --OUL--;

UNITED STATES PATENT AND TRADEMARK OFFICE
CERTIFICATE OF CORRECTION

PATENT NO. : 4,064,561

DATED : December 20, 1977

INVENTOR(S) : Alan K. Jennings

It is certified that error appears in the above-identified patent and that said Letters Patent are hereby corrected as shown below:

line 62, "OBLKC" should read --OBLKC--. Col. 69, line 5, "OVID" should read --OVID--; line 26, "SIGL=NVI" should read --SIGL=NVD--. Col. 70, line 27, "OIDAT" should read --OIDAT--; line 30, "inpiuts" should read --inputs--; line 46, "thd" should read --the--; line 50, "OSSI" should read --OSSI--; line 52, "OIDAT" should read --OIDAT--; line 63, "OIDAT" should read --OIDAT--. Col. 71, line 2, "zeroos" should read --zeros--; line 19, "OCLKA, OCLKB and OCLKC" should read --OCLKA, OCLKB and OCLKC--; line 20, "OCLKA" should read --OCLKA--; line 23, "OCLKB" should read --OCLKB--; line 29, "OCLKC" should read --OCLKC--; line 32, "OBSCN" should read --OBSCN--; line 38, "OCLKA" should read --OCLKA--; line 41, "OCLKA" should read --OCLKA--; line 47, "OIDAT" should read --OIDAT--; line 57, "2DTAO" should read --2DTA0--. Col. 72, line 4, after "time" and before "flip-flop" insert --1734--; line 6, after "all" and before "bits" insert --11--; line 19, "OSSI" should read --OSSI--; line 25, "OCLKB and OCLKC" should read --OCLKB and OCLKC--; lines 40 and 41, "sequence" should read --sequencer--; line 42, "presecribed" should read --prescribed--; line 50, "OCKCD" should read --OCKCD--; line 52, "receiver" should read --receive--; line 59, "nect" should read --next--. Col. 73, line 4, "signals" should read --signal--; line 4, "OE1E2" should read 0E1E2--; line 12, "OCLKB" should read --OCLKB--; line 12, after "SEOM+" strike "⅄"; line 23, "OCLKB" should read --OCLKB--; line 26, "QERROR2" should read --OERROR2--; line 34, "OCLKC" should read --OCLKC--; line 42, "to" should read --two--; line 48, "ONLCR" should read --ONLCR--; line 51, "ONBLK" should read --ONBLK--; line 57, "ONBLK" should read --ONBLK--; line 65, "OEOMS" should read --OEOMS--. Col. 74, line 4, "OCLKCONLCR" should read --OCLKONLCR--; line 24, after "flash" (second

UNITED STATES PATENT AND TRADEMARK OFFICE
CERTIFICATE OF CORRECTION

PATENT NO. : 4,064,561

DATED : December 20, 1977

INVENTOR(S) : Alan K. Jennings

It is certified that error appears in the above-identified patent and that said Letters Patent are hereby corrected as shown below:

occurrence) and before "latch", insert --bit--; line 63, "OEOMS" should read --OEOMS--; line 66, "dock" should read --clock--; line 67, "OCLKC" should read --OCLKC--. Col. 75, line 12, "OCLKC" should read --OCLKC--; line 15, "OCLKC" should read --OCLKC--; line 16, "OCLKC" should read --OCLKC--; line 22, "OCLKC" should read --OCLKC--; line 26, "OCLKC" should read --OCLKC--; line 30, "OCLKC" should read --OCLKC--; line 35, "enagle" should read --enable--; line 45, "OCLK1" should read --OCLK1--; line 50, "OCOUT" should read --OCOUT--; line 51, "OCLK1" should read --OCLK1--; line 54, "OCLK1" should read --OCLK1--; line 59, "OB1A2" should read --OB1A2--; line 62, "signals, ON1N2" should read --signal, ON1N2--; line 64, "CB1A2" should read --OB1A2--; line 66, "OSREN" should read --OSREN--. Col. 76, line 1, "ONPB" should read --ONPB--; line 11, "OPOADKS" should read --OPOADKS--; line 14, "OEOMS" should read --OEOMS--; line 16, "OGP1" should read --OGP1--; line 18, "OXMIT" should read --OXMIT--; line 30, "OCLK1" should read --OCLK1--; line 31, "OCLK1" should read --OCLK1--; line 33, "OGP1" should read --OGP1--; line 34, "present" should read --preset--; line 45, "ONPB" should read --ONPB--; line 46, "OCLK1" should read --OCLK1--; line 52, "OXMIT" should read --OXMIT--; line 58, "ONKSR" should read --ONKSR--; line 61, "ONKSR" should read --ONKSR--; line 68, "OXMIT" should read --OXMIT--; line 68, "cause" should read --causes--. Col. 77, line 2, "ONKSR" should read --ONKSR--; line 6, "OLOAD" should read --OLOAD--; line 10, "logicl" should read --logical--; line 12, "OSRCK" should read --OSRCK--; line 20, "OEMCK" should read --OEMCK--; line 20, after "COUT", strike the equal sign ("=") and substitute a plus sign --+--; line 21, "OGP1" should read --OGP1--; line 35, "OSCK" should read --OSCK--; line 48, "OKDL" should read --OKD1--; line 48, "present" should read --preset--; line 52, "OKD1" should read --OKD1--;

UNITED STATES PATENT AND TRADEMARK OFFICE
CERTIFICATE OF CORRECTION

PATENT NO. : 4,064,561
DATED : December 20, 1977
INVENTOR(S) : Alan K. Jennings

It is certified that error appears in the above-identified patent and that said Letters Patent are hereby corrected as shown below:

line 53, "OBEMP" should read --OBEMP--; line 57, "conncted" should read --connected--; line 62, "OKD1" should read --OKDL--.  Col. 78, line 2, "flip-flop" should read --flip-flops--; line 11, "O" should read --0--; line 12, "OKD1" should read --OKDL--; line 16, "OKD1" should read --OKD1--; line 20, "OKD1" should read --OKD1--; line 25, after "interval", strike the period and substitute a comma --,--; line 25, before "keyed" change "The" to --the--; line 32, "inut" should read --input--; line 39, "OBEMP" should read --OBEMP--; line 42, "presents" should read --presets--; line 58, "OBEMP" should read --OBEMP--.  Col. 79, line 12, "OS3" should read --OS3--; line 15, "OS3" should read --OS3--; line 30, "ORESET" should read --ORESET--; line 30, "OJ1" should read --OJ1--; line 37, "NO." should read --No.--; line 40, after "the" and before "input", strike "output" and substitute --other--; line 44, "OKD1" should read --OKD1--; line 45, "registr" should read --register--; line 53, "K62" should read --K63--; line 56, "has" should read --had--; line 57, "ODK1" should read --OKD1--; line 63, "ODK1" should read --OKD1--.  Col. 80, line 7, after "QKBB2]'", strike the comma and insert a period --.--; line 14, "OLDTA" should read --OLDTA--; line 17, "clock" should read --click--; line 41, "OC1" should read --OC1--; line 42, "OC2" should read --OC2--; line 43, "OC4" should read --OC4--; line 44, "OR1, OR2 and OR4" should read --OR1, OR2 and OR4--; line 47, "OS1 and OS2" should read --OSL and OS2--.  Col. 81, line 1, "OSR" should read --OSR--; line 4, "OJ3" should read --OJ3--; line 5, "OJ4" should read --OJ4--; line 13, "tbles" should read --tables--; line 13, "of" should read --for--; line 16, "may" should read --many--; line 30, after "stored", "a" should read --at--; line 38, "OSCK" should read --OSCK--; line 39, "OXMIT" should read --OXMIT--; line 47, "XMIT.BEMP." should

UNITED STATES PATENT AND TRADEMARK OFFICE
CERTIFICATE OF CORRECTION

PATENT NO. : 4,064,561

DATED : December 20, 1977

INVENTOR(S) : Alan K. Jennings

It is certified that error appears in the above-identified patent and that said Letters Patent are hereby corrected as shown below:

read --$\overline{\text{XMIT}}\cdot\overline{\text{BEMP}}$.--; line 48, "OVERFLOW.$\overline{\text{LOAD}}$]'" should read --OVERFLOW·$\overline{\text{LOAD}}$]'--; line 57, "OKSNA" should read --0KSNA--; line 59, "OKSNB" should read --0KSNB--. Col. 82, line 1, "OKSNA" should read --0KSNA--; line 5, after "[1KSD2." strike "KSD2."; line 20, "OSRCK" should read --0SRCK--; line 24, "FEGISTER" should read --REGISTER--; line 27, "shaft" should read --shift--; line 35, "OEMCK" should read --0EMCK--; line 39, "DO-D8" should read --D0-D8--; line 46, after "The" and before "data" insert --second--; line 50, after "date" and before "desired", "is" should read --if--; lines 60-64, "1ODAT = B1A2.N1N2 + [$\overline{\text{NKSR}}$.1EOMD + $\overline{\text{KSNA}}$.NKSR.1KSD1 + KSBN, NKSR.1KSD3 + KSNA.KSNB.NKSR.1KSD2].SREN + KSNA.$\overline{\text{KSNB}}$.NKSR.1KSD2].SREN + NPB.QKSRP." should read --1ODAT = B1A2·N1N2 + [$\overline{\text{NKSR}}$·1EOMD + $\overline{\text{KSNA}}$·NKSR·1KSD1 + KSBN· NKSR·1KSD3 + KSNA·$\overline{\text{KSNB}}$·NKSR·1KSD2]·SREN + NPB·QKSRP.--

Col. 83, line 19, "but" should read --bit--; line 22, "OCOUT" should read --0COUT--; line 25, "OODAT" should read --0ODAT--; line 26, "OODAT" should read --0ODAT--; line 28, "OCOUT" should read --0COUT--; line 30, "OXMIT" should read --0XMIT--; line 37, "reuired" should read --required--; line 56, "conncted" should read --connected--; line 58, after "times" and before "Counter", strike the comma (",") and substitute a period --.--; line 61, "intpu" should read --input--; line 63, "ODA" should read --0DA--. Col. 84, line 1, "tiime" should read --time--; line 3, after "0D2" insert a comma --,--; line 19, before "6", "tims" should read --times--; line 19, before "7", "tims" should read --times--; line 45, after "set" and before "by", insert --either--; line 50, "Q" should read --$\overline{Q}$--; line 52, "OHRT" should read --0HRT--; line 64, "ONHD"

UNITED STATES PATENT AND TRADEMARK OFFICE
CERTIFICATE OF CORRECTION

PATENT NO. : 4,064,561

DATED : December 20, 1977

INVENTOR(S) : Alan K. Jennings

It is certified that error appears in the above-identified patent and that said Letters Patent are hereby corrected as shown below:

should read --ONHD--; line 68, "ONHD" should read --ONHD--. Col. 85, line 6, "OD1-OD5" should read --OD1-OD5--; line 10, "OHBLK" should read --OHBLK--; line 17, "OCK48" should read --OCK48--; line 19, "OCK48" should read --OCK48--; line 34, "ONVC" should read --ONVC--; line 38, "ONVD" should read --ONVD--; line 41, "OCK48" should read --OCK48--; line 45, "OCK48" should read --OCK48--; line 50, "202" should read --2002--. Col. 86, line 5, "OCK48" should read --OCK48--; line 8, "ONVC, at" should read --ONVC, as--; line 11, "ONVC" should read --ONVC--; line 18, "OBLK" should read --OBLK--; line 21, "OCK48" should read --OCK48--; line 23, "OCK48" should read --OCK48--; line 27, "ONVD" should read --ONVD--; line 48, "ODD" should read --ODD--; line 53, after "connected", "fo" should read --for--. Col. 87, line 4, "ORITE = WSC.$\overline{WSE}$" should read --ORITE = WSC·$\overline{WSE}$--; line 9, "signal" should read --signals--; line 10, "ORITE" should read --ORITE--; line 10, after "blank" insert --clock--; line 11, "OBLKC" should read --OBLKC--; line 15, "ORITE" should read --ORITE--; line 19, "OD6" should read --OD6--; line 42, "ODA" should read --ODA--; line 49, "ODC" should read --ODA--; line 54, "Q" should read --$\overline{Q}$--; line 55, "OPCE" should read --OPCE--; line 57, "ORITE" should read --ORITE--; line 61, "ODC.ODD" should read --ODC·ODD--; lines 62 and 63, "OWRT = OCTE.ODD.ORITE" should read --OWRT = OCTE·ODD·ORITE--; line 68, "OMAT2, OMAT1 and OMATO" should read --OMAT2, OMAT1 and OMATO--. Col. 88, line 1, "OCA2, OCA1 and ODD" should read

UNITED STATES PATENT AND TRADEMARK OFFICE
CERTIFICATE OF CORRECTION

PATENT NO. : 4,064,561

DATED : December 20, 1977

INVENTOR(S) : Alan K. Jennings

It is certified that error appears in the above-identified patent and that said Letters Patent are hereby corrected as shown below:

--OCA2, OCA1 and ODD--; line 3, "OWC2, OWC1 and OCA1" should read --OWC2, OWC1 and OCA1--. Col. 89, line 18, "comprisng" should read --comprising--.

Signed and Sealed this

Twenty-first Day of November 1978

[SEAL]

Attest:

RUTH C. MASON
*Attesting Officer*

DONALD W. BANNER
*Commissioner of Patents and Trademarks*